United States Patent
Savino et al.

(10) Patent No.: US 12,297,023 B2
(45) Date of Patent: May 13, 2025

(54) SYSTEM AND METHOD FOR DISPENSING A FOOD AND BEVERAGE PRODUCT

(71) Applicant: Plant Tap, LLC, North Salem, NY (US)

(72) Inventors: Joseph Camillo Savino, North Salem, NY (US); Lennie Friedman, Raleigh, NC (US); Schlomo A. Tolwin, Southfield, MI (US); William D Suh, Cary, NC (US); James Shepard, Marblehead, MA (US); Zachary Carlins, Boston, MA (US); Aaron Panone, Medford, MA (US); Daniel T. Lewis, Raleigh, NC (US)

(73) Assignee: Plant Tap, LLC, North Salem, NY (US)

( * ) Notice: Subject to any disclaimer, the term of this patent is extended or adjusted under 35 U.S.C. 154(b) by 939 days.

(21) Appl. No.: 17/303,471

(22) Filed: May 28, 2021

(65) Prior Publication Data

US 2021/0284417 A1    Sep. 16, 2021

Related U.S. Application Data

(63) Continuation-in-part of application No. 17/131,632, filed on Dec. 22, 2020, which is a
(Continued)

(51) Int. Cl.
*B65D 75/00* (2006.01)
*B65D 75/58* (2006.01)
(Continued)

(52) U.S. Cl.
CPC ....... *B65D 75/5861* (2013.01); *B65D 75/008* (2013.01); *B65D 83/0055* (2013.01); *A23C 11/02* (2013.01)

(58) Field of Classification Search
CPC ............ B65D 75/5861; B65D 83/0061; B65D 75/008

See application file for complete search history.

(56) References Cited

U.S. PATENT DOCUMENTS

| 2,614,738 A | 10/1952 | Mills |
| 3,251,550 A | 5/1966 | Axel et al. |

(Continued)

FOREIGN PATENT DOCUMENTS

| CN | 104782773 A | 7/2006 |
| CN | 104799281 A | 7/2006 |

(Continued)

OTHER PUBLICATIONS

Nut Milk Wet Blending Machines, Aug. 15, 2016, https://www.alibaba.com/product-detail/nut-milk-wet-blending-machines_60465570199.html?spm=a2700.7724857.0.0.Pd0spa.

*Primary Examiner* — Anshu Bhatia
(74) *Attorney, Agent, or Firm* — FINNEGAN, HENDERSON, FARABOW, GARRETT & DUNNER L.L.P.

(57) ABSTRACT

An apparatus and system for dispensing a food and beverage product where a flowable product is extracted from a flexible pouch, and where a nozzle region exists through which the flowable product evacuates the flexible pouch. The nozzle region has a lock seal that locks the flowable product within the flexible pouch when a pressure less than a first threshold value is applied to the flexible pouch. There is also a frangible seal located above the nozzle region that is configured to lock the flowable product within the flexible pouch when pressure less than a second threshold value is applied to the flexible pouch and when the first threshold value is larger than the second threshold value.

10 Claims, 56 Drawing Sheets

Related U.S. Application Data continuation-in-part of application No. 16/409,759, filed on May 10, 2019, now Pat. No. 11,541,364.

(60) Provisional application No. 63/126,292, filed on Dec. 16, 2020, provisional application No. 63/032,308, filed on May 29, 2020.

(51) Int. Cl.
*B65D 83/00* (2006.01)
*A23C 11/02* (2006.01)

(56) References Cited

U.S. PATENT DOCUMENTS

| | | | |
|---|---|---|---|
| 3,542,342 A | 11/1970 | Barron | |
| 3,857,977 A | 12/1974 | Huessy | |
| 4,121,301 A | 10/1978 | De Francisci | |
| 4,595,131 A | 6/1986 | Ruskin et al. | |
| 4,643,906 A | 2/1987 | Pitz | |
| 4,744,992 A | 5/1988 | Mitchell et al. | |
| 4,759,472 A | 7/1988 | Stenger | |
| 4,800,097 A | 1/1989 | Morris et al. | |
| 4,871,373 A | 10/1989 | Kiener et al. | |
| 4,894,242 A | 1/1990 | Mitchell et al. | |
| 5,018,646 A | 5/1991 | Billman et al. | |
| 5,312,020 A | 5/1994 | Frei | |
| 5,899,563 A | 5/1999 | Karras | |
| 5,918,768 A | 7/1999 | Ford | |
| 5,927,553 A | 7/1999 | Ford | |
| 5,975,357 A | 11/1999 | Topar | |
| 5,975,365 A | 11/1999 | Hsieh | |
| 6,007,236 A | 12/1999 | Maguire | |
| 6,123,976 A | 9/2000 | Stoddard | |
| 6,153,247 A | 11/2000 | Stoddard | |
| 6,293,693 B1 | 9/2001 | Rodgers et al. | |
| 6,419,120 B1 | 7/2002 | Bertone | |
| 6,428,828 B1 | 8/2002 | Jackson et al. | |
| 6,485,773 B1 | 11/2002 | Myers | |
| 6,550,648 B2 | 4/2003 | Bardin | |
| 6,553,779 B1 | 4/2003 | Boyer et al. | |
| 6,874,660 B2 | 4/2005 | Bertone | |
| 7,036,687 B1 | 5/2006 | Lowe | |
| 7,368,140 B2 | 5/2008 | Tabata | |
| 7,829,128 B2 | 11/2010 | Karwowski et al. | |
| 8,333,301 B2 | 12/2012 | Majer | |
| 8,695,483 B2 | 4/2014 | Koopman et al. | |
| 2003/0230604 A1 | 12/2003 | Huffer | |
| 2004/0035884 A1 | 2/2004 | de la Guardia | |
| 2006/0157602 A1 | 7/2006 | Wang | |
| 2006/0209624 A1 | 9/2006 | Hoogland | |
| 2006/0249535 A1 | 11/2006 | Mauger et al. | |
| 2007/0026128 A1 | 2/2007 | Jarrett | |
| 2007/0128335 A1 | 6/2007 | Iwamoto et al. | |
| 2007/0148318 A1 | 6/2007 | Rubio et al. | |
| 2009/0236361 A1 | 9/2009 | Doelman et al. | |
| 2011/0064862 A1 | 3/2011 | McCready | |
| 2011/0086158 A1 | 4/2011 | Aremu et al. | |
| 2012/0037660 A1 | 2/2012 | Bacellar et al. | |
| 2013/0062366 A1 | 3/2013 | Tansey | |
| 2013/0258799 A1 | 10/2013 | Christy et al. | |
| 2014/0175124 A1 | 6/2014 | Nathan | |
| 2014/0193563 A1 | 7/2014 | Carder et al. | |
| 2014/0197202 A1* | 7/2014 | Soh | B65D 75/5822 222/107 |
| 2015/0043302 A1 | 2/2015 | Kamiya et al. | |
| 2015/0366254 A1 | 12/2015 | Kesier et al. | |
| 2016/0114297 A1 | 4/2016 | Perez et al. | |
| 2016/0338389 A1 | 11/2016 | Malone et al. | |
| 2018/0035841 A1 | 2/2018 | Savino | |

FOREIGN PATENT DOCUMENTS

| | | |
|---|---|---|
| CN | 201044718 Y | 4/2008 |
| CN | 191861894 B | 8/2012 |
| CN | 102836667 A | 12/2012 |
| CN | 103636804 A | 3/2014 |
| CN | 104286185 A | 1/2015 |
| CN | 104304480 A | 1/2015 |
| CN | 104397182 A | 3/2015 |
| CN | 104489103 A | 4/2015 |
| WO | WO 2006/128561 A1 | 12/2006 |
| WO | WO-2013/078510 A1 | 6/2013 |

\* cited by examiner

113

101

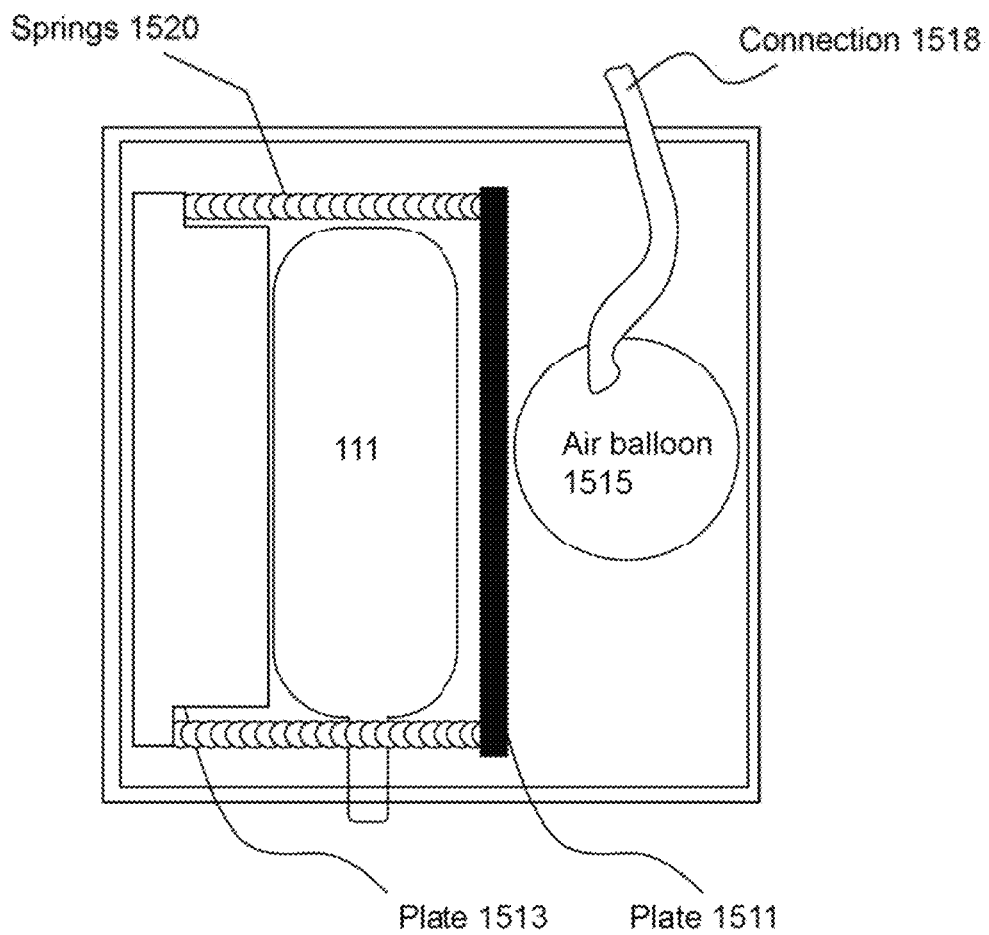

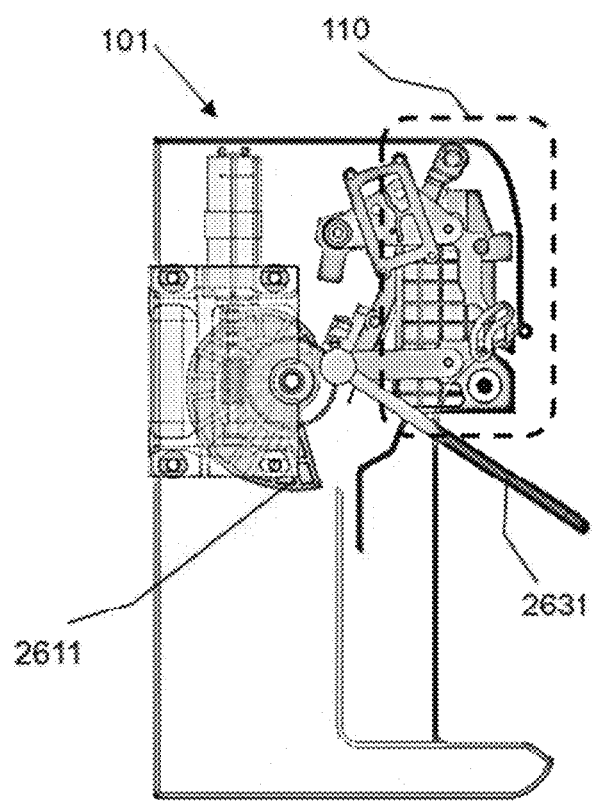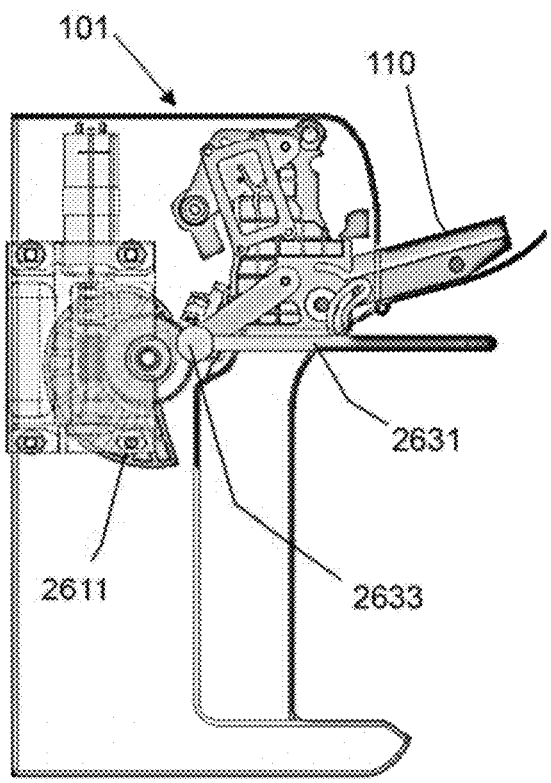

*Round*   *Eccentric*   *Oval*   *Elliptical*

*Heart*   *Hexagonal*   *Star*   *Snail*

Axis
2615

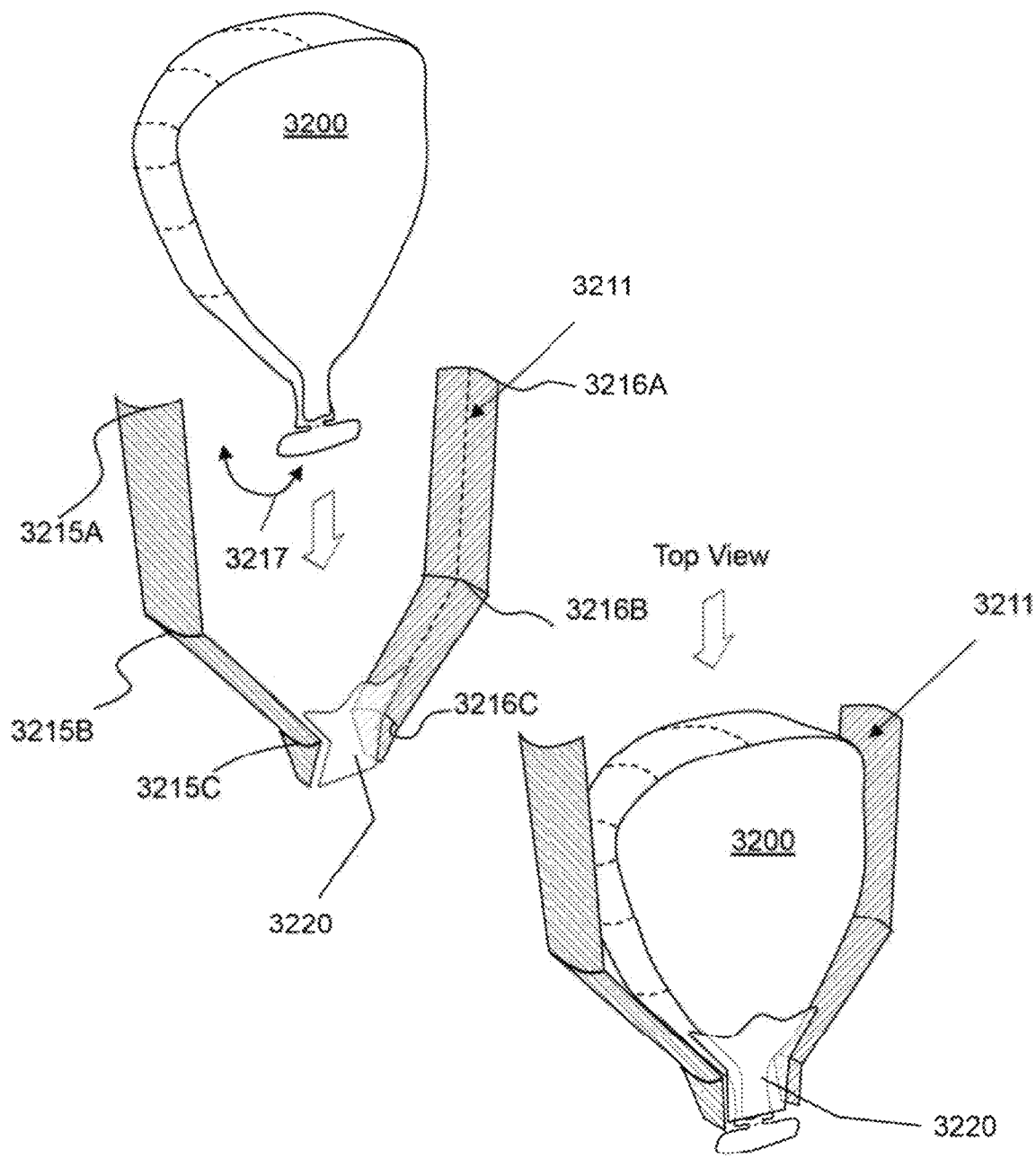

Top View

SYSTEM AND METHOD FOR DISPENSING A FOOD AND BEVERAGE PRODUCT

CROSS-REFERENCE TO RELATED APPLICATIONS

This application is a continuation-in-part and claims the benefit of priority of U.S. patent application Ser. No. 17/131,632, filed on Dec. 22, 2020, currently pending, which in turn is a continuation-in-part, and claims the benefit of priority of U.S. patent application Ser. No. 16/409,759, filed on May 10, 2019, currently pending, both of the applications incorporated herein by reference in their entireties. This application also claims priority of U.S. Provisional Patent Application Ser. No. 63/032,308 entitled "System and Method for Dispensing a Food and Beverage Product," filed May 29, 2020, and U.S. Provisional Patent Application Ser. No. 63/126,292 entitled "System and Method for Dispensing a Food and Beverage Product," filed Dec. 16, 2020, the disclosures of which are expressly incorporated by reference herein in their entireties for all purposes.

TECHNICAL FIELD

The present disclosure relates to a system and method for dispensing a food and beverage product and, more particularly, to a system and method for dispensing a plant-based food and beverage product made from a paste of nuts and/or cereals.

BACKGROUND

In recent years, consumption of plant-based or non-dairy milk alternatives has significantly increased. Nowadays, cow milk allergy, lactose intolerance, calorie concern, and preference for vegan diets have influenced consumers towards choosing cow milk alternatives. Additionally, people may prefer non-dairy alternatives due to concerns over saturated fat levels, hormone content, and antibiotic use in dairy cattle. Plant-based beverages may be derived, for example, from soy, various nuts, or grains. Many retail plant-based products (e.g., almond-milk, cashew-milk, etc.) have numerous synthetic ingredients added to achieve a level of sterility for commercial distribution and retail sale. Additionally, retail products can have up to 20 ingredients such as gums, thickeners, vitamin packs, and preservatives that are added to this perishable liquid product to achieve an appealing taste, texture, color, etc., and to maintain that for commercially acceptable shelf life.

The commercial processes used to make commercial plant-based milk, such as nut milk, often occur at high heat (e.g., 135° C./275° F.). This type of processing can cause degradations in flavor, color, and the smell of the milk. Also, a factor that drives up the cost of commercially distributed nut milk is the fact that they are water-based and must be refrigerated.

Making pure ("clean") plant-based beverages without preservatives is also challenging. These beverages usually contain only a few ingredients (e.g., nuts/nut paste and water) and may be too perishable to be sold through a distribution chain. Moreover, although the plant-based ingredients alone may not be perishable and can be stored at room temperature, those ingredients can become highly perishable once commercially processed with various liquids (e.g., water). Even the preservative-laced milk products may not last over a week in a consumer's refrigerator due to transit times in distribution and the time the product sits on a retail shelf before purchase.

Plant-based milk (e.g., almond milk) can be made in different ways. For example, plant-based milk can be produced by mixing plant-based powder (i.e., ground nuts) with other desired ingredients, such as water, spices, other flavorings, sweeteners, etc. Plant-based milk can alternatively be produced by mixing predetermined quantities of plant-based paste with other desired ingredients. Each technique for producing plant-based milk poses distinct challenges owing, in part, to the physical differences between plant-based powder and plant-based paste. For example, unlike plant-based powder, which typically has a dry, granular consistency, plant-based paste typically has a more fluidlike or pasty consistency caused by the release of natural oils from plant-based material during pulverization. These natural oils can "separate" from the more solid constituents of the plant-based paste over time, resulting in the formation of separate layers of different constituent materials in a packaged plant-based paste.

The present disclosure solves the problems related to forming plant-based milk by mixing water and a plant-based paste. As described below, the invention mixes water with plant-based paste to make fresh plant-based milk on demand (i.e., the product is made fresh right in front of the customer), which negates the need for transporting refrigerated beverages (that can be 90% water). Thus, the present disclosure describes a beverage product mixing and dispensing system that may be used to overcoming one or more of the problems set forth above and/or other problems of the prior art.

SUMMARY

Embodiments consistent with the present disclosure provide systems and methods for establishing data communication with a data storage provider and for exchanging data with the data storage provider.

Consistent with a disclosed embodiment, [finalized after claims are finalized].

Consistent with another disclosed embodiment, [finalized after claims are finalized].

Additional objects and advantages of the disclosed embodiments will be set forth in part in the following description and will be apparent from the description or may be learned by practice of the embodiments. The objects and advantages of the disclosed embodiments may be realized and attained by the elements and combinations set forth in the claims.

It is to be understood that the foregoing general description and the following detailed description are exemplary and explanatory only and are not restrictive of the disclosure, as claimed.

BRIEF DESCRIPTION OF THE DRAWINGS

The accompanying drawings are not necessarily to scale or exhaustive. Instead, the emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings:

FIGS. 15A-15C show other example chambers extracting base from a pouch, consistent with disclosed embodiments.

FIGS. 26C-26I show example embodiments of a chamber for extracting plant-based paste from a pouch, consistent with disclosed embodiments.

FIG. 32B-32E shows an example of a flexible pouch and a chamber for extracting plant-based paste, consistent with disclosed embodiments.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The disclosed embodiments are related to systems and methods for forming a plant-based milk. In an example embodiment, the system may include a tabletop machine designed to extract a plant-base paste (herein, also referred to as a base) from a pouch. In an example embodiment, the base may be a nut-based or grain-based food and beverage product. The base may be formed from soy, various nuts (e.g., almonds, walnuts, cashew, peanuts, and the like), or grains (e.g., oats, barley, and the like). Other plant-based products for forming base may include quinoa, kamut, wheat, spelt, rye, oats, wild rice, fonio, teff, coconut, almond, brazil nut, cashew, pine nut, hazelnut, and the like.

Figure 1A:
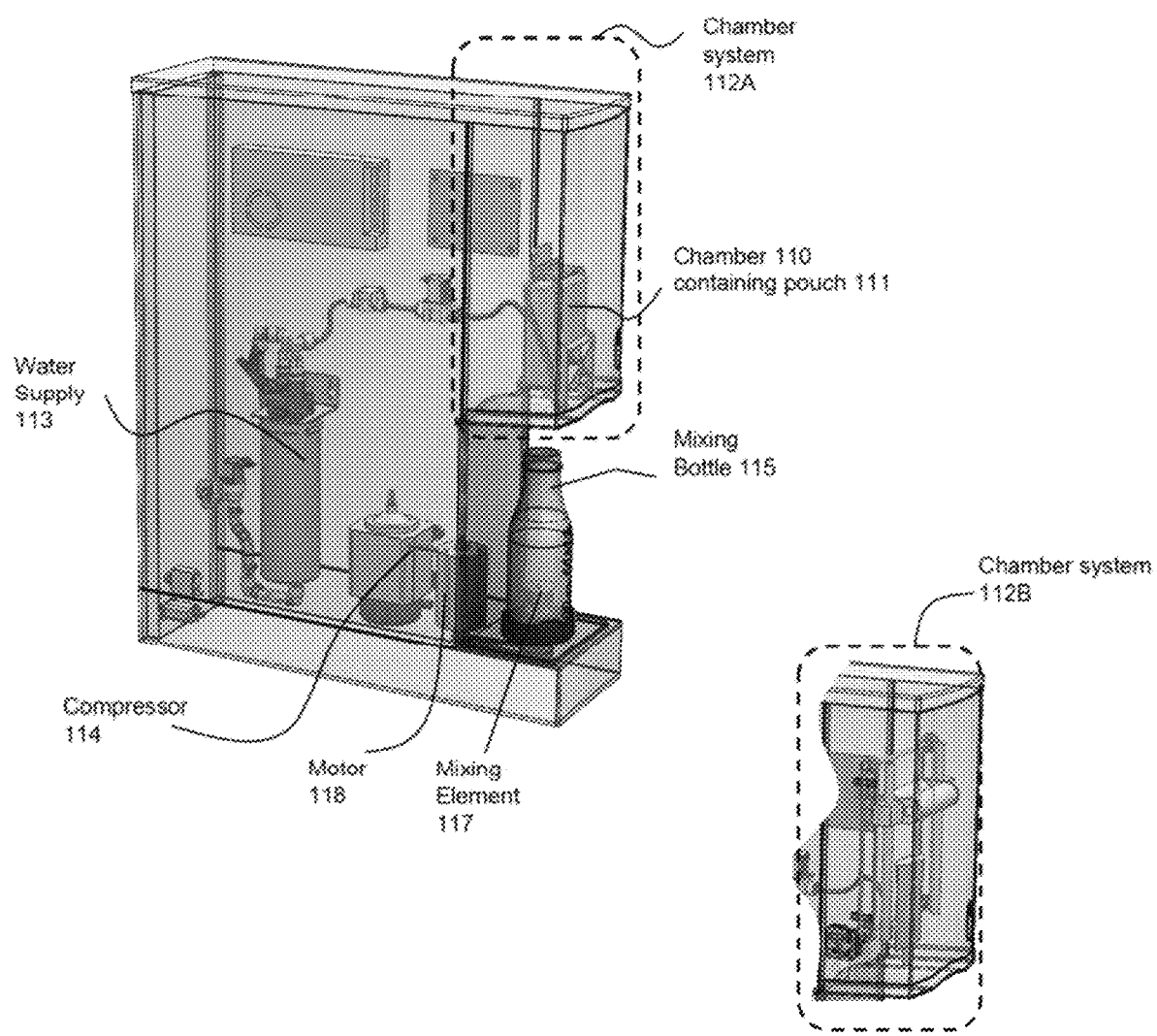
FIG. 1A is an illustrative system for forming a dispensing a plant-based milk, including mixing of the plant-based milk, consistent with disclosed embodiments.

FIG. 1A shows an example system for forming a dispensing a plant-based milk, including mixing of the plant-based milk, consistent with disclosed embodiments. In an example embodiment, the system may be a tabletop system 101. System 101 may include a water supply 113, and a chamber 110 that may contain a flexible pouch 111. Chamber 110 may be configured to squeeze flexible pouch 111, resulting in a plant-based paste (i.e., base) flowing into a bottle 115.

In an example embodiment, pouch 111 may be made from any suitable flexible material (e.g., plastic, paper, biodegradable plastic, fabric, a composite material having multiple layers of various flexible materials, and the like). For example, pouch 111 may be formed from plastic or cardboard with a suitable lining. In some cases, pouch 111 may be made from material with antimicrobial properties (e.g., material that includes TiO2, and the like). In some instances, pouch 111 may be made from a material containing aluminum foil (or any other suitable foil). Pouch 111 may be waterproof and/or not dissolvable in water. System 101 may be configured to require a few seconds (1, 2, 5, 10, 20, 30, 60 seconds) to extract base from pouch 111 using the pressurized chamber. In an example embodiment, a process of preparing plant-based milk may include steps of placing pouch 111 into chamber 110, closing chamber 110, waiting for a few (or a few tens) seconds for extracting base from pouch 111, and waiting for a few (or a few tens) of seconds for mixing extracted base and water. In an example embodiment, system 101 may be configured to discard pouch 111 once the base is extracted from pouch 111.

In some cases, pouch 111 may be pressed such that at least some of the base may remain within pouch 111 (i.e., pouch 111 may only be partially emptied). In an example embodiment, a first portion of the base (first base portion) may be extracted from pouch 111, and the first base portion may be mixed with the first portion of water (first water portion) to yield the first portion of a plant-based beverage. Subsequently, a second base portion may be extracted from pouch 111, and the second base portion may be mixed with the first portion of the plant-based beverage. In some cases, a second water portion may be added to the plant-based beverage. It should be appreciated that multiple portions of the base and/or water may be added consecutively (or, in some cases, simultaneously) to a mixture to form the plant-based beverage. After all the portions of the base are used for the plant-based beverage, pouch 111 may be emptied.

In various embodiments, system 101 may be configured to extract base from flexible pouch 111 into bottle 115 and mix the base with an appropriate amount of water to result in a plant-based milk. In some cases, the mixing may happen within bottle 115. For example, bottle 115 may include a mixing element 117 that may, for example, be activated by motor 118. For example, mixing element 117 may include a magnetic element that may be activated by a magnetic field created by motor 118.

FIG. 1A shows that a first embodiment of system 101 containing chamber system 112A and a second embodiment of system 101 containing chamber system 112B. Chamber system 112A may use pressure created by compressor 114 to squeeze (i.e., apply pressure onto) flexible pouch 111, while chamber system 112B may use mechanical elements (e.g., rollers) to apply pressure onto flexible pouch 111. A non-exclusive list of possible approaches for applying pressure on pouch 111 includes any suitable mechanical devices (e.g., rollers, CAM elements, a press, such as an arbor press, a piston, and the like), or any suitable ways for applying the pressure of a fluid (e.g., the gas pressure of liquid pressure) over surfaces of pouch 111. Various approaches for applying pressure onto pouch 111 are further described below.

Figure 1B:
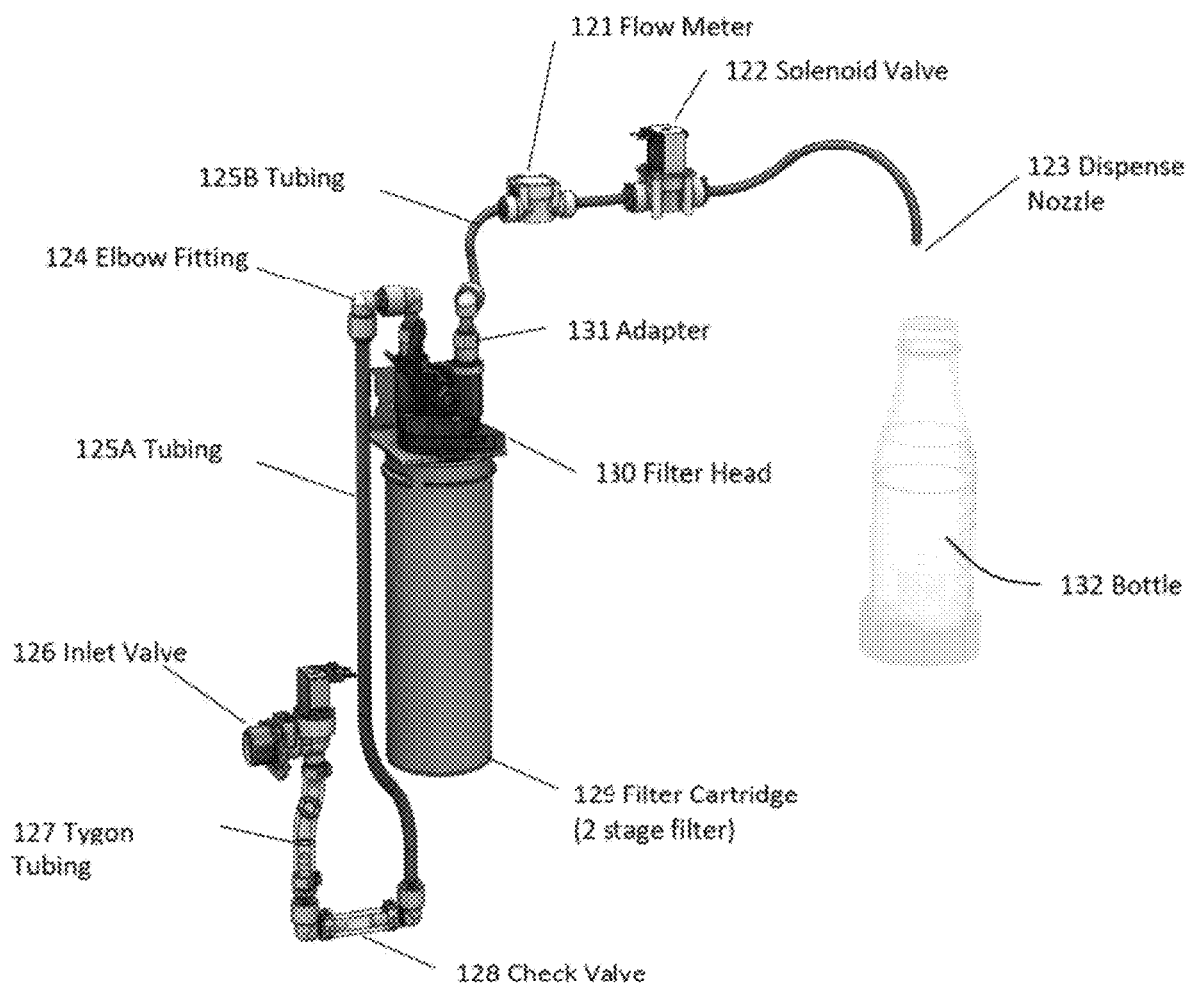
FIG. 1B is an illustrative water supply system, consistent with disclosed embodiments.

FIG. 1B shows further details of water supply 113, which may include tubings 127, 125A, and 125B, valves, such as check valve 128, a solenoid valve 122, and an inlet valve 126. For example, inlet valve 126 may be configured to supply water, check valve to 128 may be configured to allow a one-way flow of water into filter cartridge 129, and solenoid valve 122 may be an electrically activated valve for controlling the flow of water via dispense nozzle 123 into a bottle 132 for mixing plant-based milk. As described, water supply 113 may include a suitable filter (e.g., filter cartridge 129) for filtering water, as well as a flow meter 121 for measuring the flow of water. Filter cartridge 129 may include a suitable filter head 130 for connecting tubing 125B via a suitable adapter 131 (e.g., a national pipe thread (NPT) adapter). In an example embodiment, as shown in FIG. 1B, tubing 125A may be connected to filter cartridge 129 via elbow fitting 124. Also, as shown, Tygon tubing may be used to connect inlet valve 126 with check valve 128. It should be appreciated that any suitable valves, tubing, filters, and pumps may be used to deliver a prescribed amount of water to the mixing bottle. Further, the water can be supplied from any suitable plumbing system to a reservoir system (e.g., water supply 113) using a suitable water reserve such as 1, 2, 5, 10, or 20-gallon jugs, or as a system in which the user simply fills a mixing bottle 132, as shown in FIG. 1B, to the appropriate level of water.

Figure 1C:
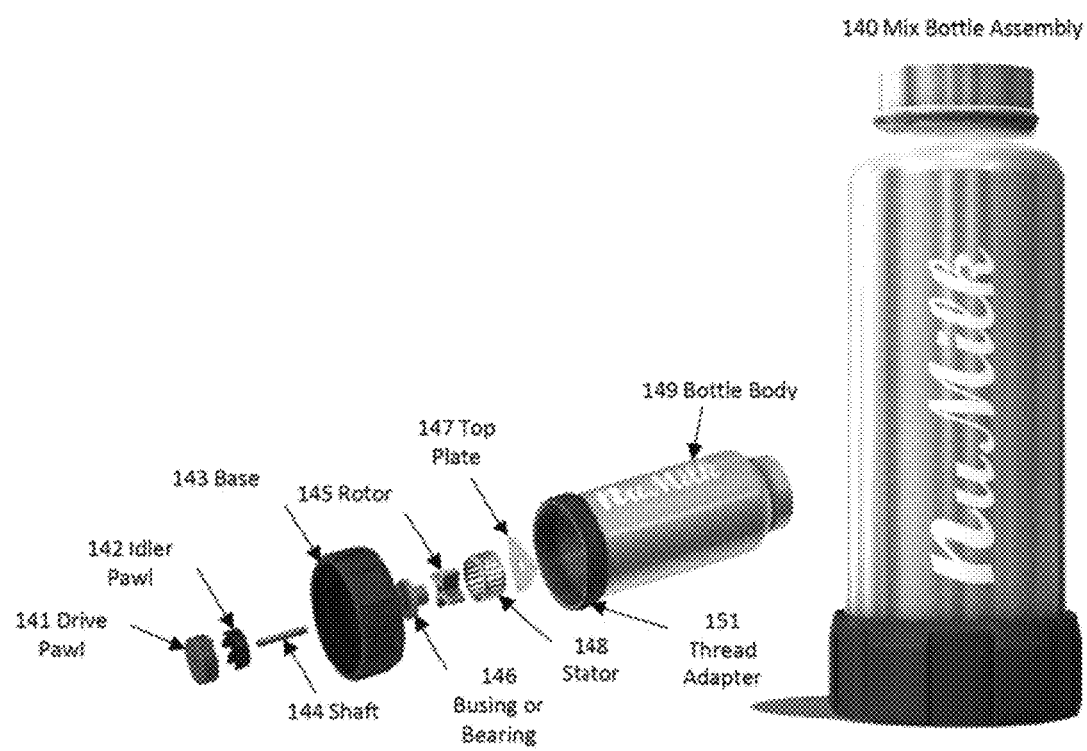
FIG. 1C is an illustrative mixing bottle assembly, consistent with disclosed embodiments.

Some of the details of a mixing bottle assembly 140 are shown in FIG. 1C. For example, mixing bottle assembly 140 may have a bottle body 149 for containing plant-base beverage product and a detachable base 143. The detachable base may include a rotor 145 for mixing. Rotor 145 may be connected to detachable base 143 via a shaft 144. Rotor 145 may utilize bearings (or busing) 146 for reducing the friction of rotating rotor 145. Shaft 144 may connect rotor 145 to idler pawl 142 and a drive pawl 141. The rotor may include a stator 148 and a top plate 147, as shown in FIG. 1C. Stator 148 may be used to reduce the amount of foam due to mixing by rotating rotor 148, and top plate 147 may be used to further control mixing by reducing a vortex resulting from a mixing process. Base 143 may be attached from the body of the mixing bottle via a thread of a thread adapter 151.

In various embodiments, a mixing element, such as rotor 145, may be of several different shapes, including a simple blade mechanism or an emulsification mechanism. In an example embodiment, mixing bottle assembly 140 may include various combinations of rotor 145 and stator 148. For instance, rotor 145 may include a flat top, a cone shape top, or any other suitable top. An example stator may have various shaped cutouts such as slots, circles, angles, stars, or others. The mixing elements (e.g., rotor 145, stator 148, shaft 144, top plate 147, bearings 146, base 143, drive pawl 141, idler pawl 142, etc.) can be made from a wide range of materials such as stainless steel and food-grade plastics.

In various embodiments, using a rotating rotor, such as rotor 145, may be one approach for mixing plant-based paste and water to obtain the plant-based milk. Alternatively, any other suitable devices may be used for mixing. For example, a vortex mixer, or a vortexer, may be used. In an example embodiment, the vortex mixer may be connected to an electric motor with a drive shaft oriented vertically and attached to a cupped rubber piece mounted slightly off-center. As the motor runs, the rubber piece may oscillate rapidly in a circular motion. When a bottom of a mixing bottle 150 (mixing bottle 150 is shown, for example, in FIG. 1D) is pressed into the cupped rubber piece (or touched to its edge), the motion is transmitted to the liquid inside bottle 150 and a vortex is created. In an example embodiment, the vortex mixer may be designed to have a variable speed setting ranging from 100 to 3,200 rpm and can be set to run continuously or to run only when downward pressure is applied to the rubber piece.

Other approaches for mixing the base and water to obtain a plant-based beverage may include systems that contain no mixing elements. Such systems may use a motor to spin a mixing bottle along an offset axis (orbital motion), to move the mixing bottle from one side to another, or up and down (linear motion), or move the mixing bottle in a rocking motion along a center axis. As mentioned, such systems may mix the base and water without the use of internal mixing elements. Further, these systems may be used with both specialized bottles as well as some off-the-shelf bottles. In these systems, the shape of the mixing bottle may have an impact on the mixing. For example, the mixing bottles may include internal structures to aid in the mixing of the plant-based beverage. For example, internal structures may include internal ribs or fins for mixing the plant-based beverage while the mixing bottle is being moved, rocked, shacked, or span.

Figure 1D:
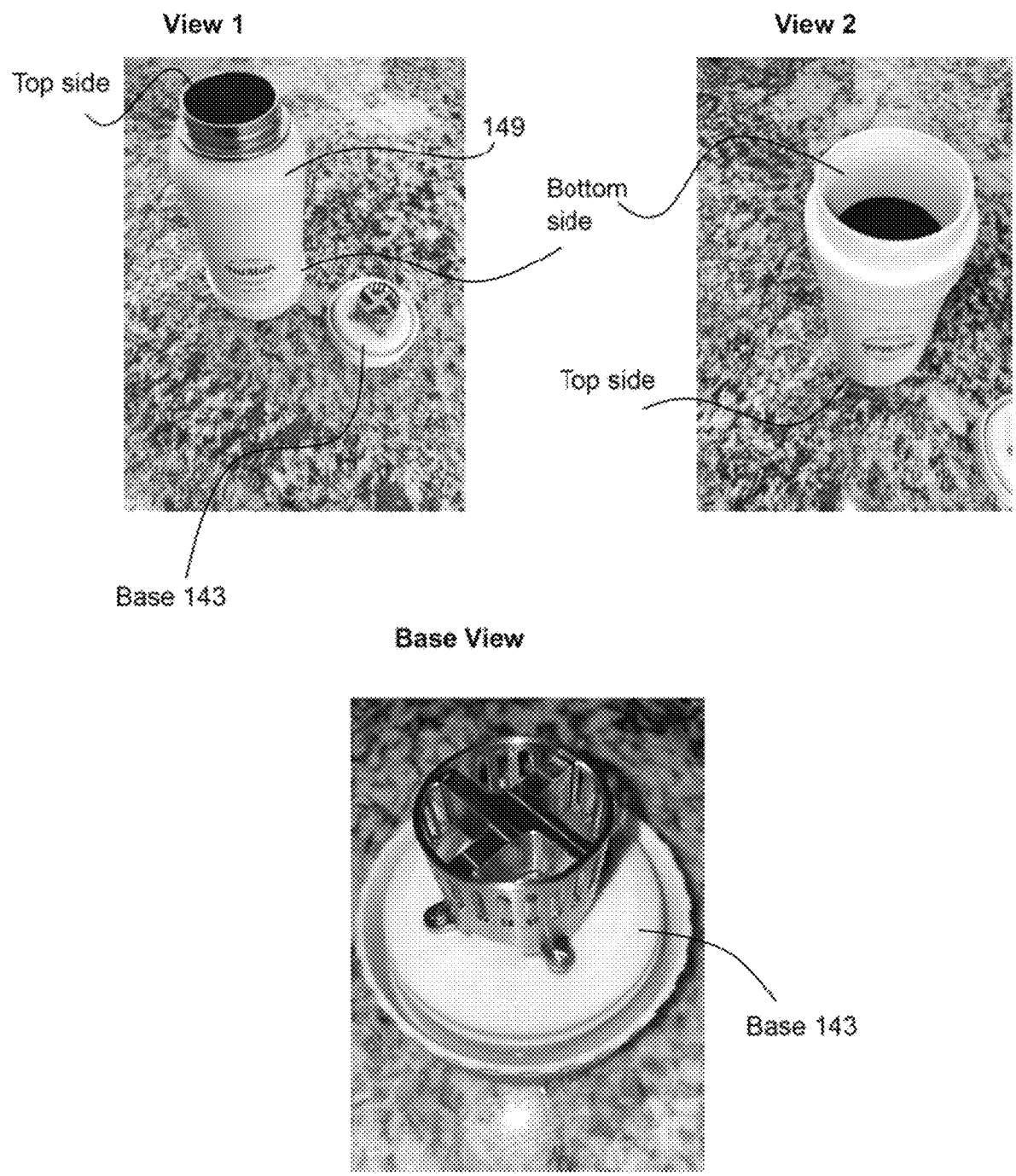
FIG. 1D shows various views of an example mixing bottle, consistent with disclosed embodiments.

FIG. 1D shows various views of example mixing bottle body 149 (also herein simply referred to as bottle 149), consistent with disclosed embodiments. For example, FIG. 1D, view 1, shows bottle 149 having the top and the bottom side. Bottle 149 is shown with a removable base 143 (removable base is shown next to mixing bottle 150). FIG. 1D, view 2 shows mixing bottle 149 placed such that the bottom side points upwards (as indicated in FIG. 1D, view 2). FIG. 1D, base view, shows details of base 143. As described before, base 143 may include rotor 145 and stator 148. In various embodiments, system 101 may be configured to accept mixing bottles of various sizes and shapes. For instance, system 101 may accept tall mixing bottles, short mixing bottles, narrow mixing bottles, wide mixing bottles, or combinations thereof. In some cases, some mixing bottles may be configured for a single serving of a plant-based beverage, while other mixing bottles may be configured for more than one serving.

Figure 1E:
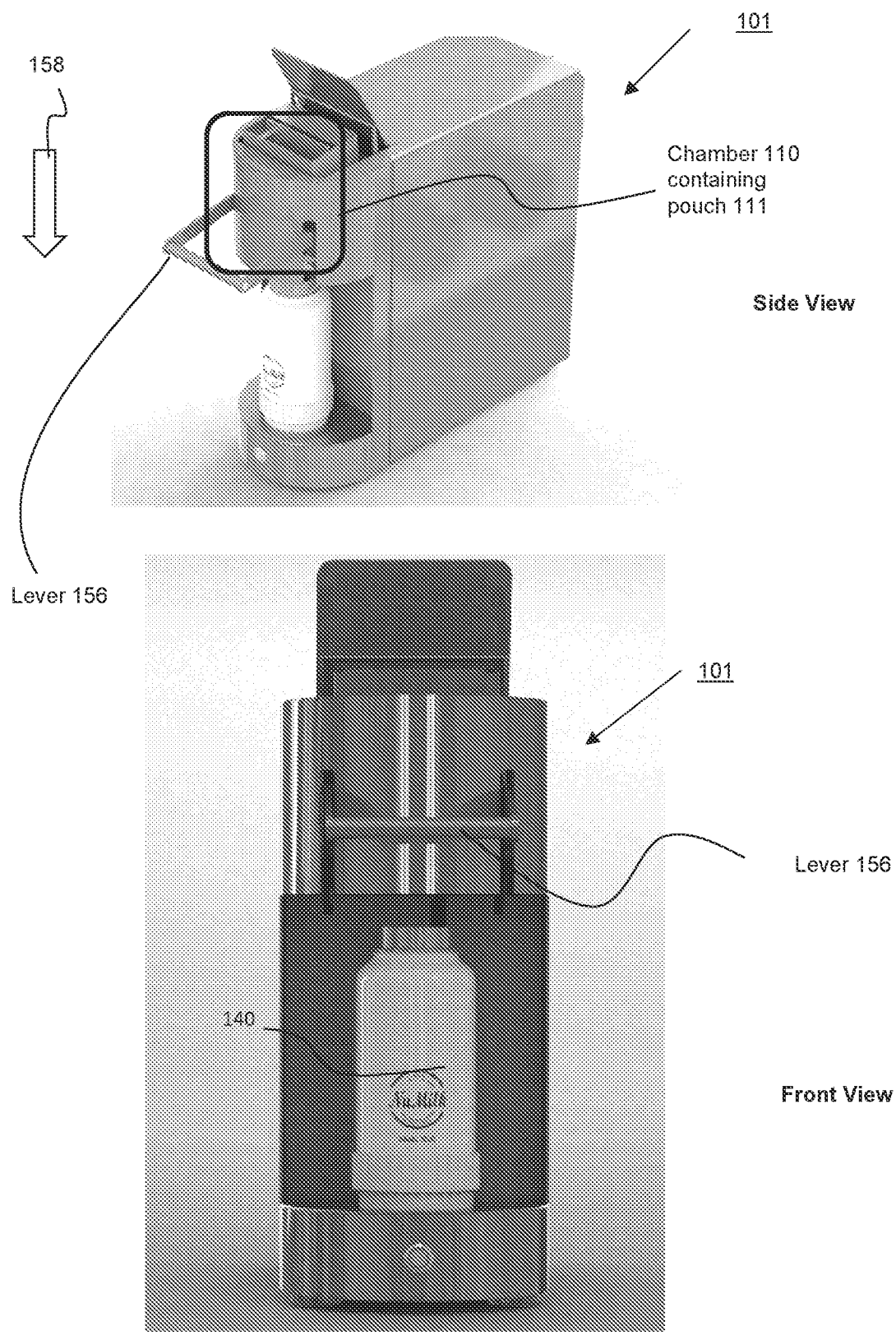
FIG. 1E is another view of an illustrative system for forming a dispensing a plant-based milk, consistent with disclosed embodiments.
Figure 1F:
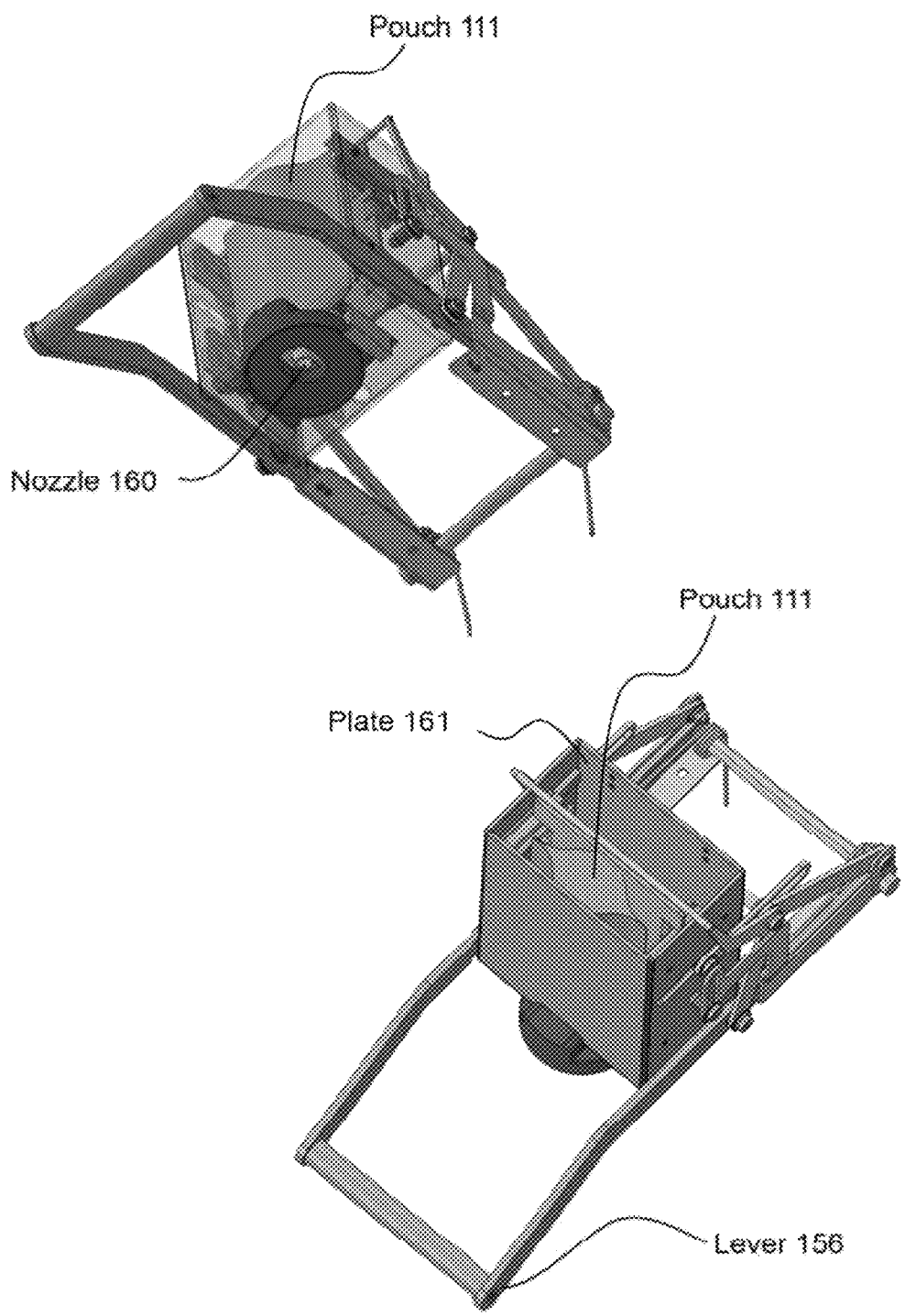
FIG. 1F shows an example chamber for holding a pouch for plant-based paste, consistent with disclosed embodiments.

FIG. 1E shows a side view and a front view of system 101 for forming dispensing plant-based milk, consistent with disclosed embodiments. System 101 may include chamber 110 containing pouch 111. In an example embodiment, chamber 110 may include a lever 156 that may be used to extract plant-based paste from pouch 111. For example, FIG. 1F shows views of chamber 110 with lever 156 configured to press on pouch 111 with plate 161. When lever 156 is lowered (as shown by arrow 158 depicted in FIG. 1E), plate 161 may move towards pouch 111 and exert a force on pouch 111, resulting in the extraction of plant-base paste through a nozzle 160 of pouch 111 (as shown in FIG. 1F). The lowering of lever 156 may create pressure within pouch 111 sufficient to rupture a seal closing pouch 111. Further, the pressure in pouch 111 created due to pressure from plate 161 may be used to extract plant-base paste from pouch 111.

Figure 1G:
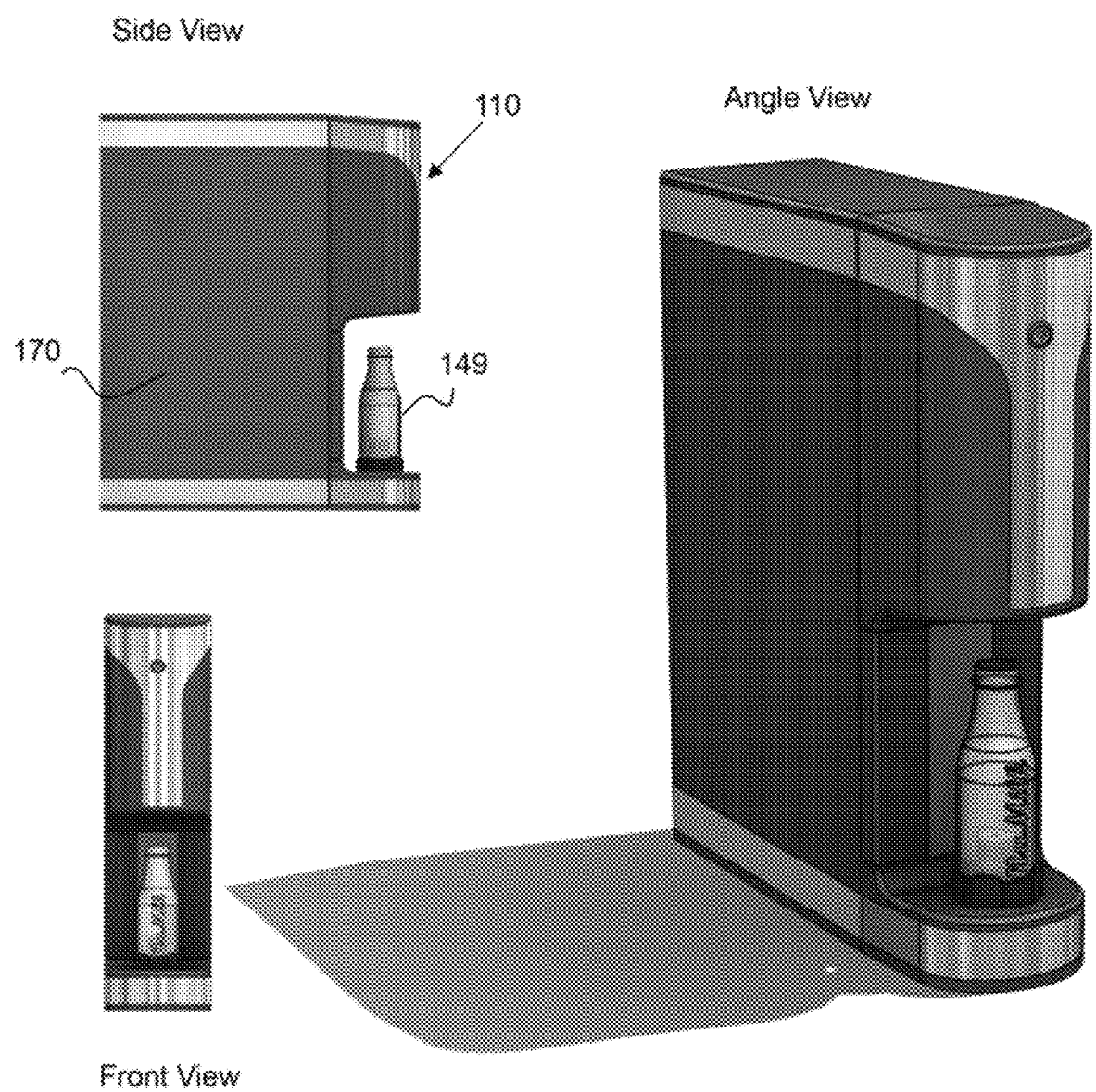
FIG. 1G shows several views of an illustrative system for forming a dispensing a plant-based milk, consistent with disclosed embodiments.

FIG. 1G shows various views, such as side view, angle view, and front view of system 101. As shown, bottle assembly 140 may be placed in a front portion of system 101. Chamber 110 may be positioned above bottle assembly 140, and body 170 of system 101 may contain various elements of system 101, such as, for example, water supply 113, compressor 114 (as shown in FIG. 1A), motor 118, or any other suitable element needed for the operation of system 101.

Figure 2:
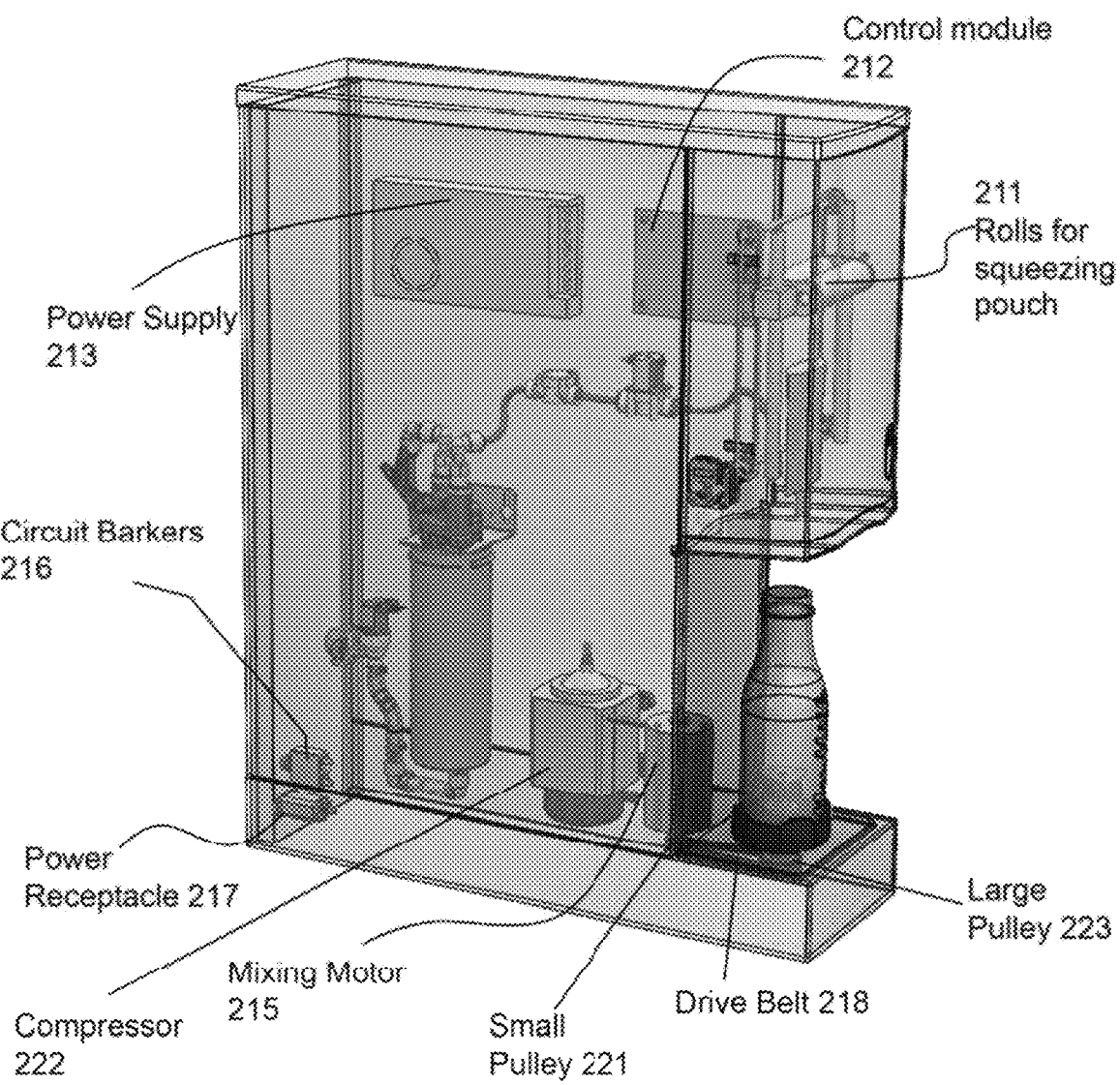
FIG. 2 is another illustrative system for forming a dispensing a plant-based milk, including mixing of the plant-based milk, consistent with disclosed embodiments.

FIG. 2 shows further details of system 101 (also referred to herein as system 101). In an example embodiment, system 101 may include a power supply 213 that may be any suitable power supply (e.g., battery, rechargeable battery, AC power supply, DC power supply, and the like), a control printed circuit assembly (PCA) module 212, a system for squeezing a pouch containing the base (e.g., rolls 211), circuit breakers 216 for preventing circuit malfunction, power surge, and the like, power receptacle 217, mixing motor 215 for activating a mixing element (e.g., rotor 145 as shown in FIG. 1C, located within mixing bottle assembly 140), a small pulley 221 connected to motor 215, and a large pulley 223 that may be connected to drive pawl 141, as shown in FIG. 1C. Large pulley 223 may be connected to small pulley 221 via drive belt 218.

Figure 3A:
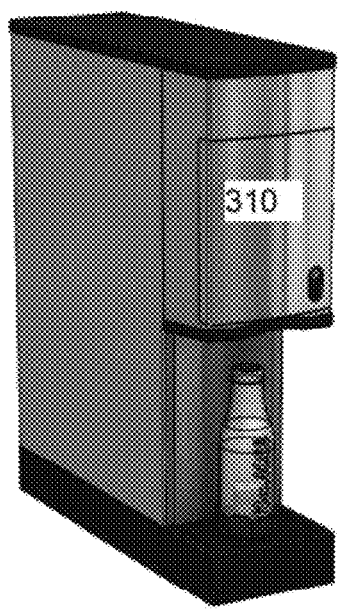
FIGS. 3A-3E are illustrative systems having chambers for holding a pouch for plant-based paste, consistent with disclosed embodiments.
Figure 3B:
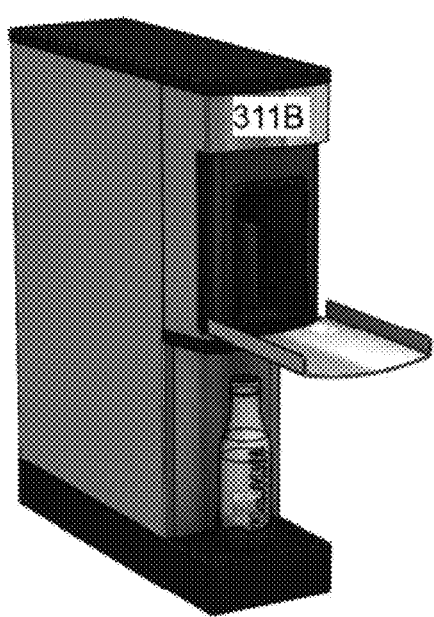
Figure 3C:
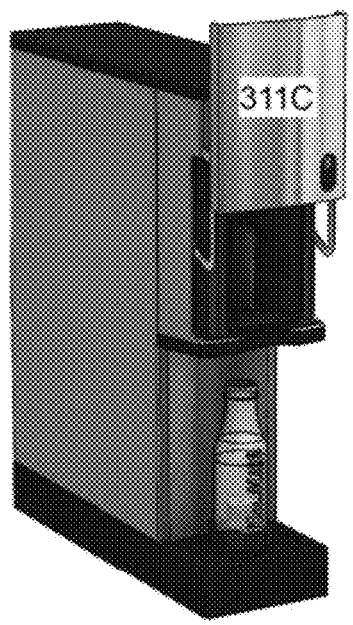
Figure 3D:
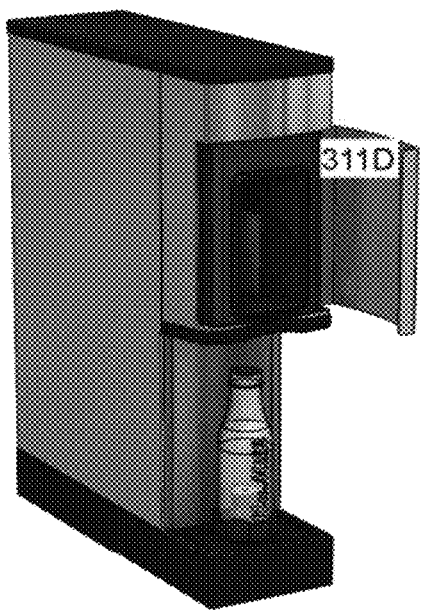
Figure 3E:
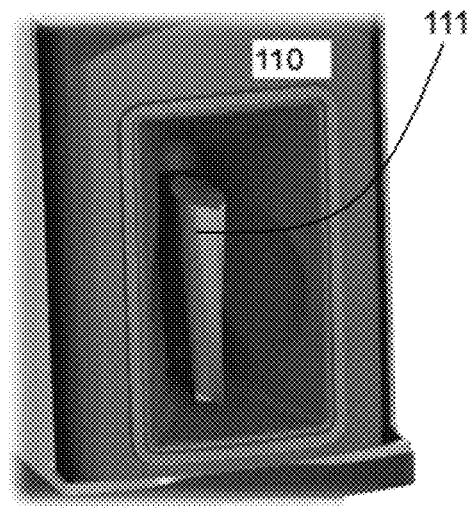

FIGS. 3A-3E are illustrative machines 101 (herein also referred to as systems 101) having chambers for holding a pouch for plant-based paste, consistent with disclosed embodiments. In example embodiments, a chamber may have a door 310, which may be configured to open in various ways (e.g., open chamber doors 311B-311D are shown in FIGS. 3B-3D chamber doors). FIG. 3E shows an example embodiment of a chamber 110 for holding pouch 111. In various cases, chamber 110 is designed to receive pouch 111 (e.g., system 101 may be configured to have a user place pouch 111 into chamber 111) and have a mechanism for extracting base from pouch 111 (e.g., by squeezing pouch 111). Various embodiments for extracting base from pouch 111 are further discussed below. In various embodiments, chamber 110 may contain removable features, such as removable inserts to enable cleaning of chamber 110 if a spill of the base occurs. An example removable insert may include a silicone or a plastic insert configured to be removable for cleaning. Alternatively, an entire chamber 110 may be configured to be removable for cleaning.

Figure 4A:
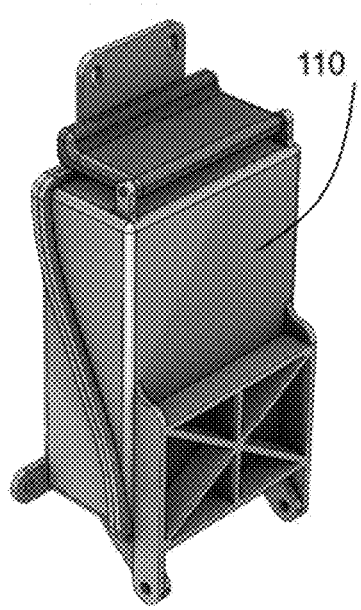
FIGS. 4A-4C are illustrative chambers for holding a pouch for plant-based paste, consistent with disclosed embodiments.
Figure 4B:
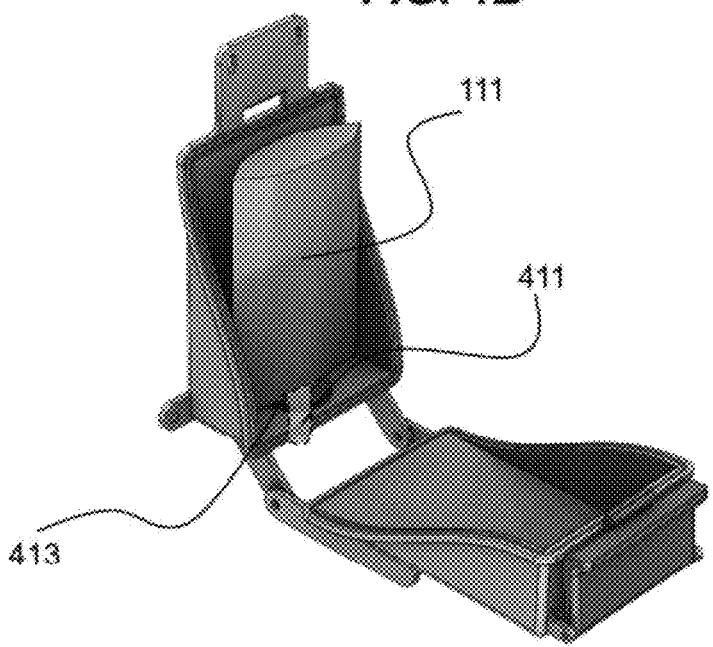
Figure 4C:
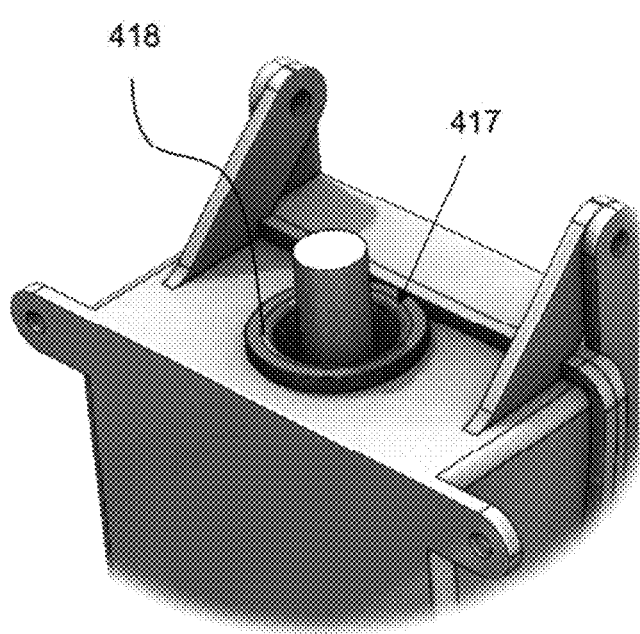
Figure 4D:
FIG. 4D is a compressor for providing pressure for squeezing a pouch for plant-based paste, consistent with disclosed embodiments.

Example embodiments of chambers 110 are further illustrated in FIGS. 4A-4C. FIG. 4A shows an example of a closed chamber 110, and FIG. 4B shows open chamber 110. In an example embodiment, chamber 110 may hold pouch 111, which may have a nozzle 411. Pouch 111 may be placed such that nozzle 411 is inserted into an opening 417. In an example embodiment, opening 417 may include an airtight seal 418 around nozzle 411, as further illustrated in FIG. 4E. Chamber 110 may be configured to be airtight when closed and have air being pumped into a chamber via a compressor (as shown in FIG. 4D). The air pressure within chamber 110 may be configured to apply pressure on pouch 111 and squeeze base from pouch 111. In various embodiments, pouch 111 may be made from any suitable flexible material (e.g., plastic, paper, and the like) that can be easily deformable due to pressure applied over pouch 111. In various embodiments, nozzle 411 may include a seal that can be broken when pressure is applied to pouch 111, allowing the base to flow from pouch 111.

Figure 4E:
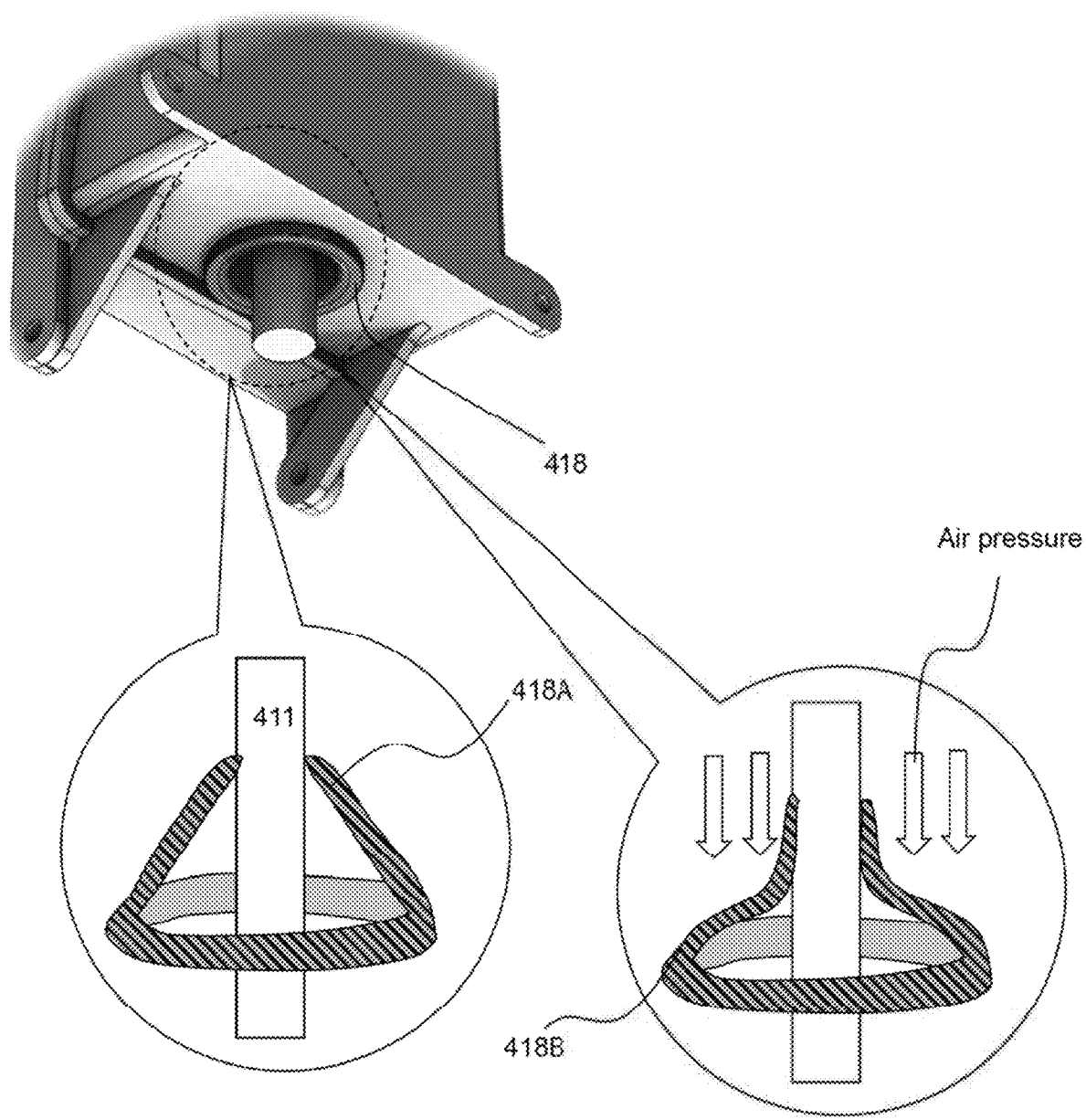
FIG. 4E is an illustrative seal for preventing air from escaping a chamber, consistent with disclosed embodiments.

FIG. 4E shows an example of seal 418 for chamber 110 to prevent air from leaking through chamber 110 when it is being pressurized. In an example embodiment, seal 418 may have a cross-sectional shape 418A, with nozzle 411 inserted through the seal. The seal may be formed from any suitable material (e.g., rubber, plastic, and the like). Under the application of air pressure (shown by arrows), a seal may change shape as shown by cross-sectional area 418B tightly connecting with nozzle 411 and preventing air from escaping chamber 110.

Figure 4F:
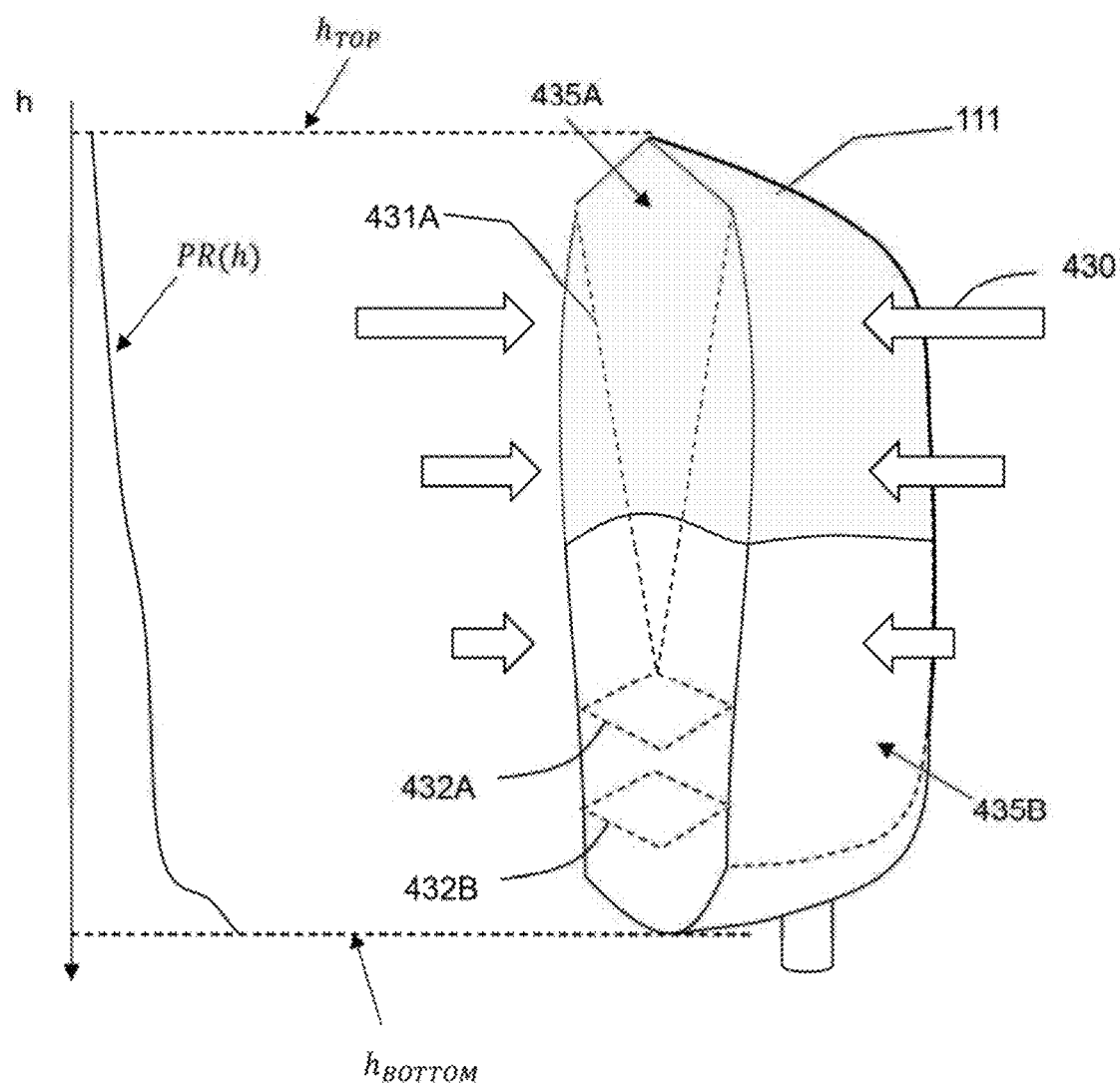
FIG. 4F shows an example embodiment of a pouch, consistent with disclosed embodiments.

FIG. 4F shows an example embodiment of pouch 111 that may be used for clamber 110, as shown in FIG. 4B. In an example embodiment, pouch 111 may be designed to start collapsing from a top portion 435A of pouch 111 as pressure (indicated by arrows 430) is applied to pouch 111. Pouch 111 may finish collapsing at the bottom portion 435B of pouch 111. In an example embodiment, pouch 111 may be configured to be more readily collapsible in the proximity of portion 435A and less readily collapsible in the proximity of portion 435B. For example, pouch 111 may include softer flexible material (e.g., a softer plastic or paper material) in portion 435A and harder flexible material in portion 435B. In an example embodiment, a material forming pouch 111 in portion 435A may be thinner than a material forming pouch 111 in portion 435B. In some cases, internal structures (e.g., plastic trusses, or any other pressure resisting elements, as schematically indicated by elements 432A and 432B, may be incorporated in region 435B to prevent pouch 111 from collapsing in that region prior to pouch 111 collapsing in region 435A. In an example embodiment, pressure resisting element 431A may also be incorporated in region 435A, and element 431A may be less resistant to pressure than elements 432A or 432B. In some cases, a single pressure resisting element may be incorporated into pouch 111 with pressure resisting properties varying along a height h of pouch 111 (height coordinate h for pouch 111 is shown in FIG. 4F). In an example embodiment, curve PR(h) may be a pressure resisting curve for pouch 111 indicating how well pouch 111 resists to pressure at different values of height h. For instance, as shown in FIG. 4F. PR(h) for high values of h may be smaller than PR(h) for lower values of h. In an example embodiment, PR(h) may be a monotonically increasing function as h decreases. $PR(h_{TOP})$ may be a few or a few tens of percent higher than $PR(h_{BOTTOM})$, where $h_{TOP}$ and $h_{BOTTOM}$ are as shown in FIG. 4F. In addition, a pouch with a nozzle and some form of a check valve, a duck bill valve, or other feature within the nozzle may be used to prevent the base from dripping before it is intended to.

Figure 4G:
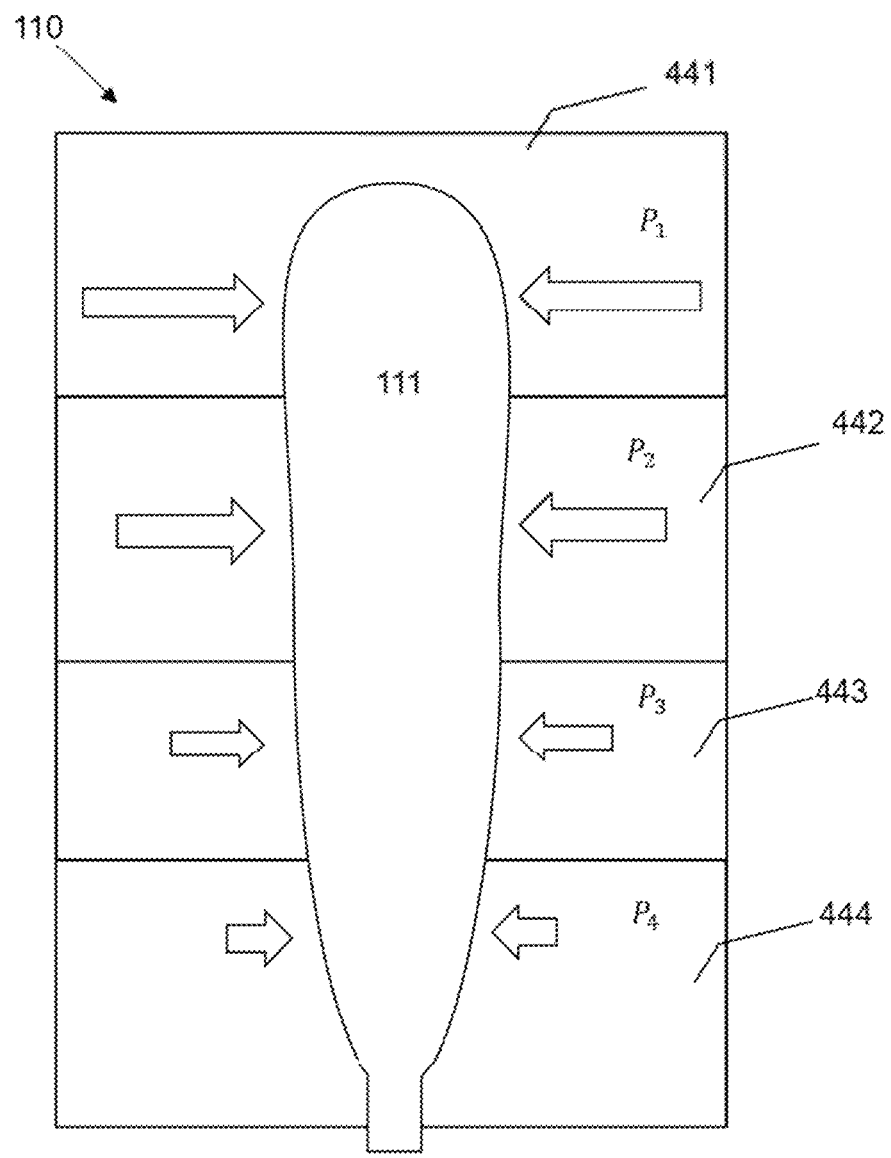
FIG. 4G shows an example embodiment of a chamber for holding a pouch, consistent with disclosed embodiments.

In an example embodiment, chamber 110 may be configured to provide higher pressure over a top portion (e.g., over region 435A) of pouch 111 than over a bottom portion (e.g., over region 435B) of pouch 111. Such a distribution of pressure is indicated by unevenly sized arrows 430 with longer arrows corresponding to a higher pressure. In an example embodiment, such pressure distribution may be achieved by requiring chamber 110 to have multiple sections fluidly disconnected from one another as, schematically indicated in FIG. 4G, by regions 441-444. In an example embodiment, regions 441-444 may support corresponding pressures $P_1$-$P_4$, wherein $P_1 \geq P_2 \geq P_3 \geq P_4$. Regions 441-444 may be fluidly disconnected, such that each region is capable of maintaining an independent pressure (herein, the pressure may be caused by compressor 114 pressurizing regions 441-444 using compressed gas such as air). Alternatively, a passage for gas (air) may be allowed between regions 441-444 with the flow of gas controlled between these regions (e.g., the flow of gas may be controlled using valves, such as check valves (e.g., Schrader or Presta valves)).

Figure 5A:
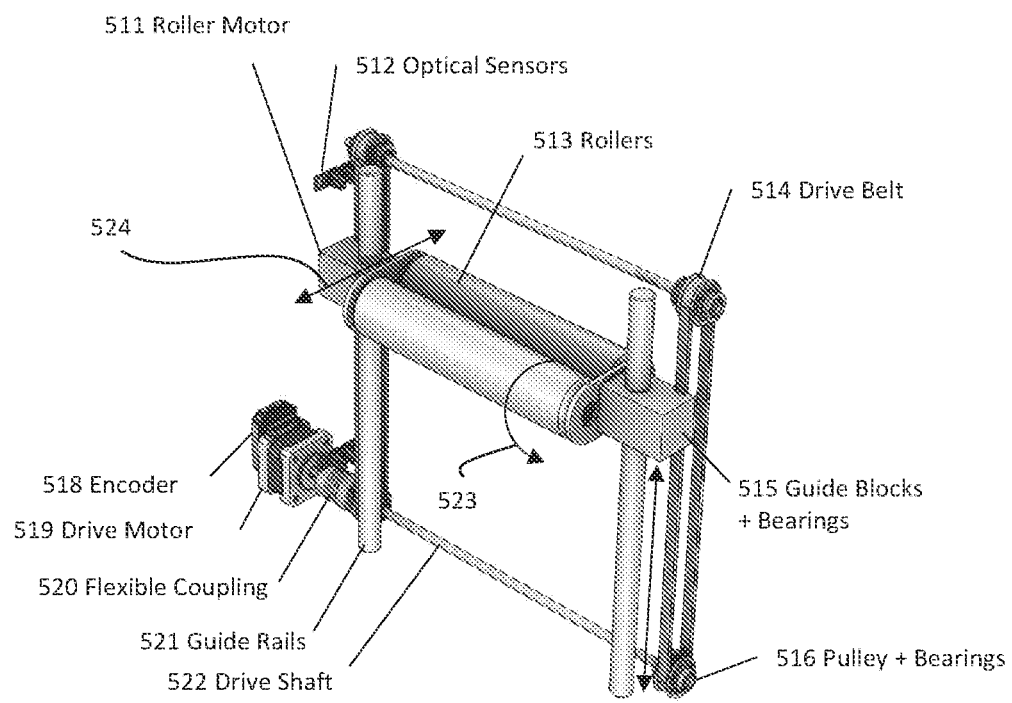
FIGS. 5A-5B show example mechanisms for squeezing a pouch for plant-based paste, consistent with disclosed embodiments.
Figure 5B:
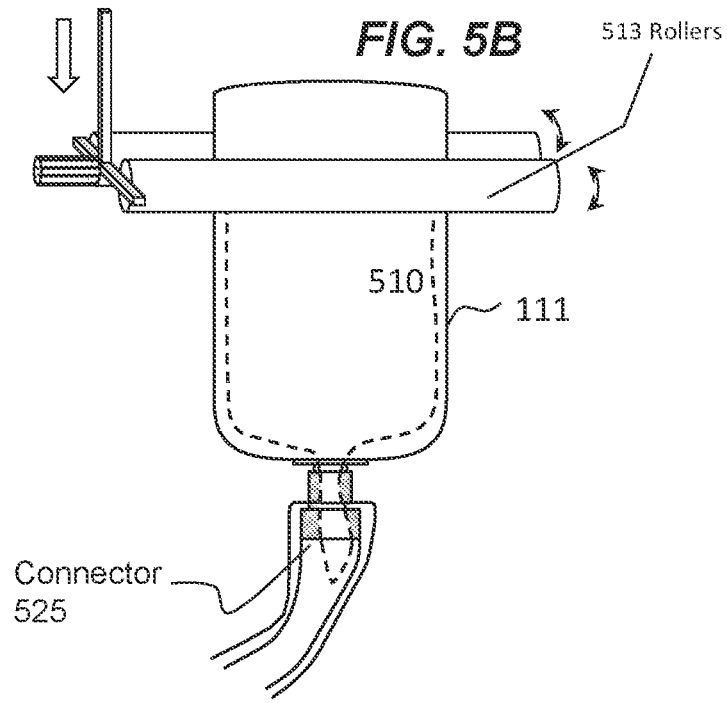

Applying air pressure may be one possible approach for extracting base from pouch 111. Alternatively, or additionally, a roller assembly 501 may include rollers 513, as shown in FIGS. 5A and 5B, for extracting base. Rollers 513 may be rotated by appropriate drive motor 519 having suitable elements, such as 516 pulleys and bearings, a flexible coupling 520, guide rails 521, and a drive shaft 522 for engaging moving rollers 513 in a vertical direction. In an example embodiment, an encoder 518 may be configured to receive electrical signals from a processor to drive motor 519. Roller assembly 501 may include a drive belt 514 configured to move guide block(s) 515 (in an embodiment, guide block may contain bearings) along guide rails 521, as shown in FIG. 5A. Further, roller assembly 501 may include a roller motor 511 for spinning rollers 513, as indicated by arrow 523. In an example embodiment, roller motor 511 may be configured to spin both rollers 513 (or, in some cases, only one roller may be configured to spin). Optical sensors 512 may be used to determine the vertical position of rollers 513 as well as the speed of revolution of one or more rollers 513. In various embodiment, assembly 501 may include additional motor 519 and 511 controllers, as well as means for rollers 513 to travel along a three-dimensional trajectory. In an example embodiment, the three-dimensional trajectory may be achieved by moving rollers 513 both vertically and laterally. For example, rollers 513 may have a degree of freedom indicated by arrow 524, allowing rollers 513 to move in a horizontal (i.e., lateral direction). FIG. 5B shows an example placement of pouch 111 between rollers 513 for extracting base 510 from pouch 111 to a bottle via a connector 525. Rollers 513 may be configured to move in a direction from the top of pouch 111 towards the bottom of pouch 111, allowing for squeezing the base out of pouch 111. In some cases, rollers 513 may move from the top of pouch 111 to the bottom of pouch 111 several times to squeeze the appropriate amount of base. The separation distance between the rollers may be controlled by roller motor 511, which may have appropriate gears and one or more belts. The separation distance may be controlled via an optical sensor 512. Rollers 513 may be configured to slide down and up using guide rails 521, as shown in FIG. 5A. The sliding motion for rollers 513 may be accomplished via drive motor 519 connected to drive shaft 522 using flexible coupling 520. Drive shaft 522 may be connected to pulleys 516 and drive belt 514, as shown in FIG. 5A. In various embodiments, encoder 518 may communicate control signals that determine the motion of rollers 513 (e.g., the vertical motion of rollers 513, the rotational speed of rollers 513, and separation for rollers 513). In some cases, various parameters for the rollers may be controlled simultaneously (e.g., rollers may move down and have a separation between the rollers decreasing as the rollers move).

Figure 5C:
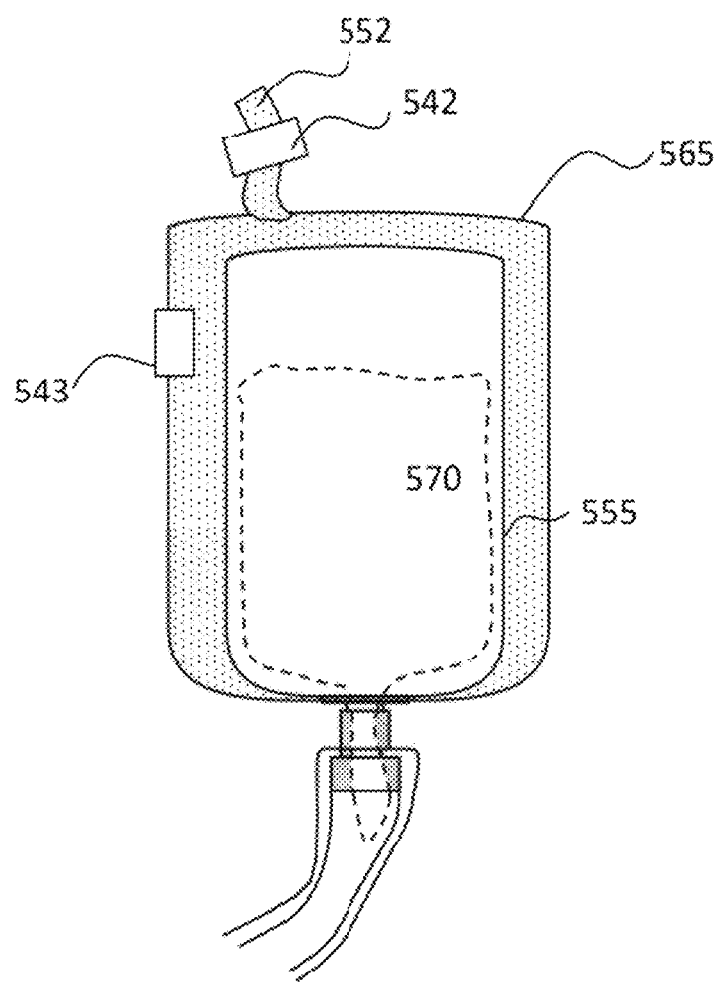
FIG. 5C shows an example configuration of a chamber for holding more than one pouch, where a first pouch is inserted within a second pouch, consistent with disclosed embodiments.

FIG. 5C shows a pouch 555 that may be located within another pouch 565, and base 570 may be squeezed from pouch 555 by establishing pressure in pouch 565. In an example embodiment, the pressure within pouch 565 may be established by pumping gas (e.g., air) into pouch 565 via valve 542 of connection 552. In various embodiments, valve 542 may be a one-way valve allowing air to enter pouch 565 but not exit pouch 565. In an example embodiment, pouch 565 may have a release valve 543 for releasing air from pouch 565 when necessary.

Figure 5D:
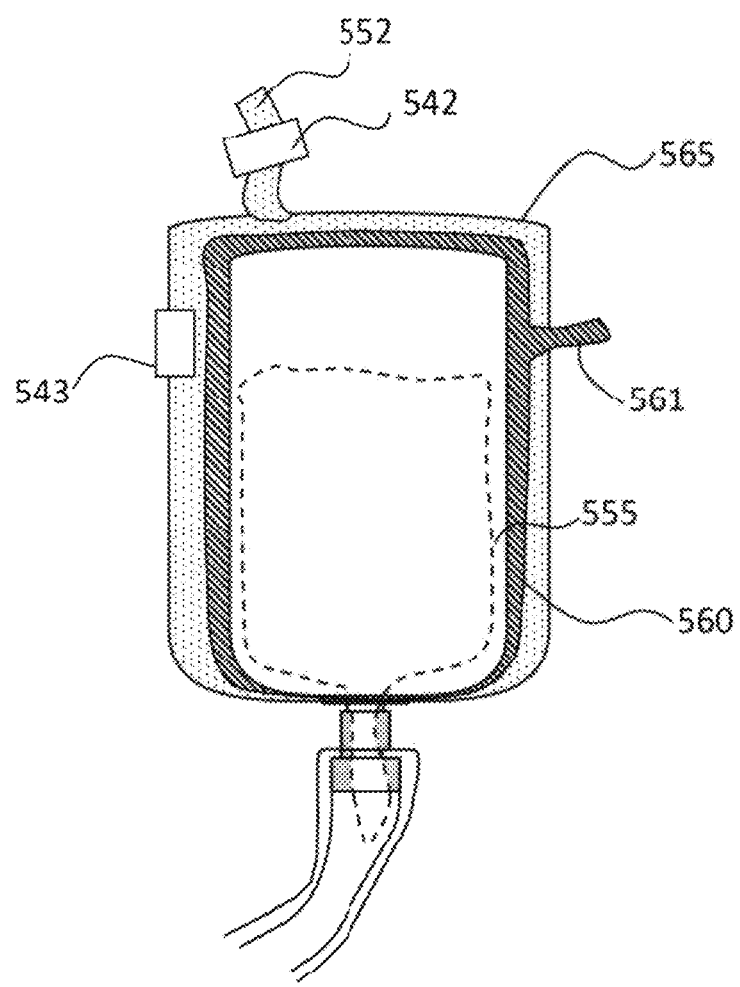
FIG. 5D shows an example embodiment of a chamber for holding multiple pouches, consistent with disclosed embodiments.

In some embodiments, pouch 555 may be configured to be cooled to prevent or inhibit the separation of constituent components of the material in pouch 555 (e.g., of plant-based paste). Pouch 555 may be configured to receive or contact a cooling agent to cause the contents of the chamber to be cooled. Cooling agents may include materials that may facilitate heat transfer to cause the material in pouch 555 to be cooled, such as air, water, a refrigerant, a gas, or a cooling substance (e.g., a cooled gas, liquid, or solid material). In some embodiments, pouch 555 may be combined with, connected to, or located in proximity to a cooling device or component. For example, pouch 555 may be surrounded by a component or container (e.g., a cooling jacket) configured to allow a cooling agent to surround and contact pouch 555 for cooling the contents of pouch 555. In some embodiments, space surrounding pouch 555 may be cooled (e.g., using a refrigeration system) to allow pouch 555 to be positioned in a cooled environment for causing the contents of the chamber to be cooled. For instance, at least a portion of pouch 565 may contain a cooling liquid (e.g., water, water with ice, and the like) configured to cool pouch 555. In an example embodiment, a triple pouch system, as shown in FIG. 5D. For example, in addition to pouches 555 and 565 as described above, an additional pouch 560 may be located between pouch 555 and 565 (such that pouch 555 is inserted within pouch 560, and pouch 560 is inserted within pouch 565). Pouch 560 may include a cooling fluid, such as, for example, water. The water may be circulated in pouch 560 via connector 561, as shown in FIG. 5D.

Figure 5E:
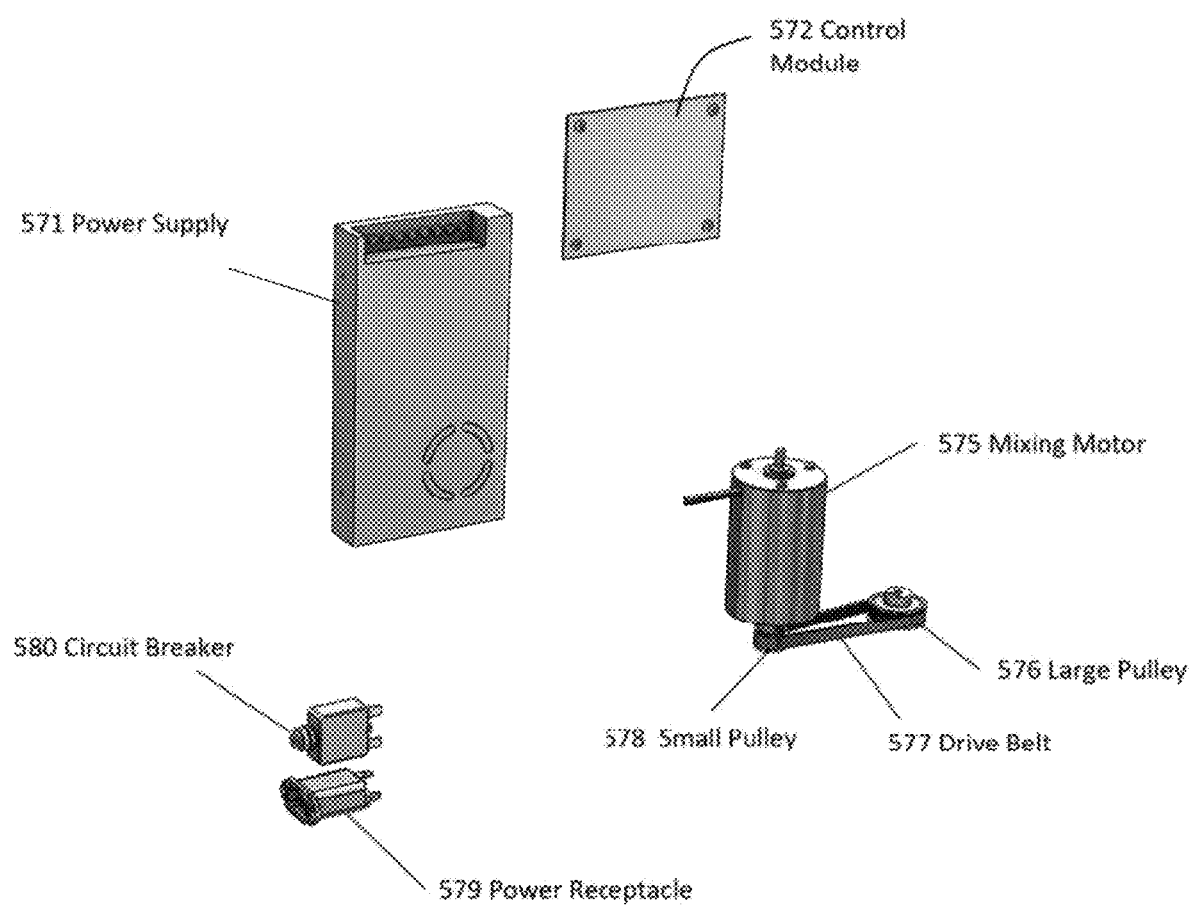
FIG. 5E shows electrical components of system 101, consistent with disclosed embodiments.

FIG. 5E shows electrical components of system 101. In an example embodiment, system 101 may include a power supply 571 (e.g., a battery, or an AC or DC power supply connected to an electrical grid, a mechanically generated power (e.g., generated by a user via a generator), and the like). In an example embodiment, power supply 571 may be connected to an electrical grid via a power receptacle 579. System 101 may include circuit breakers 580 (e.g., circuit breakers 580 may prevent power surges, circuit shorts, and the like). Electrical power from power supply 571 may be used to activate mixing motor 575 (motor 575 may be the same as motor 118, as shown in FIG. 1A) for operating drive pawl 141 (as shown in FIG. 1C). Drive pawl 141, in turn, may operate rotor 145 for mixing contents of mix bottle assembly 140. As shown in FIG. 5E, mixing motor 575 may be connected to a large pulley 576 via a drive belt 577 and a small pulley 578. Large pulley 576 may be connected to drive pawl 141.

In various embodiments, a control module 572 may be used to control various aspects of the operation of system 101. For example, control module 572 may control an amount of water used for making plant-based milk, pumps for pumping water from water supply 113 (as shown in FIG. 1A) to mixing bottle 115, operation of a compressor 114 (e.g., a pressure created by compressor within chamber 110 for extracting base from pouch 111), operation of motor 118 for mixing base and water in mixing bottle 115, operations of motors of roller assembly 501, or any other operations of system 101. In an example embodiment, control module 572 may include a memory unit (e.g., a non-transitory memory) for storing instructions used to operate various components of system 101. Further, control module 572 may be configured to send electrical signals to various components of system 101 to activate those components. In some cases, control module 572 may receive information from various sensors available to system 101 (e.g., sensors of system 101 may include pressure sensors in chamber 110, temperature sensors for water supply 113, temperature sensors in chamber 110, and the like), and based on the received information, may adjust the operation of one or more components of system 101. For example, if a pressure sensor within chamber 110 determines that there is insufficient pressure in chamber 110, module 572 may, via compressor 118, increase the pressure in chamber 110. Similarly, when control module 572 determines that any parameters of system 101 have values outside nominal ranges based on data obtained from various sensors, module 572 may be configured to adjust the operation of one or more components of system 101 to ensure that parameters of system 101 have values within nominal operational ranges. In some cases, module 572 may include a user interface (the user interface may include a touch screen, buttons, and the like) for receiving commands from a user and for reporting operational conditions to the user (e.g., the operational conditions may include data from sensors, or a current step performed by system 101 for making a plant-based beverage). In some cases, a user interface may include a software application installed on a user device (e.g., a smartphone communicated with system 101 wirelessly via any suitable wireless network (e.g., Bluetooth, and the like)).

Figure 6A:
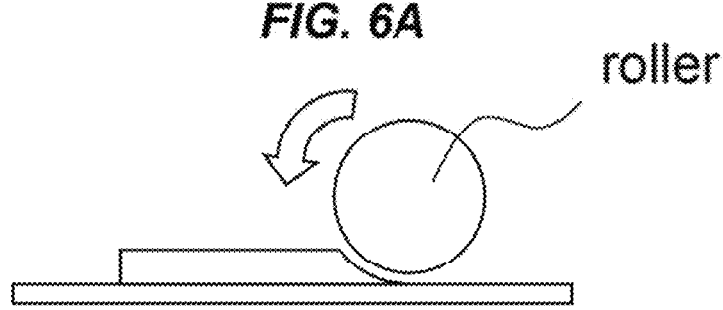
FIGS. 6A-6C show other examples of mechanisms for squeezing a pouch for plant-based paste, consistent with disclosed embodiments.
Figure 6B:
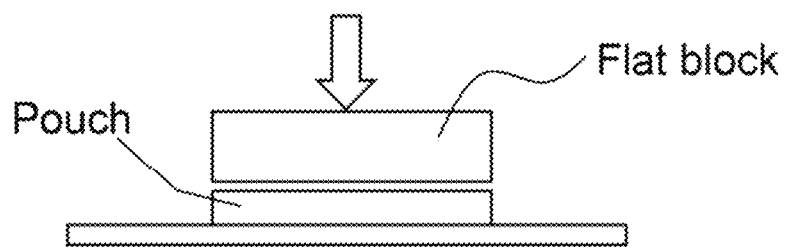
Figure 6C:
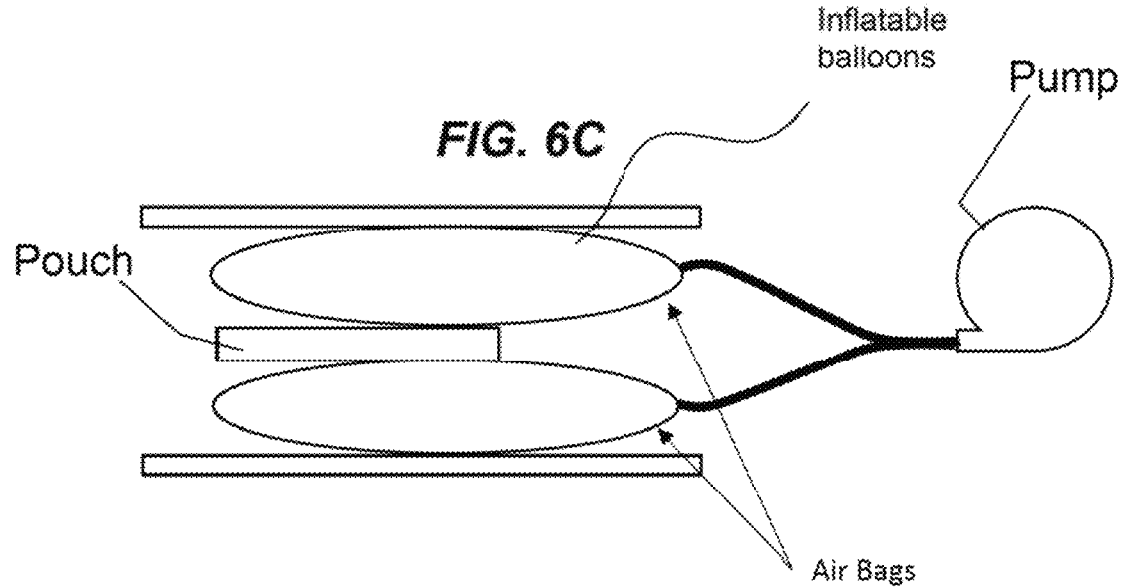
Figure 7:
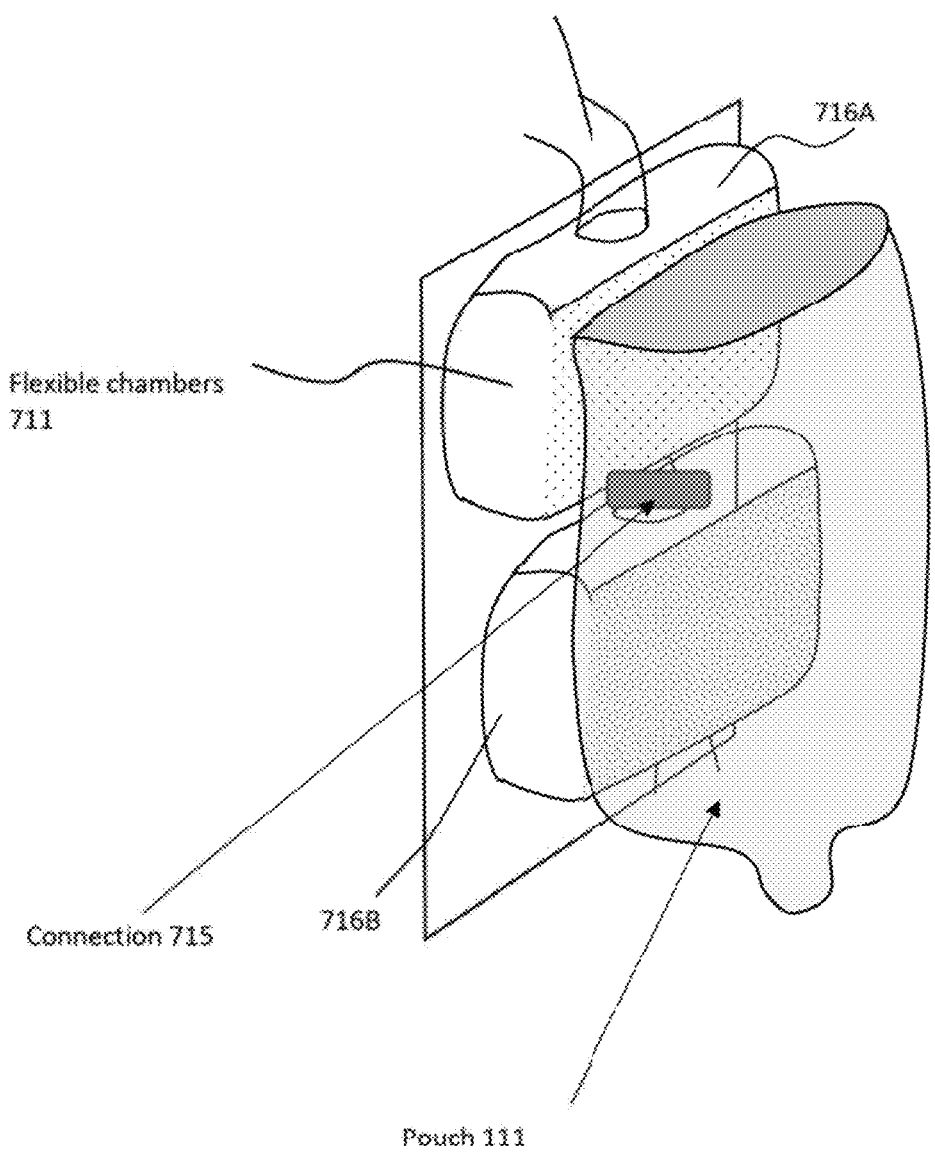
FIG. 7 shows an example mechanism for squeezing a pouch using flexible inflatable chambers, consistent with disclosed embodiments.

FIGS. 6A-6C show various approaches for squeezing an example pouch, including a roller (FIG. 6A), a flat block (FIG. 6B), or inflatable balloons (FIG. 6C). A perspective drawing including inflatable balloons (or flexible chambers 711) is shown in FIG. 7. The chambers are inflated via channel 713. In an example embodiment, flexible chambers 711 may have multiple sections (e.g., section 716A and 716B connected by a valve 715).

Figure 8:
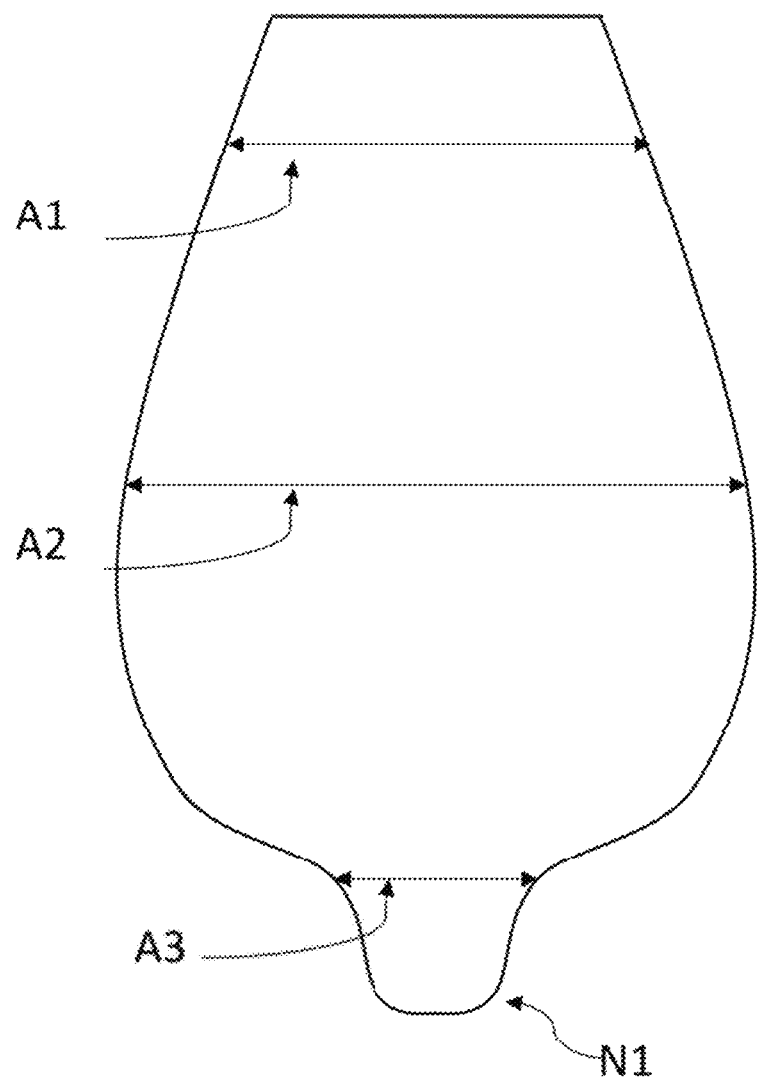
FIG. 8 shows an example shape for a pouch for plant-based paste, consistent with disclosed embodiments.
Figure 9:
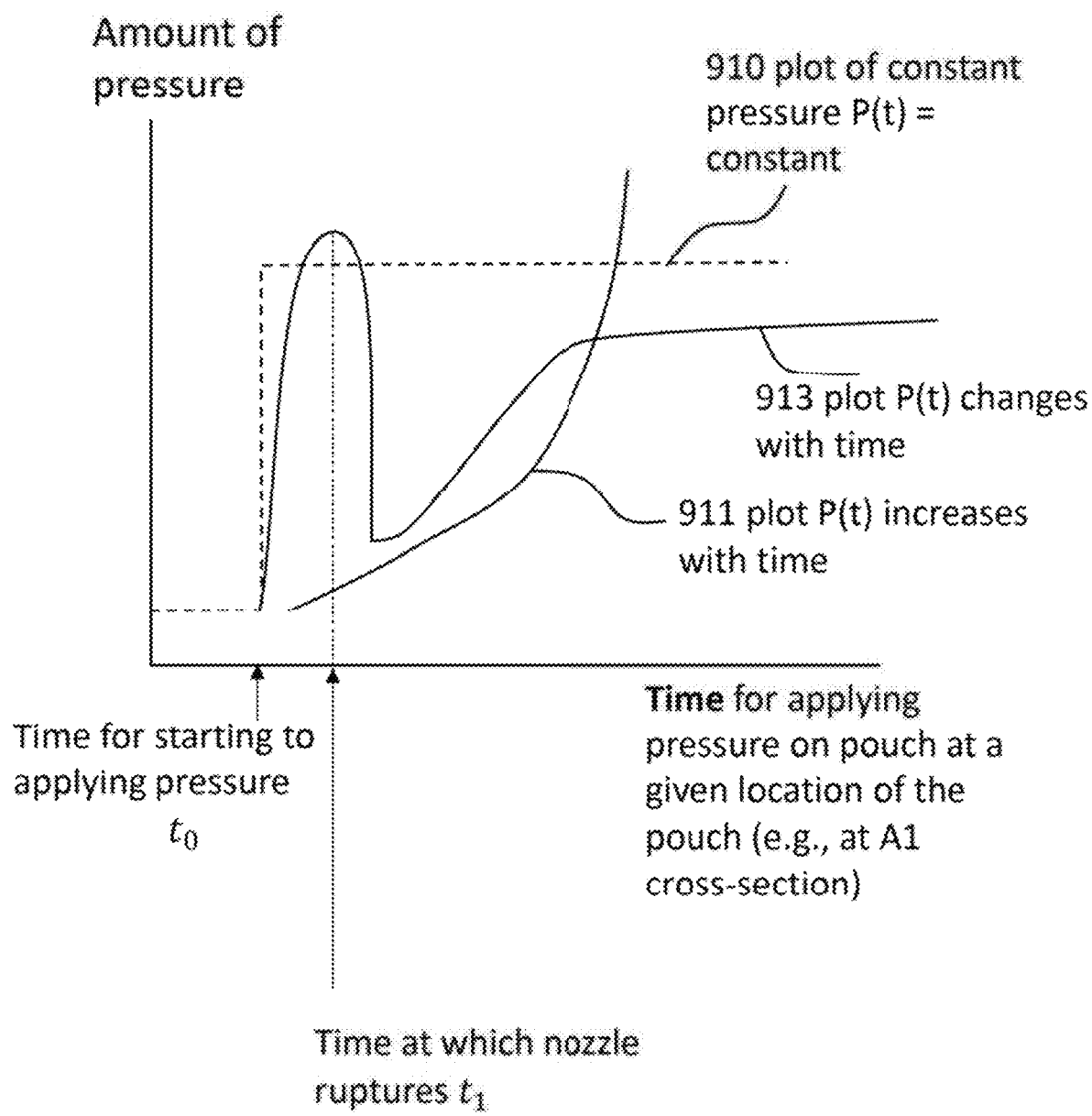
FIG. 9 shows example pressure graphs as a function of time, consistent with disclosed embodiments.

In various embodiments, the shape and size of pouch 111 may be optimized to control a flow rate of a base from pouch 111. For example, the cross-sectional area of pouch 111 may change (as indicated by arrows A1, A2, and A3, and the shape of nozzle N1, as shown in FIG. 8. Further pressure in chamber 111 (or pressure in flexible chambers 711) may be varied as a function of time, as shown in FIG. 9. For example, pressure may be constant (plot 910), may increase as a function of time (plot 911), or may increase to rapture pouch 111 and then decrease (plots 913). Pressure may increase after being decreased (plot 913). In an example embodiment, a pressure may be in a range of 4-20 psi with a possible pressure of about nine psi. In various embodiments, the pressure is selected to rapture the seal. After rapturing the seal, the pressure may be decreased. FIG. 9 shows a point in time to at which pressure is being applied. In an example embodiment, plot 913 shows that pressure is increased until time $t_1$ at which a nozzle of a pouch (e.g., pouch 111) ruptures.

Figure 10:
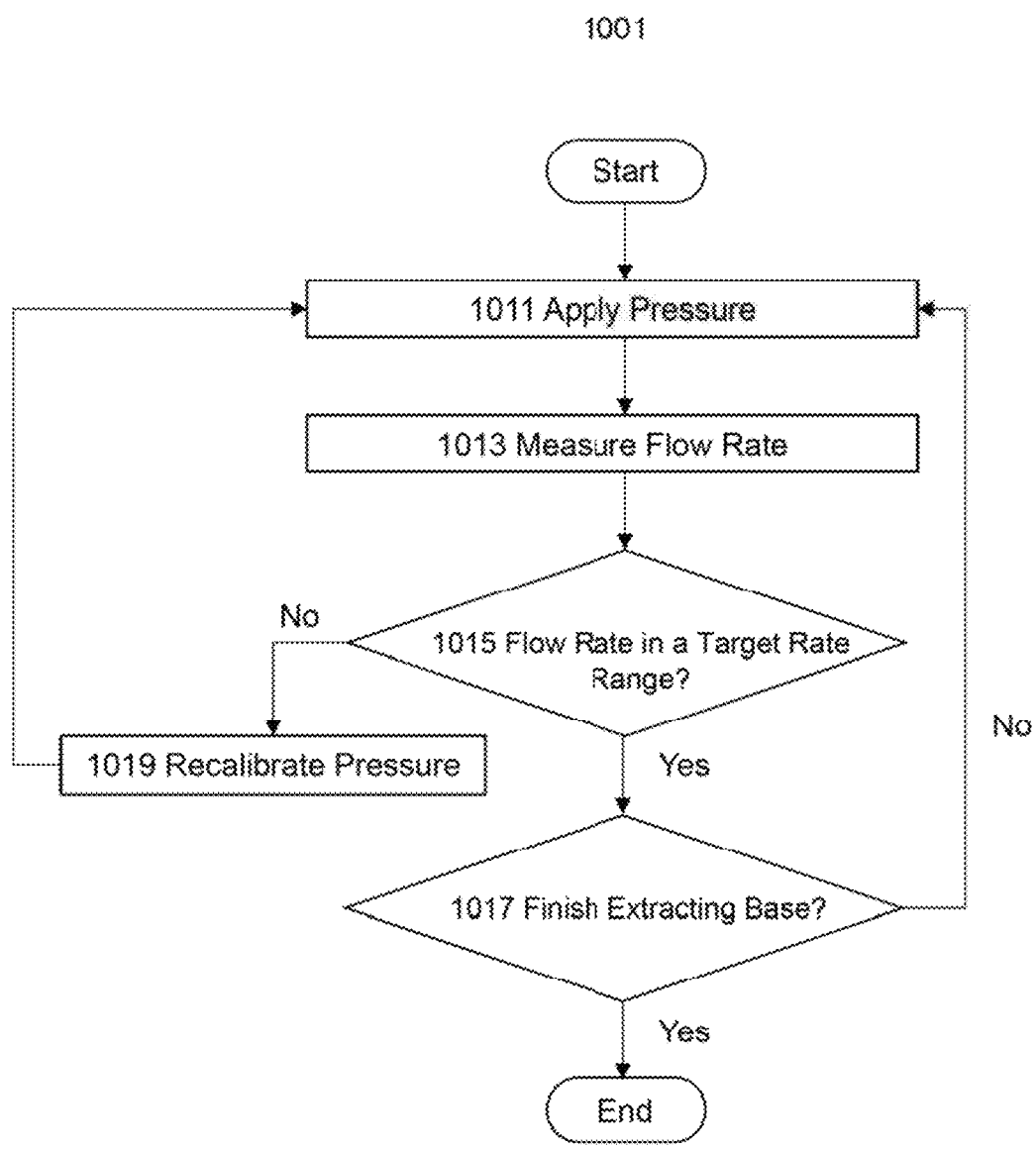
FIG. 10 shows an example process for extracting base from a pouch, consistent with disclosed embodiments.

FIG. 10 shows an example process 1001 for extracting a base from pouch 111, consistent with disclosed embodiments. At step 1011 of process 1001, pressure may be applied to pouch 111 via a pressurized chamber or via an inflatable flexible chamber 711, as shown in FIG. 7. At step 1013, system 101 may be configured to measure a flow rate of the base from pouch 111, and at step 1015, determine if the flow rate is in a target rate range. If the flow rate is in the target rate range (step 1015, Yes), process 1001 may proceed to step 1017 and determine if the base extraction needs to be stopped. If the extraction needs to be stopped (step 1017, Yes), process 1001 may be terminated. If the extraction needs to be continued (step 1017, No), process 1001 may proceed to step 1011, as described above. If the flow rate is not in a target rate range (step 1015, No) process 1001 may proceed to step 1019 and recalibrate the applied pressure to pouch 111. For example, the recalibration may use a linear controller (e.g., if the flow rate is too slow, the pressure may be increased by a predetermined amount, and if the flow rate is too fast, the pressure may be decreased by a predetermined amount). The predetermined amount by which the pressure may be increased or decreased may be established via experimentation, computational simulations, or analytical calculations.

Figures 11A, 11B:
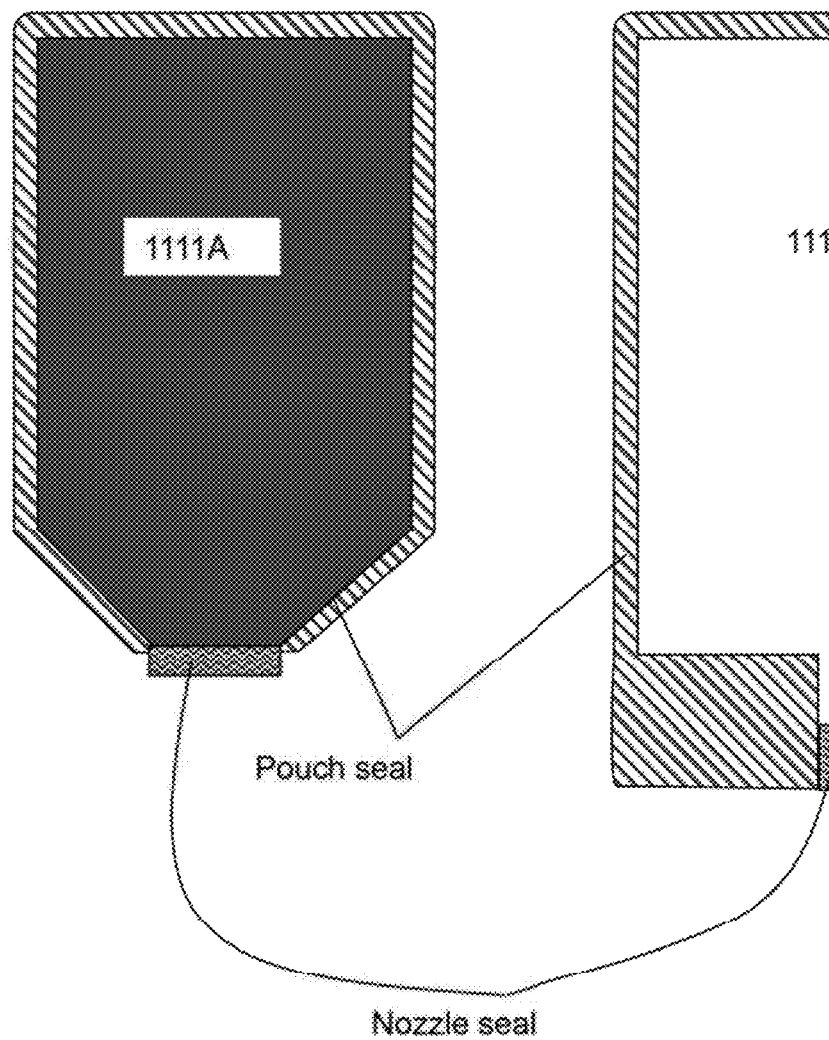
FIGS. 11A and 11B show example pouches, consistent with disclosed embodiments.

FIGS. 11A and 11B show example pouches 1111A and 1111B, consistent with disclosed embodiments. A pouch, as shown in FIG. 11A, may be in the form of a "house," and a pouch in FIG. 11B may be a rectangle. In an example embodiment, a typical width of a pouch may be few inches (e.g., 3-5 inches), and a typical height of a pouch may be in the range of 2-7 inches. A pouch seal (as shown in FIGS. 11A-11B) may be a fraction of an inch (e.g., 3/16 of an inch, few tenths of an inch, and the like). The seal is designed to withstand seal-bursting force resulting in applying pressure on pouches 1111A-1111B. In various embodiments, a seal-bursting force for a nozzle seal, as shown in FIGS. 11A-11B is configured to be smaller than a seal-bursting force for a pouch seal. In an example embodiment, nozzle seal may be made using different approaches (e.g., heat sealing, foil sealing, sealing using glue, and the like).

Figure 12A:
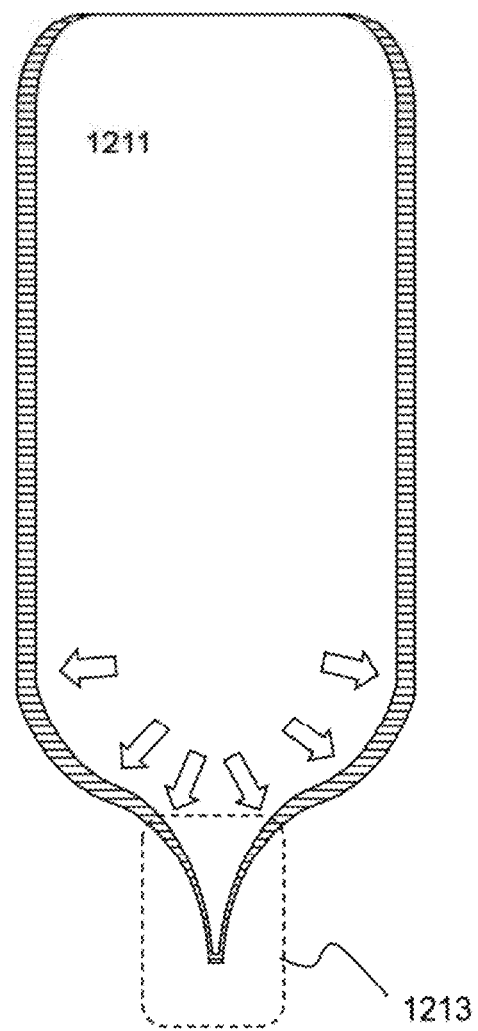
FIGS. 12A and 12B show other example pouches, consistent with disclosed embodiments.
Figure 12B:
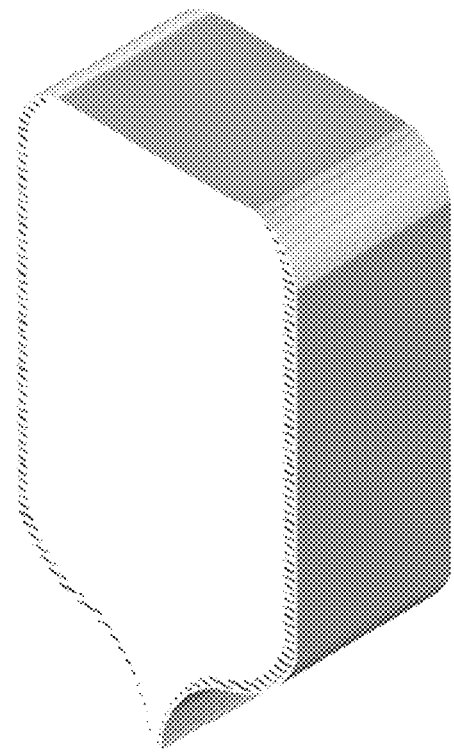

FIGS. 12A and 12B show another example of pouch 1211, consistent with disclosed embodiments. For example, the pressure applied to the walls of pouch 1211 may open a nozzle seal 1213.

Figure 13:
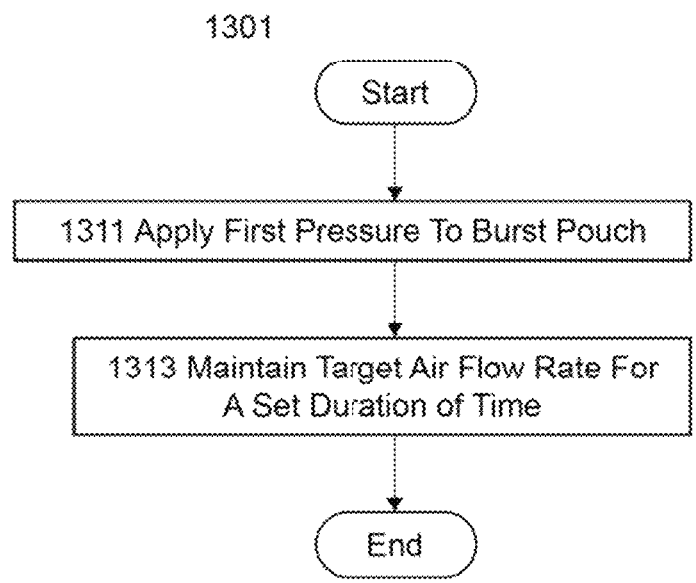
FIG. 13 shows an example process for extracting base from a pouch, consistent with disclosed embodiments.

FIG. 13 shows an example process 1301 for extracting base from a pouch, consistent with disclosed embodiments. In an example embodiment, a first pressure may be applied to burst a pouch at step 1311, and at step 1110, a target flow rate of air may be maintained to inflate flexible chambers (e.g., chambers 711) to create suitable pressure for extracting base from the pouch. In an example embodiment, the airflow rate may be used to calculate the volume flow rate of the base by combining a gas law and equation describing the flowing of the base from the nozzle. The gas law is given by P=nkT/V, with P—gas pressure, n—the amount of gas in moles, k—Boltzmann constant, T—temperature, and V—a volume of a chamber 311 or a flexible balloon 711.

Using gas law: PV=nkT→PdV+VdP=dnkT, and time change of volume V is described by $$P(t) = \frac{dV}{dt} = \frac{dn}{dt}kT - V(t)\left(\frac{dP(t)}{dt}\right)$$

In the above equation $$\frac{dn}{dt} = \gamma$$

is a row rate or gas into a chamber (in units of moles per time) and is a control parameter, for convenience denoted by γ. Unknowns in the above equation are V(t) and P(t). The equation describing the flowing of the base from the nozzle may be used to eliminate pressure P(t). The flow rate of paste (the base) through the nozzle is described as $$P - P_0 = 128\,\mu L \left(\frac{dV}{dt}\right) / (\pi D^4)$$

(flow through the nozzle of diameter D due to pressure difference. P—$P_0$—the pressure difference between the pressure in the pouch and outside, μ—paste viscosity, L—nozzle length.) Solving for dV/dt from the above equation, one gets $$\frac{dV}{dt} = \frac{\pi D^4 (P - P_0)}{128\,\mu L} \to C\left(\frac{dV}{dt}\right) + P_0 = P,$$

$$C = \frac{128\,\mu L}{\pi D^4}$$

$$\frac{dP}{dt} = C\left(\frac{d^2 V}{dt^2}\right)$$

Substituting above into Gas Law:

$$\left(C\left(\frac{dV}{dt}\right) + P_0\right)\left(\frac{dV}{dt}\right) = \gamma kT - VC\left(\frac{d^2 V}{dt^2}\right)$$

$$CV\frac{d^2 V}{dt^2} + C\left(\frac{dV}{dt}\right)^2 + P_0\left(\frac{dV}{dt}\right) = \gamma kT$$

In the above equation: $P_0$—atmospheric pressure, $$C = \frac{128\,\mu L}{\pi D^4},$$

γ—air rate, k-Boltzman constant, T—temperature, D—nozzle diameter, L—nozzle length, μ—paste viscosity, $$\frac{dV}{dt}$$

—a volume flow rate of the paste. The above equation relates a control parameter γ with a volume flow rate of the paste. The solution of the above equation may be readily obtained numerically (or in some cases analytically) depending on values for parameters γ, T, $P_0$, and C. In an example embodiment, when γ=0, dV/dt=0, $(d^2V)/(dt^2)$=0, V is a constant.

Figure 14:
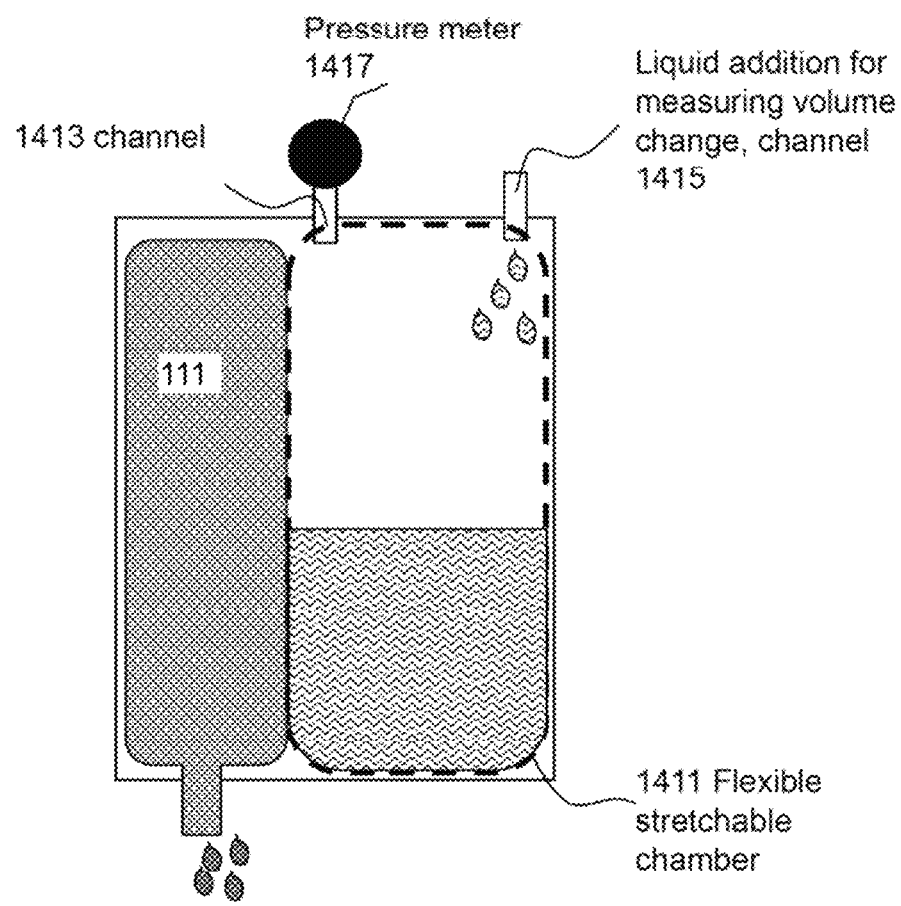
FIG. 14 shows an example chamber for extracting base from a pouch, consistent with disclosed embodiments.

FIG. 14 shows an example chamber for extracting base from a pouch, consistent with disclosed embodiments. The chamber may utilize both gas and liquid for extracting base from pouch 111. Pouch 111 may be adjacent to a flexible chamber 1411 that may contain gas (e.g., air) and a liquid (e.g., water). Pressure in chamber 1411 may be first increased by pumping air into chamber 1411 via channel 1413. Since chamber 1411 is configured to be flexible, it is configured to exert pressure on pouch 111. At a threshold pressure in chamber 1411, the nozzle seal of pouch 111 may rupture, leading to the extraction of the base from pouch 111. While maintaining a constant pressure within chamber 1411 (which may be achieved using pressure controlled and a pressure meter 1417), a volume of liquid may be added to chamber 1411, leading to the same volume of paste being extracted from pouch 111. By controlling the flow rate of liquid into chamber 1411, the flow rate of the paste may be controlled.

Figure 15B:
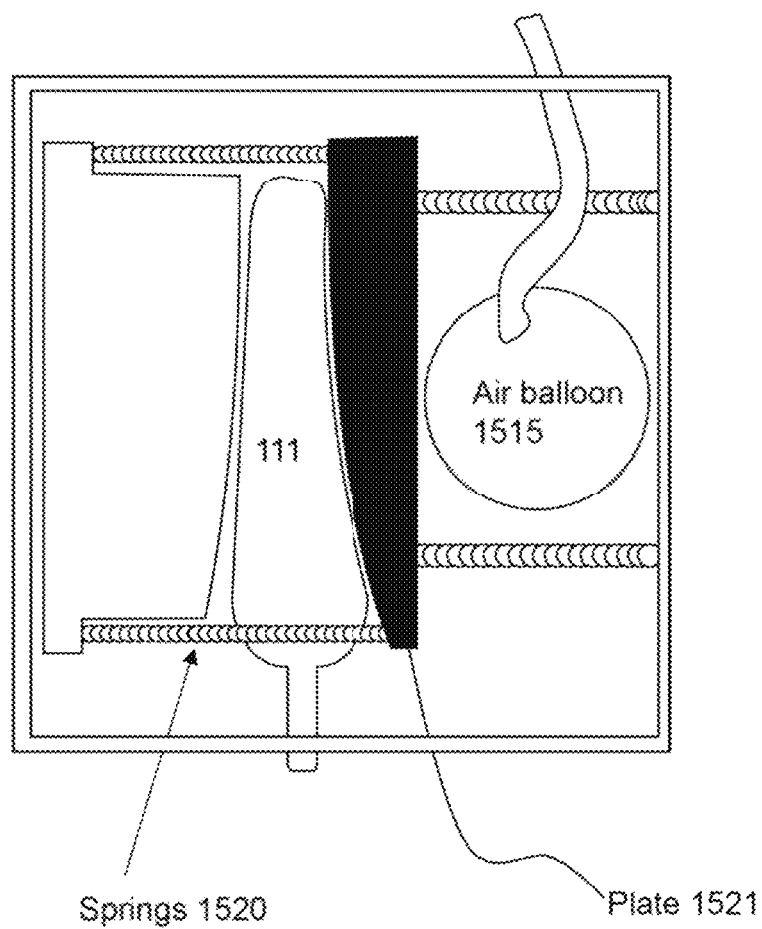
Figure 15C:
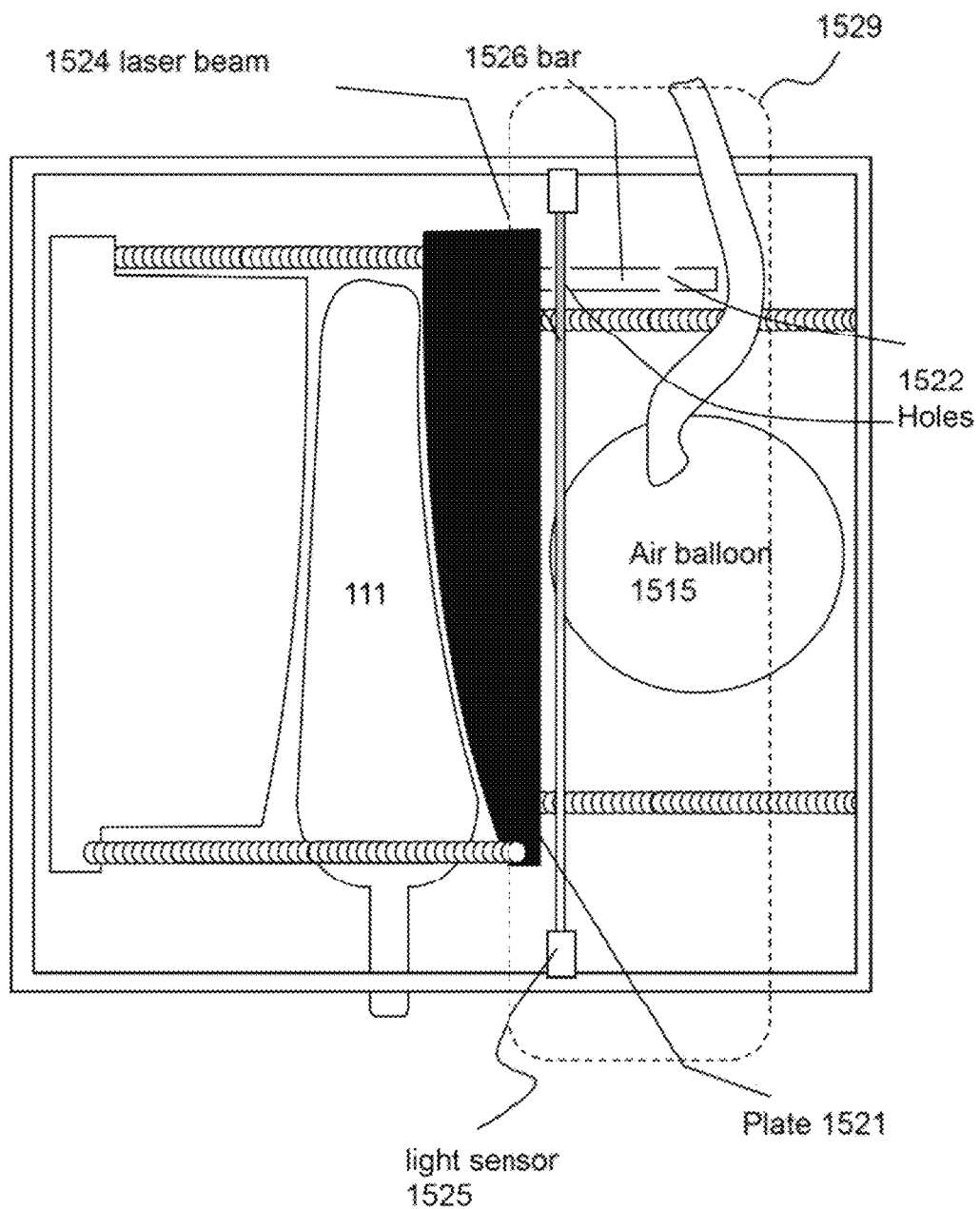

FIGS. 15A-15C show other example chambers extracting base from a pouch, consistent with disclosed embodiments. For example, FIG. 15A shows an air balloon 1515 that may be configured to push plate 1511 towards pouch 111 and plate 1513 while being inflated via a connection 1518. Plate 1511 and 1513 may be connected by springs 1520 for securing the motion of the plates. Air balloon 1515 may be made for a suitable rubber material capable of stretching when air is pumped into balloon 1515. Air balloon 1515 may be of any suitable shape and size for providing a required pressure (as well as the pressure distribution) over plate 1511. Plates 1511 and 1513 may be made from any suitable material such as metal, plastic, and the like.

FIG. 15B shows plates 1521 and 1523 that are similar to plates 1511 and 1513 but may have optimized shapes to create higher pressure at the top of pouch 111 and lower pressure at the bottom of pouch 111. FIG. 15C further includes a plate motion sensor 1529, which may include a laser-based light motion sensor 1525, a laser beam 1524, and a moving bar 1526. Plane motion sensor 1529 may be used to determine the motion of plate 1521. In an example embodiment, laser beam 1524 may be directed towards light sensor 1525. In an example embodiment, laser beam 1524 may be interrupted by moving bar 1526 containing a set of holes 1522 through which laser beam 1524 may reach light sensor 1525. Sensor 1525 may be configured to detect through which one of holes 1522 laser beam 1524 is passed (e.g., by counting the interruptions for laser beam 1524), thus, determining the motion of plate 1521.

Figure 16:
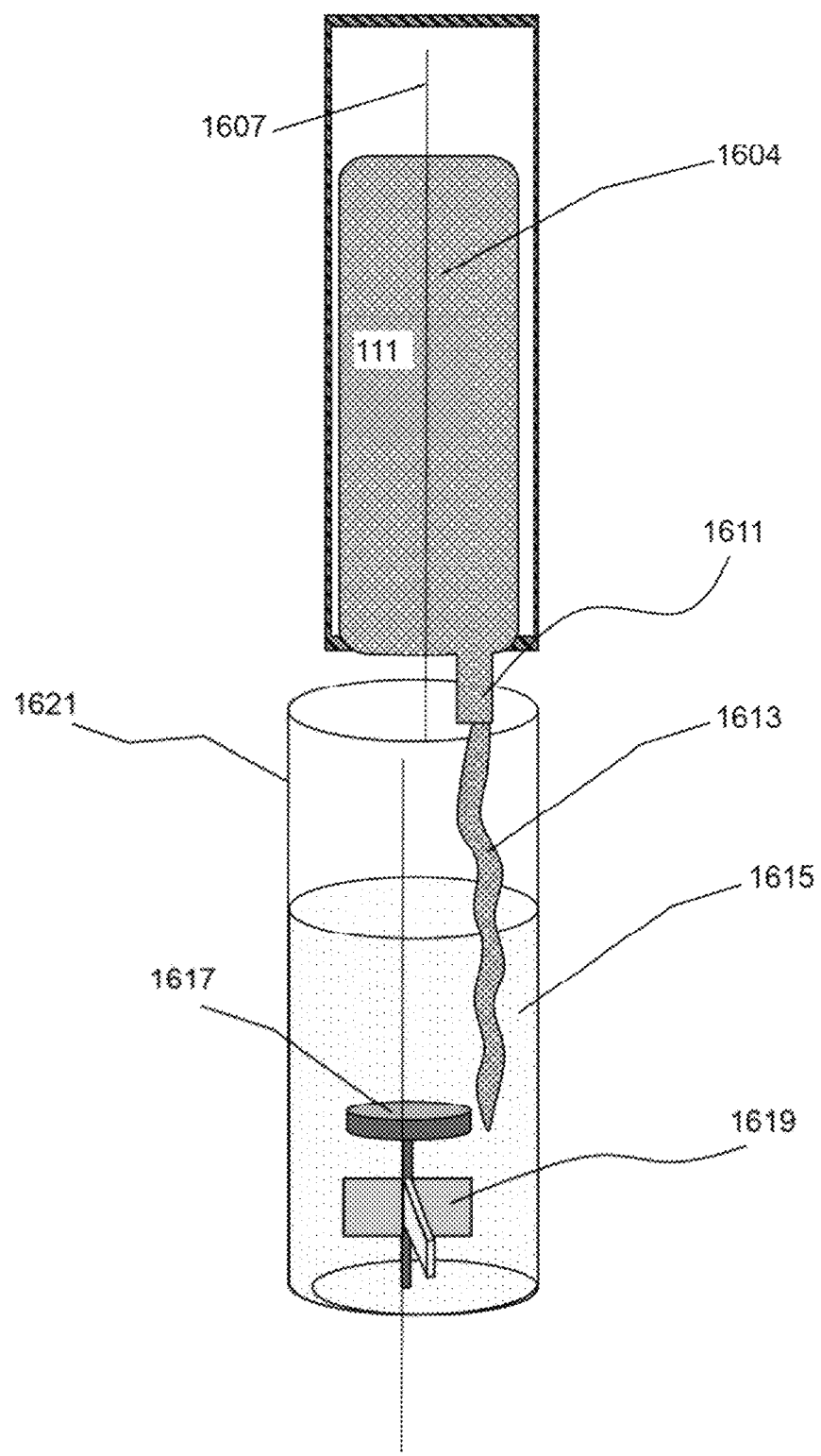
FIG. 16 shows a pouch positioned such that a nozzle is off-center of the bottle, consistent with disclosed embodiments.

FIG. 16 shows an example embodiment of the system where pouch 111 may be positioned such that a nozzle of the pouch is off-center from the central axis of the bottle (axis 1605, as shown in FIG. 16). In various embodiments, pouch 1604 may be designed such that nozzle 1611 may be off-center from the pouch center axis 1607. In some cases, nozzle 16011 may be positioned such that paste 1613 may enter bottle 1621 and clear top plate 1617. Such an off-center position for nozzle 1611 may allow paste 1613 to reach rotor 1619 without being deposited over a top surface of top plate 1617. In various embodiments, the position of the nozzle may not change during the squeezing of pouch 1604.

Figure 17:
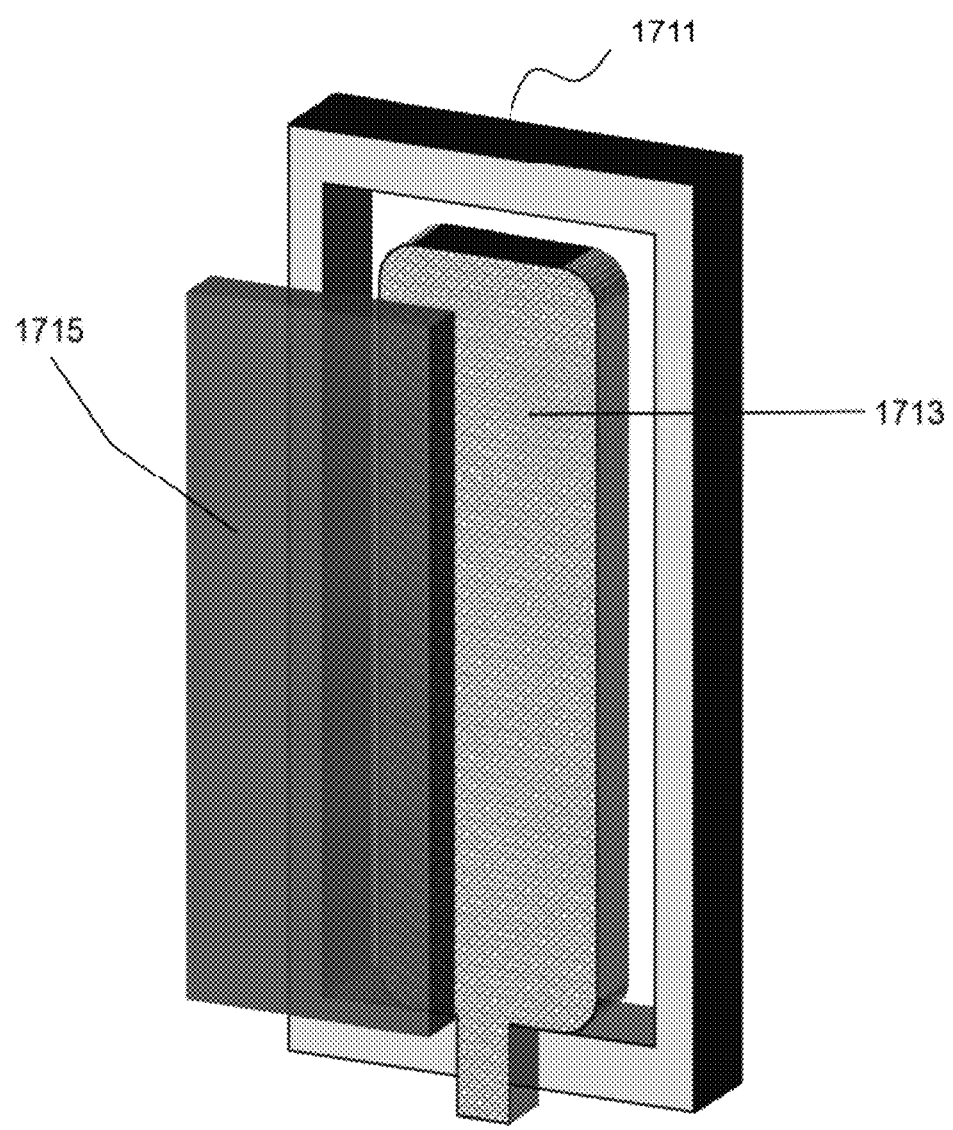
FIG. 17 shows a pouch fitting into a cradle and a part for squeezing the pouch, consistent with disclosed embodiments.

FIG. 17 shows an embodiment system 101, in which pouch 1713 is inserted in a cradle 1711 (also referred to as a chamber). Cradle 1711 may be similar to chamber 110, as shown in FIG. 4B. In various embodiments, part 1715 may be configured to be inserted into cradle 1711 such that it squeezes pouch 1713 and ensures that pouch 1713 releases all (or almost all) of the paste. Thus cradle 1711 and part 1715 may be designed to extract paste from pouch 1713 such that no paste is wasted (i.e., all the paste is used for preparing a plant-based beverage). In various embodiments, cradle 1711 (or system 110, as shown in FIG. 4B) may be configured to be removable and washable.

System 101 may be configured to provide means for filling the mixing bottle with water. In an example embodiment, system 101 may include a nozzle (not shown) for filling the mixing bottle with a required amount of water. In an example embodiment, the mixing bottle (e.g., bottle 1621, as shown in FIG. 16) may be first filled with water prior to the addition of the plant-based paste. Additionally, or alternatively, the bottle may be filled with water manually by a user. For example, a user may fill the bottle with water up to a certain level.

In various embodiments, system 101 may include various sensors for ensuring the correct operation of system 101. For example, system 101 may include a pressure sensor for sensing the presence of the bottle. In some cases, the pressure sensor may sense the amount of water in the bottle and notify a user if more or less water needs to be added. In some cases, the amount of base dispensed into the bottle may depend on the amount of water present in the bottle to maintain the correct bottle/paste ratio. Various other sensors may be present. For example, a sensor may determine if a pouch is present in chamber 110 (chamber 110 is shown in FIG. 4B). Additionally, a pressure sensor may ensure that pressure within chamber 110 does not exceed maximum pressure levels (e.g., the pressure within chamber 110 may be required to be less than 20 psi). In some cases, a sensor may be present for determining that chamber 110 is closed. In some cases, system 101 may include a sensor for detecting if the paste is flowing from a pouch and a timer for determining the duration of time for dispensing the paste.

In various embodiments, system 101 may be configured to determine what type of pouch is used for the machine. For example, different pouches may be of different weights, different colors, or may have a code (e.g., a barcode, a QR code, Universal Product Code, and the like) that may be read by system 101 and determine various parameters for extracting a paste (e.g., some pastes may require more pressure to be extracted, as these pastes may have higher viscosity). Other parameters that may be pouch dependent may include an initial pressure needed to break a seal of the pouch, a time duration for applying the pressure, a location (or area) over which to apply the pressure, or any other suitable parameters that may control how a paste may be dispensed from a pouch.

In some cases, system 101 may include a wireless or wired connection for communicating with electronic devices (e.g., smartphones, computers, and the like). In an example embodiment, such connection may be used to update system 101 firmware, to obtain usage data for the machine, to upload instructions for system 101. For example, instructions may be used to determine a procedure for preparing a plant-base beverage having a corresponding pouch. In an example embodiment, the instructions may include a time needed for dispensing paste from a pouch, the pressure needed for dispensing the paste, time needed for mixing the beverage, and the like. In some cases, instructions may further include an amount of an additive that can be added to the beverage.

Figure 18:
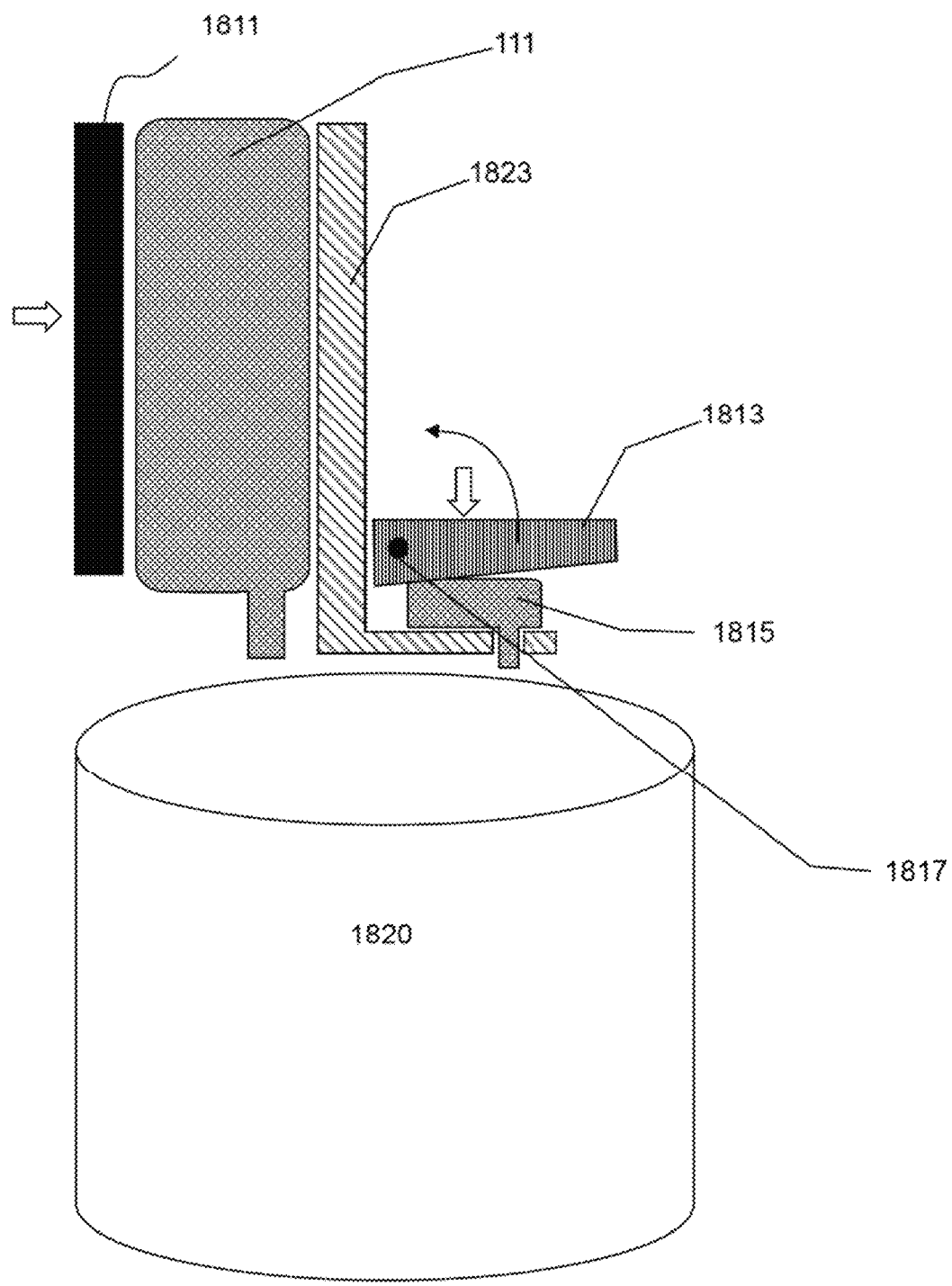
FIG. 18 shows an example system for dispensing paste and an additive for a plant-based beverage, consistent with disclosed embodiments.

In an example embodiment, system 101 may have sealed pouches for one or more additives that can be admixed to a plant-based beverage. For example, FIG. 18 shows an example system for extracting paste from pouch 111 and for extracting an additive from a pouch 1815 (e.g., the additive may be maple syrup, a shot of Baileys Irish Cream, a chocolate syrup, and the like). In an example embodiment, both the base and the additive may be extracted into a bottle 1820. As shown in FIG. 18, a first mechanism (e.g., a movable part 1811) may be used to apply pressure on pouch 111 and press pouch 111 against part 1823 to extract paste, and a second mechanism (e.g., a rotatable and/or movable part 1813) may be used to apply pressure on pouch 1815. In an example embodiment, part 1813 may be rotated around axis 1817. For example, part 1813 may be placed in a vertical position providing a space for placing pouch 1815 and then may be rotated into a horizontal position and pressed against the pouch to dispense additive from the pouch. Mechanisms 1811 and 1813 are only some of the possible examples, and any other approaches (e.g., using the pressure of a pressurized chamber that may contain both pouch 111 and 1815) as discussed herein may be used to dispense the paste and the additive from their respective pouches.

Figure 19:
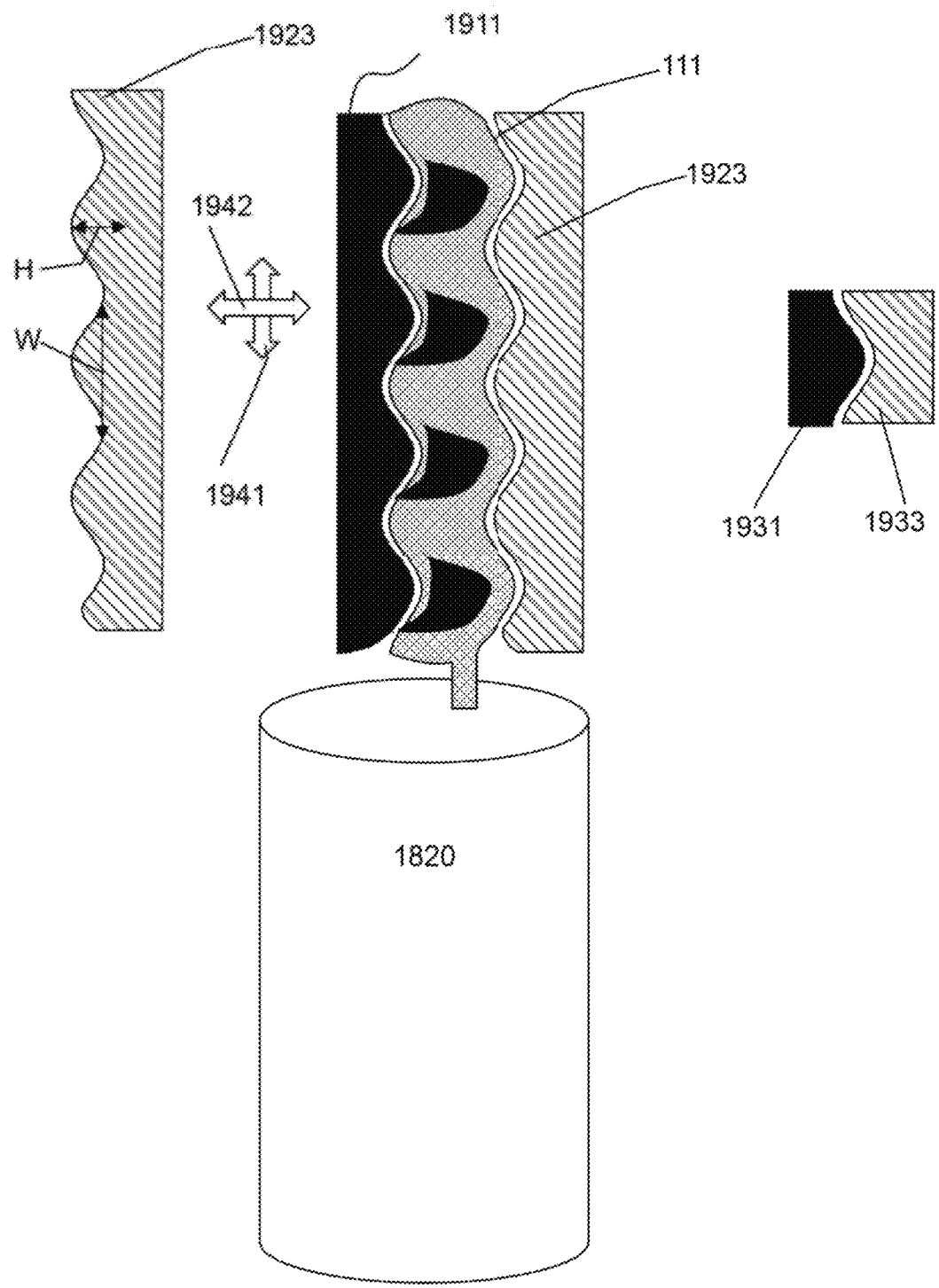
FIG. 19 shows an example system for dispensing paste having parts with non-flat surfaces, consistent with disclosed embodiments.

FIG. 19 shows another example embodiment of a system for extracting paste from pouch 111 into bottle 1820 using a movable part 1911 and a part 1923 that may be, for example, a fixed part. Part 1911 may be similar to part 1811, as shown in FIG. 18, with the difference that part 1911 may have a non-flat surface (e.g., a wavy surface, as shown in FIG. 19).

Part 1923 may be similar to part 1823, with the difference that part 1921 may have a non-flat surface (e.g., a wavy surface, as shown in FIG. 19). The surfaces of parts 1911 and 1923 may have any suitable smooth protrusions resulting in a generally wavy surface (e.g., the size, the height H, the width W, and/or the shape of protrusions can be selected for optimal extraction of paste from pouch 111). In an example embodiment, protrusions of part 1911 are positioned to be offset from protrusions of part 1923. For example, protrusion 1931 may be positioned so that it is aligned with vacancy 1933, as shown in FIG. 19. In some cases, part 1923 may be movable as well. In an example embodiment, both parts 1911 and 1923 may be movable relative to pouch 111. In some cases, parts 1911 and 1923 may move relative to each other. In an example embodiment, part 1911 may move relative to part 1923. Parts 1911 and 1923 may move in a horizontal direction (i.e., direction indicated by arrow 1942). Additionally, or alternatively, parts 1911 and 1923 may move in a vertical direction (i.e., the direction indicated by arrows 1941). In some cases, parts 1911 and 1923 may move in a vertical direction, while pouch 111 may be stationary.

Figure 20:
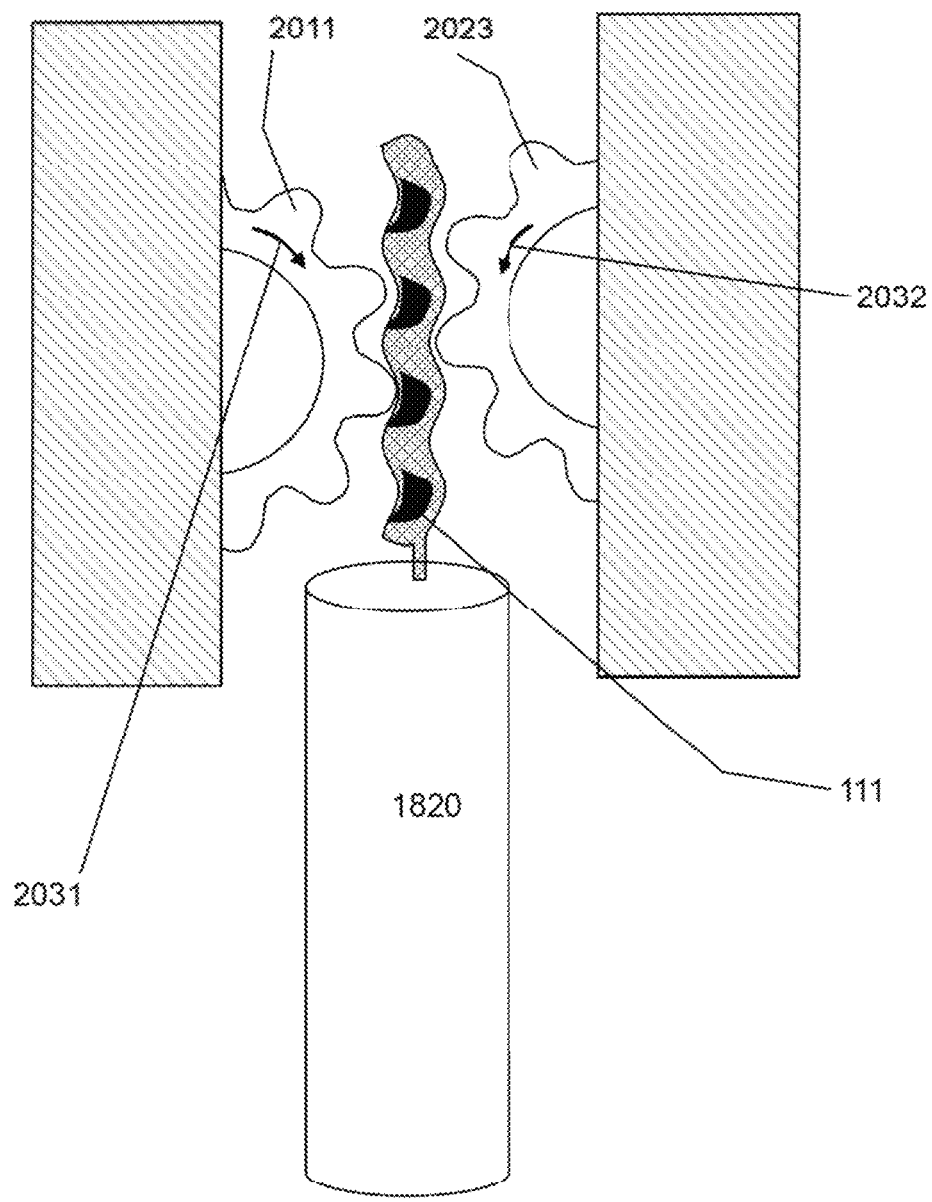
FIG. 20 shows an example system for dispensing paste having rotating parts with non-flat surfaces, consistent with disclosed embodiments.

FIG. 20 shows another embodiment of the system for extracting paste from pouch 111 using movable parts 2011 and 2023. These parts may be designed to be similar to rotating gears (rotation is indicated by arrows 2031 and 2032) spaced such that pouch 111 is placed between these parts. Parts 2011 and 2023 may be rotated and move relative to pouch 111, resulting in squeezing pouch 111 and dispensing paste from pouch 111 into bottle 1820.

Figure 21A:
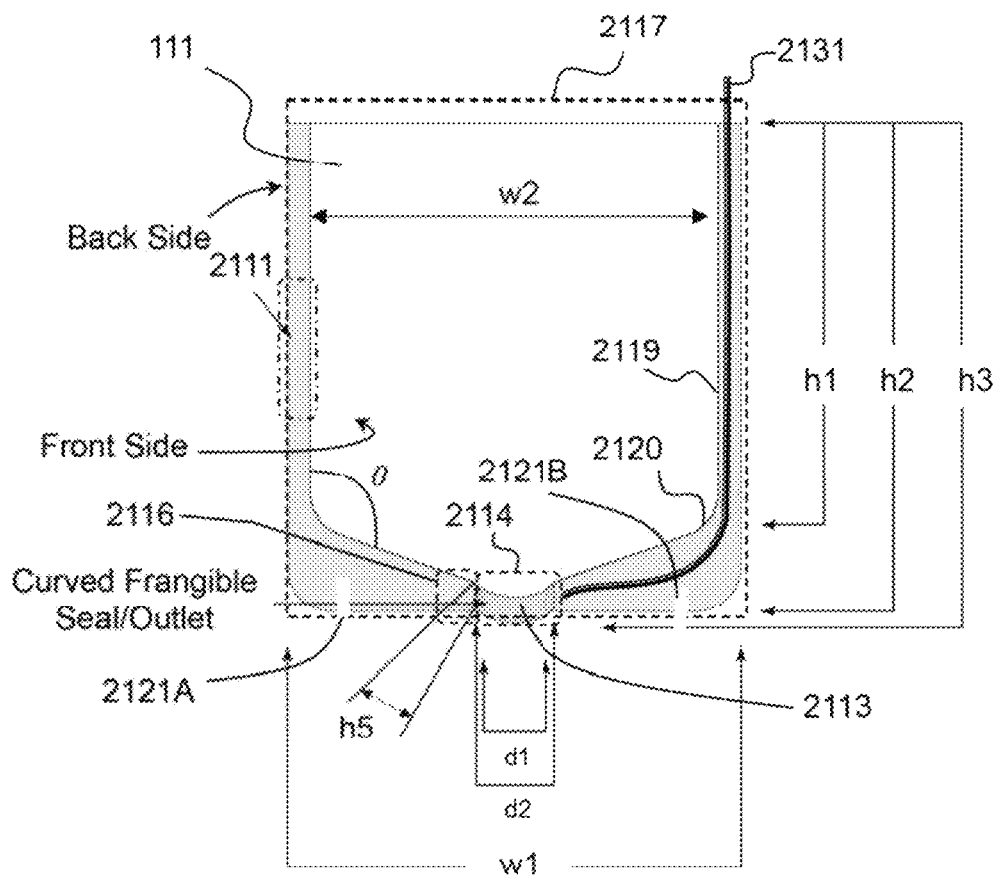
FIG. 21A shows an example pouch for plant-based paste, consistent with disclosed embodiments.
Figure 21B:
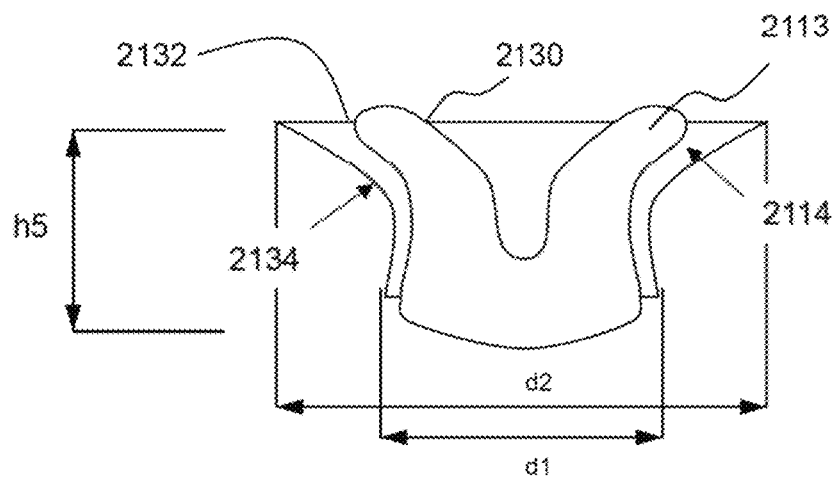
FIG. 21B shows details of a nozzle for a pouch for plant-based paste, consistent with disclosed embodiments.

FIG. 21A shows a cross-section of an example pouch 111 for plant-based paste, consistent with disclosed embodiments. The pouch may be made from laminated material, as further discussed herein. Pouch 111 may have an outside shape 2117 that may be different from an inside shape 2119. For instance, outside shape 2117 may be substantially rectangular, and inside shape 2119 may be a tapered rectangular shape, as shown in FIG. 21A. In an example embodiment, pouch 111 may include notches, such as notches 2121A and 2121B for aligning pouch 111 with various elements (e.g., plate 141) of chamber 130, in which pouch 111 may be inserted, as shown in FIG. 1F. For instance, chamber 130 may include protrusions, which may be inserted in notches 2121A and 2121B to align pouch 111 relative to elements of chamber 130. As shown in FIG. 21A, pouch 111 may have vertical dimensions h1-h3, external width w1, internal width w2, nozzle diameters d1 and d2, a nozzle seal 2113 for a nozzle 2114. In an example embodiment, the difference between w1 and w2 may be in a range of a fraction of an inch (e.g., a fifth of an inch, a quarter of an inch, a half of an inch, and the like) and a region 2111 may be used to seal sides of pouch 111. In an example embodiment, pouch 111 may have a front side and a back side. The front side may be joined together with the back side via sealed regions such as region 2111. In an example embodiment, dimension h1 may be a few inches (e.g., 3, 4, 4.5, 5 inches, and the like), dimension h2 may be a fraction of an inch larger than h2 (e.g., h1 may be 0.2, 0.5, 0.8, 0.9, 1, 1.2, 1.3 inches larger than h1), and dimension h3 may be slightly larger than h2 (e.g., may be larger by a few tenths of an inch than h2). In an example embodiment, w1 may be about as large as h1 (e.g., 4 or 5 inches, and the like). In an example embodiment, nozzle 2114 may be located at the bottom portion of pouch 111 in the center of the pouch. An example inner diameter d2 of nozzle 2114 may be a few tenths of an inch (e.g., 0.4, 0.5, 0.6, 0.7, 0.8 inches, and the like). In an example embodiment, an outer diameter d1 may be slightly less (e.g., by a tenth of an inch or less) than inner diameter d2. As shown in FIG. 21A, inside shape 2119 of pouch 111 may include tapered internal side 2120 having a tapering angle θ. Tapering angle θ is selected to provide a sufficient back pressure (the back pressure may be exerted by a paste located in pouch 111 when pouch 111 is squeezed) on a back side 2132 (as shown in FIG. 21B) of nozzle 2114. Such back pressure is used to open (also referred to herein as pop) nozzle seal 2113. In an example embodiment, back side 2130 of nozzle seal 2113 may be curved to provide a target force distribution over back side 2130 due to the back pressure.

Figure 22:
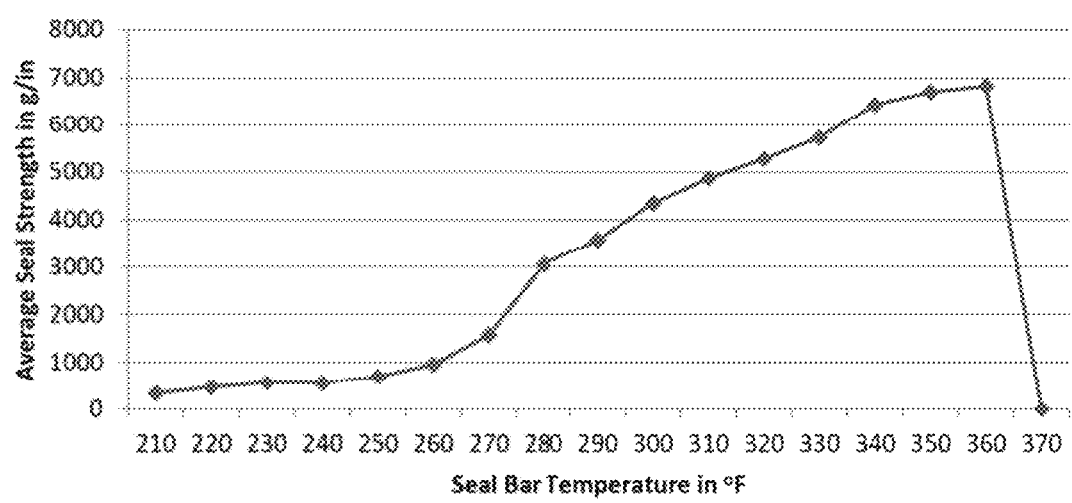
FIG. 22 shows a plot of a seal strength as a function of seal bar temperature, consistent with disclosed embodiments.

In an example embodiment, pouch 111 may be sealed by heating material that forms pouch 111 along a line 2131. A heating temperature for heating pouch-forming material along line 2131 may be non-uniform (or uniform). In some cases, the temperature may be selected based on the desired strength of a seal. For instance, FIG. 22 shows a plot of a curve 2201 describing a seal strength as a function of seal bar temperature, consistent with disclosed embodiments. For instance, the higher is the seal temperature, the higher may be the seal strength. In an example embodiment, seal strength may be uniform over line 2131. Alternatively, around nozzle 2114, seal strength may be decreased (which may be achieved by reducing a heating temperature when sealing pouch 111 in the proximity of nozzle 2114).

FIG. 21B shows details of nozzle 2114 for pouch 111, consistent with disclosed embodiments. For example, a shape of nozzle 2114 characterized by a profile curve 2134 may be selected to reduce the force needed for popping nozzle seal 2113. In various embodiment, a configuration of nozzle 2114 may be selected, such that seal 2113 can be easily opened (popped) due to the back pressure (as described above), but at the same time, the configuration of nozzle 2114 may be selected such that the back pressure is sufficiently high, in order to prevent accidental rupture of seal 2113 due to handling of pouch 111. Nozzle 2114 parameters may include inside diameter d1, an outside diameter d2, a height h5, and nozzle profile curve 2134.

Nozzle seal 2113 may be of any suitable shape, as shown in FIG. 21B. In an example embodiment, seal 2113 may have a curved back surface 2130, with the curvature of surface 2130 selected to improve rupture of seal 2113 when pressured by contents of pouch 111. In some cases, seal 2113 may be made from a different material than the walls of pouch 111. Alternatively, seal 2113 may be made from the same material as the walls of pouch 111 but may be sealed a via low-temperature heating. For example, the temperature in a range of 200-260° Fahrenheit may be used for low-temperature heating. While low-temperature heating may be used for seal 2113, a relatively high-temperature heating may be used to seal pouch 111. For example, the temperature in a range of 280-350° Fahrenheit may be used for high-temperature heating.

In an example embodiment, the temperature distribution during the heating process may be selected to provide a particular shape for seal 2113. In an example embodiment, a high temperature gradient may be established between a region containing seal 2113 and other sealed regions (e.g., region 2116, as shown in FIG. 21A). For example, the temperature gradient may be 10 degrees Fahrenheit per few millimeters, 20 degrees Fahrenheit per few millimeters, and the like. Such high temperature gradients may result in seal popping without affecting the structure of pouch 111.

Figure 23:
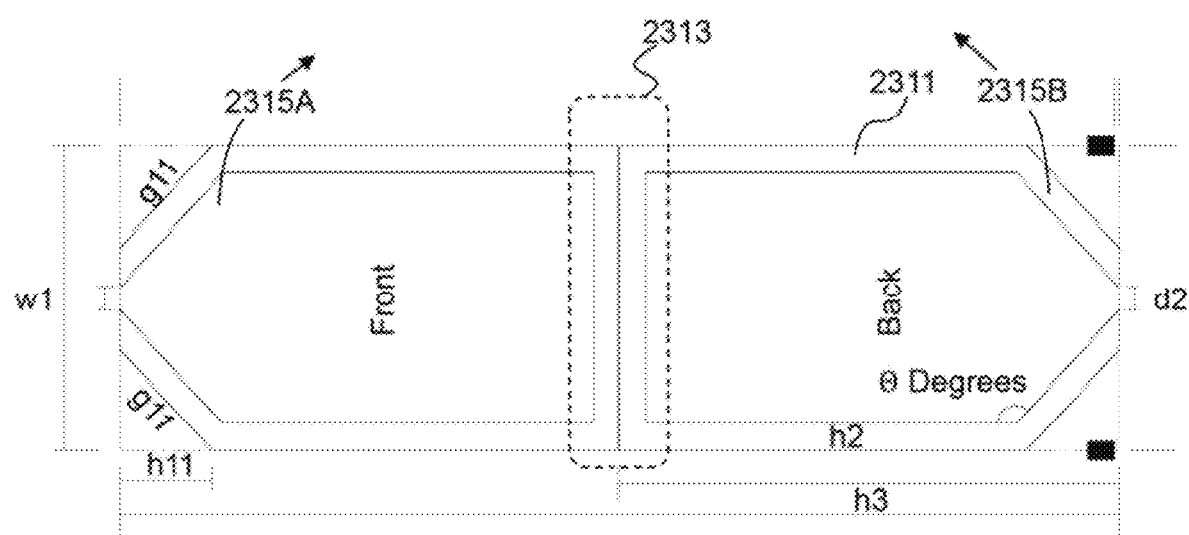
FIG. 23 shows pouch geometry, consistent with disclosed embodiments.

FIG. 23 shows pouch geometry, consistent with disclosed embodiments. In an example embodiment, Pouch 111 may be cut out from a single sheet of material and have a layout 2311, as shown in FIG. 23. Pouch 111 may be formed from layout 2311 by folding layout 2311, as shown by arrows 2315A and 2315B. A part of layout 2311 may be used to form a front side of pouch 111, a part of layout 2311 may be used to form a back side of pouch 111, sides may be used for sealing pouch 111, and middle portion 2313 of layout 2311 may be a top portion of pouch 111. Dimensions h2, h3, w1, and d2 of layout 2311 may be the same as the same numbered dimensions, shown in FIG. 21A. In an example embodiment, angle $\theta$ may be determined by selecting dimensions h11 and g11 of the layout. In an example embodiment, dimension h11 may be a fraction of an inch (e.g., 0.5 inches) about an inch or about a few inches. Similar dimension g11 may be on the same order of magnitude (but slightly larger) than dimension h11.

Figure 24:
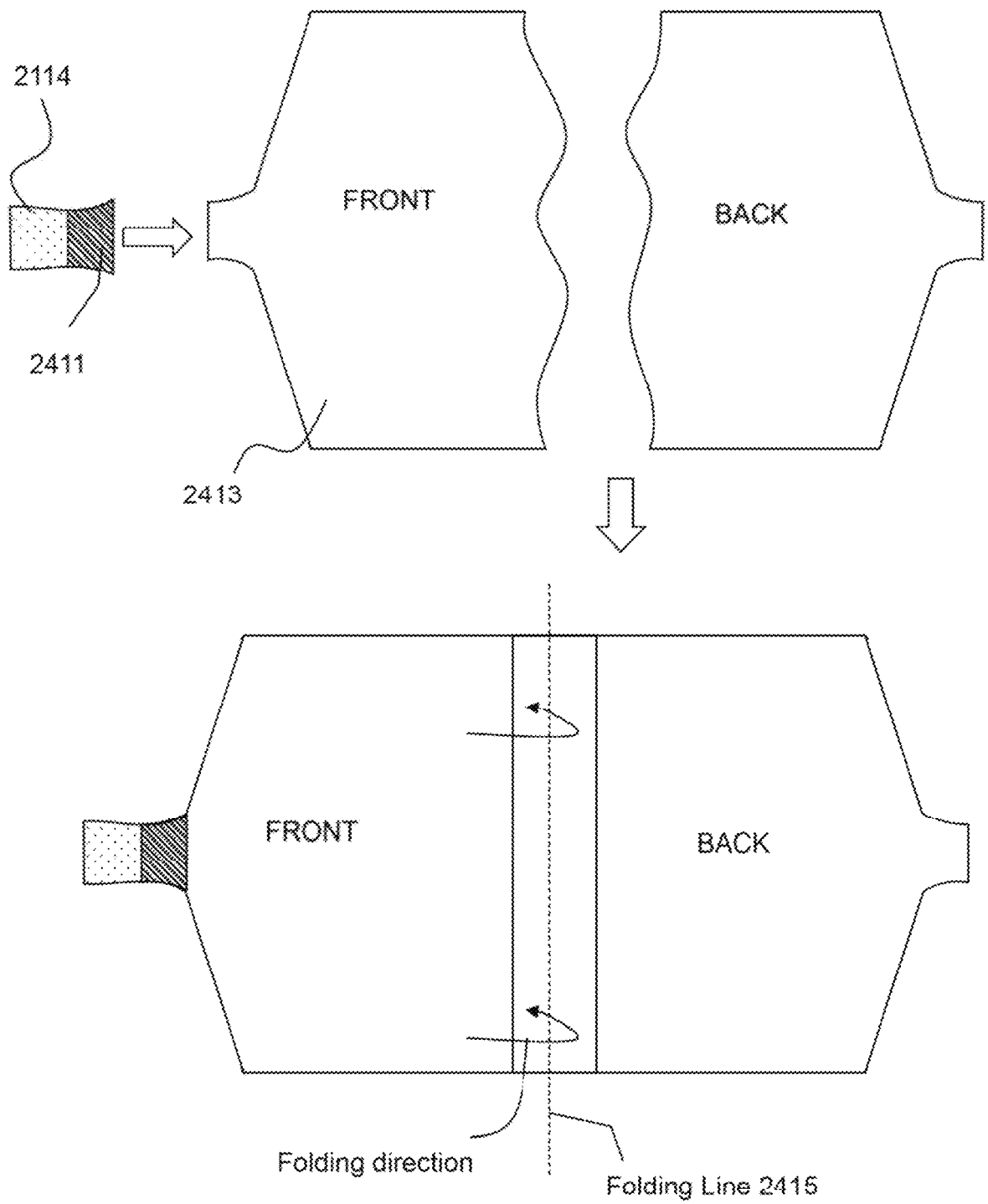
FIG. 24 shows a process of combining a prefabricated nozzle with a pouch, consistent with disclosed embodiments.

In an example embodiment, nozzle 2114 may be prefabricated and combined with pouch 111 during the sealing of layout 2311. For example, FIG. 24 shows a process of combining prefabricated nozzle 2114 (that may already be sealed by seal 2113) with a nozzle portion 2413 of layout 2311, nozzle 2114 may be sealed to layout 2311 at region 2411 (e.g., a bottom side of region 2411 may be sealed with a front side of layout 2311, and a top side of region 2411 may be sealed with a back side of layout 2311. As shown in FIG. 24, the back side of layout 2311 may be folded over the front side of layout 2311 using a folding line 2415.

Figure 25:
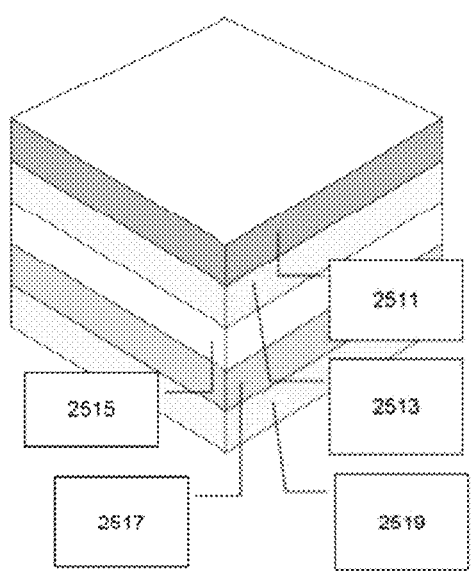
FIG. 25 shows a structure of a layer of material for fabricating a pouch, consistent with disclosed embodiments.

FIG. 25 shows a structure of a layer of the material for fabricating a pouch, consistent with disclosed embodiments. In an example embodiment, layers of the material may be made from paper, plastic, or composite material (e.g., paper-plastic composites). For example, layer 2511 may be a coated polyester (PET), layer 2513 may be a low-density polyethylene (LDPE), layer 2515 may be an aluminum foil, layer 2517 may be ethylene acrylic acid (EAA) copolymer, and layer 2519 may be a variable heat seal strength film (frangible sealant film). In some cases, layers may have thicknesses in a range of 0.1 to a few millimeters (e.g., frangible sealant film may be a few millimeters, while aluminum foil layer 2515 may be a fraction of a millimeter). The above layers are only illustrative, and other layers may be chosen (or some layers may be removed), with the understanding that the last layer may be a sealant layer.

Figure 26A:
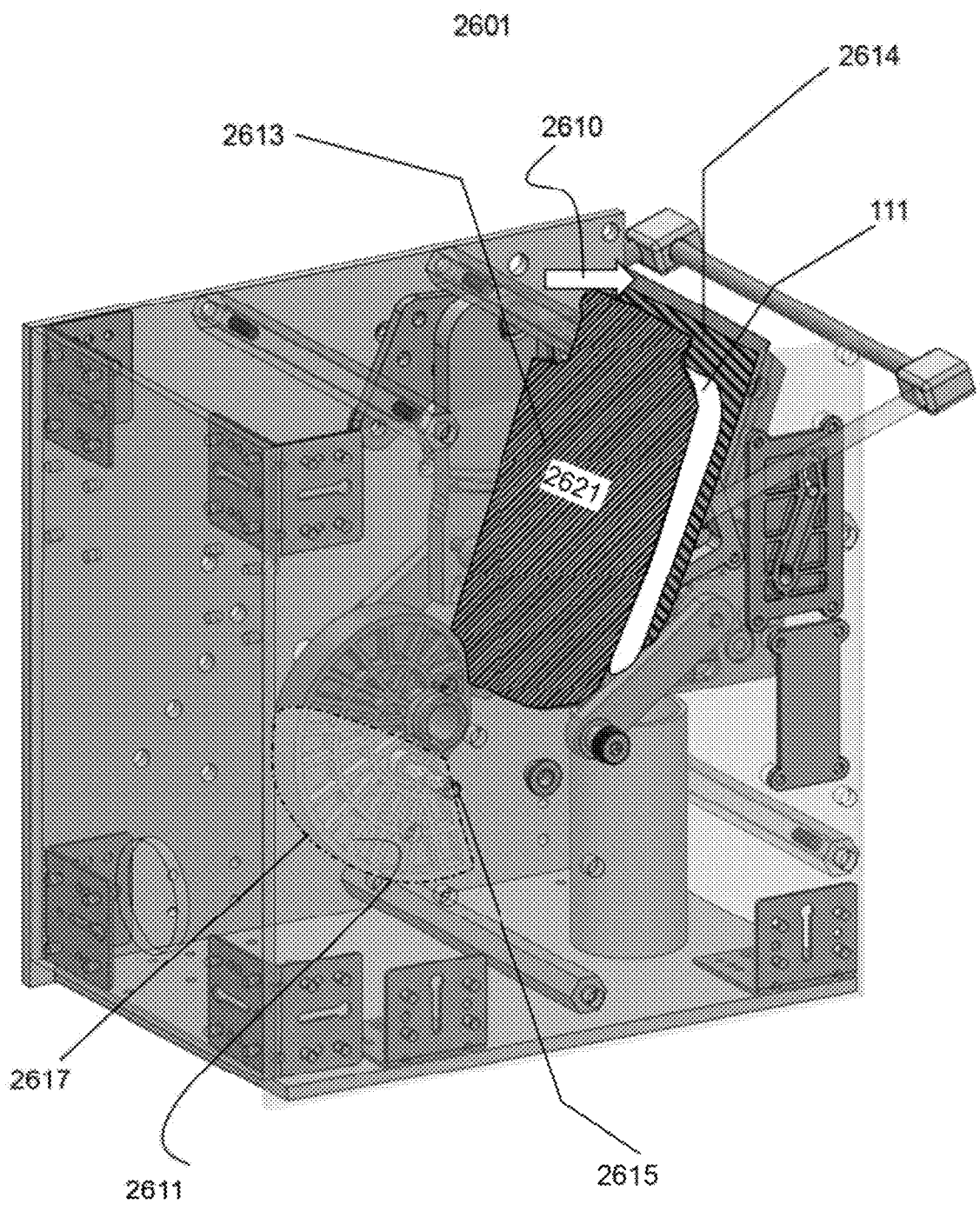
FIGS. 26A-26B show an example of a cam mechanism for exerting a mechanical action on a plate, consistent with disclosed embodiments.

FIG. 26A shows an example system 2601 for extracting a base from a pouch (e.g., for squeezing a paste from a pouch (e.g., pouch 111)), consistent with disclosed embodiments. In an example embodiment, system 2601 may include a cam mechanism 2611 (also referred to as a cam 2611) for exerting pressure on a plate 2613 via mechanical action. In an example embodiment, pouch 111 is placed between plate 2613 and plate 2614. When cam 2611 exerts pressure on plate 2613, plate 2613 executes a lateral motion as shown by arrow 2610 and pushes against pouch 111, thus, squeezing pouch 111. In some cases, plate 2614 may be a fixed plate. Cam 2611 may be configured to rotate using axis 2615 with an angular rotation $\omega(t)$, which may depend on time. For example, cam 2611 may be solidly connected to axis 2615, and axis 2615 may be rotated using an appropriate rotating device (e.g., an electric motor, a lever, and the like). As shown in FIG. 26A, cam 2611 may have an extended portion 2617 configured to push against a face 2621 of plate 2613.

Figure 26B:
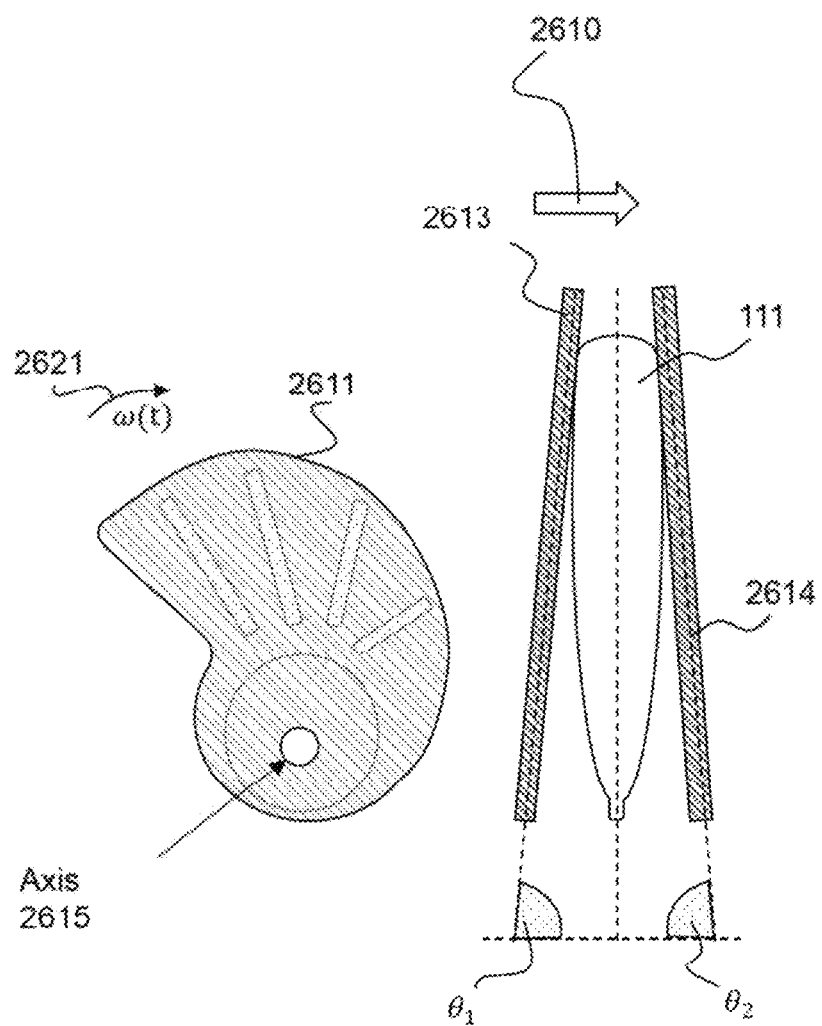

FIG. 26B shows another view of cam 2611 configured to rotate around axis 2615 in a direction as shown by arrow 2621. Cam 2611 may push on plate 2613, which in return, may be configured to move laterally, as shown by arrow 2610 towards pouch 111. In an example embodiment, plate 2613 may be inclined relative to the horizontal direction at an angle $\theta_1$, as shown in FIG. 26A. Such a configuration for plate 2613 may allow plate 2613 first to engage with pouch 111 at a top portion of pouch 111 and then (after traveling at least some horizontal distance relative to pouch 111) to engage at a bottom portion of pouch 111. Similarly, plate 2614 may also be inclined at a corresponding angle $\theta_2$, as shown in FIG. 26B. Angles $\theta_1$ and $\theta_2$ may be selected to result in a target pressure distribution over a surface of pouch 111 as a function of time. In some cases, as shown, for example, in FIG. 15B, a plate (plate 1521 shown in FIG. 15B may correspond to plate 2613 shown in FIG. 26B) may have a curved surface adjacent to pouch 111 (e.g., a surface of plate 1521 adjacent to pouch 111, as shown in FIG. 15B). Additionally, or alternatively, plate 2614 may also include a curved surface adjacent to pouch 111 (e.g., plate 2614 may be similar to plate 1523, as shown in FIG. 15B, which includes a curved surface adjacent to pouch 111).

Figure 26E:
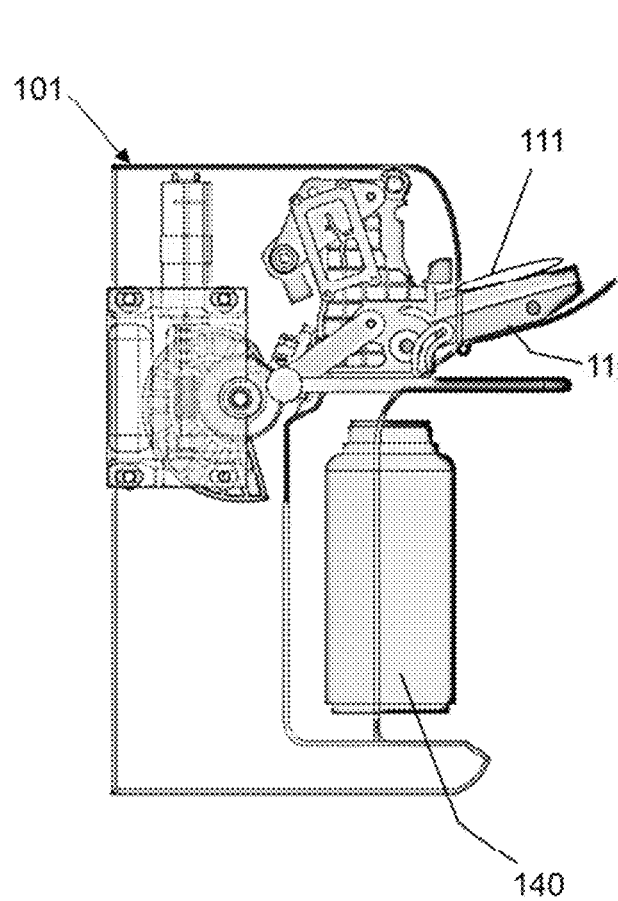
Figure 26F:
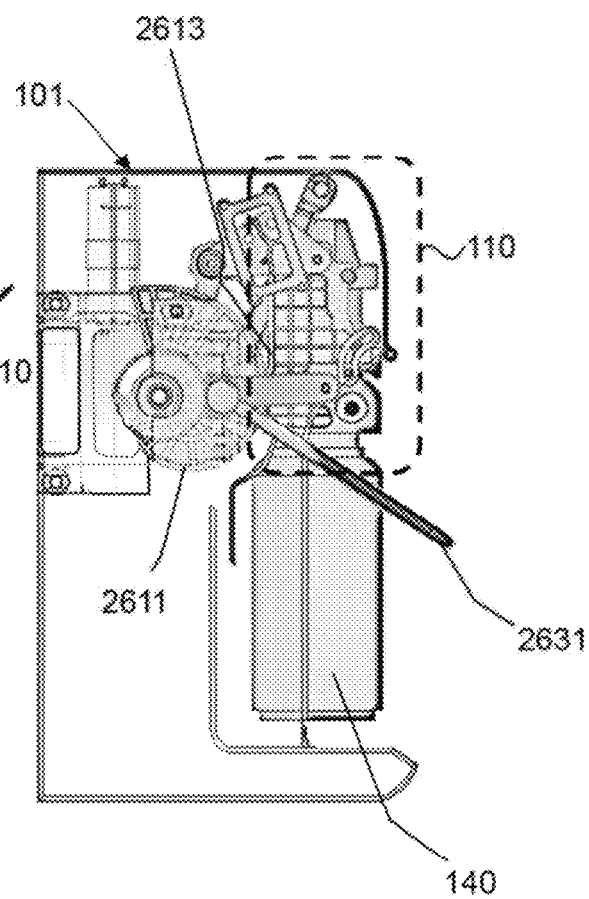

FIGS. 26C-I show system 101, including chamber 110 that utilizes cam 2611. FIG. 26C shows an example of system 101 in a position when chamber 110 is closed and contains no pouch 111. For such a configuration, lever 2631, which may be used in controlling the opening or closing of chamber 110, may be in the first position. For example, the first position is indicated by lever 2631 pointing down, but any other preferred position may be selected (e.g., lever 2631 pointing up, left, right, or being horizontal). FIG. 26D shows that by changing the position of lever 2631 (e.g., placing lever 2631 in a horizontal position), chamber 110 may be opened. In various embodiments, lever 2631 may be connected to any suitable set of gears or mechanical devices that can translate the rotational motion of lever 2631 (lever 2631 is configured to rotate around axis 2633) to a motion of a door of chamber 110 opening or closing. In some cases, the door of chamber 110 comprises an enclosure configured to hold pouch 110, as shown in the following figures. FIG. 26E shows that pouch 111 may be placed in an open portion of chamber 110, and a mixing bottle assembly 140 may be inserted for collecting of a beverage product. FIG. 26F shows that by lowering lever 2631, chamber 110 may be closed. In an example embodiment, cam 2611 may be engaged to provide pressure on plate 2613 to provide a required pressure for squeezing plant-based paste from pouch 111. In an example embodiment, the motion of cam 2611 may be activated by pressing a start button, and in other cases, the motion of cam 2611 may be activated by determining that chamber 110 is closed and is containing an unused pouch 111. In an example embodiment, the state of pouch 111 being used/unused may be determined by pouch size, shape, and the like. Alternatively, system 101 may determine whether pouch 111 was used/unused based on whether a pouch seal was ruptured. Additionally, or alternatively, system 101 may determine whether pouch 111 was used/not used based on whether the motion of cam 2611 was executed/not executed for that particular pouch 111.

Figure 26G:
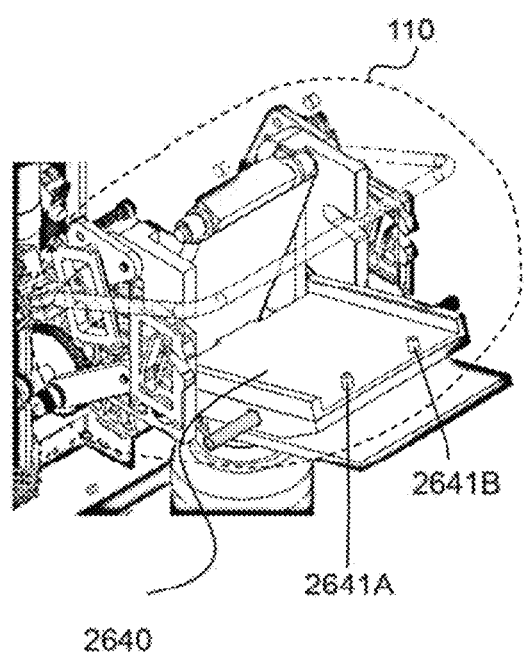
Figure 26H:
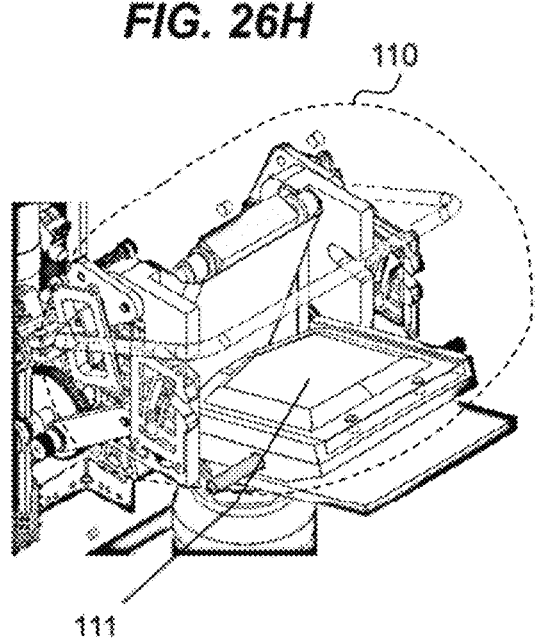
Figure 26I:
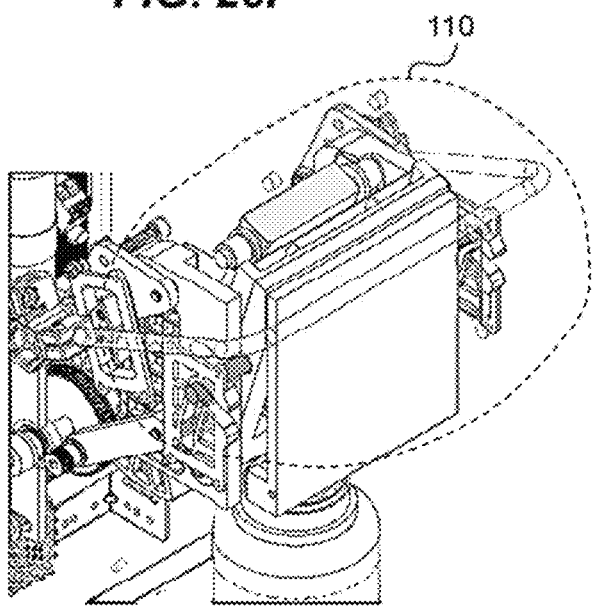
Figure 32A:
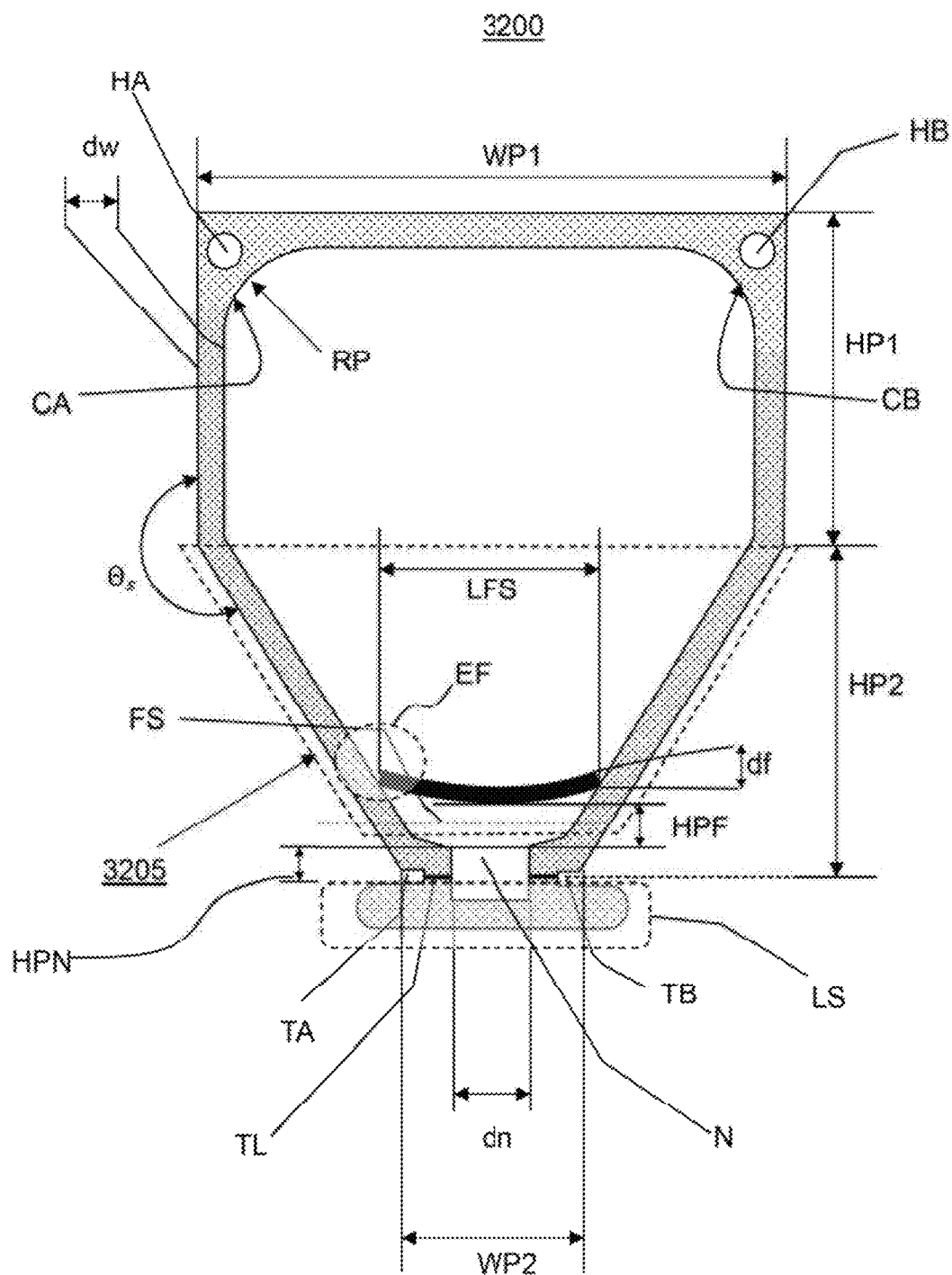
FIG. 32A shows an example of a flexible pouch, consistent with disclosed embodiments.

FIGS. 26G-26I shows further details of chamber 110. For example, FIG. 26G shows chamber 110 with chamber door 2640 being open. Chamber door 2640 may include one or more elements (e.g., elements 2641A and 2641B) for holding pouch 111. FIG. 26H shows an example embodiment of pouch 111 being inserted into chamber 110 such that elements 2641A and 2641B are engaged with pouch 111 through suitable openings in pouch 111 (e.g., such openings HA and HB are shown in FIG. 32A as further discussed below). After pouch 111 is inserted in chamber 110 and secured via elements 2641A and 2641B, chamber 110 may be closed, as shown in FIG. 26I.

Figure 27:
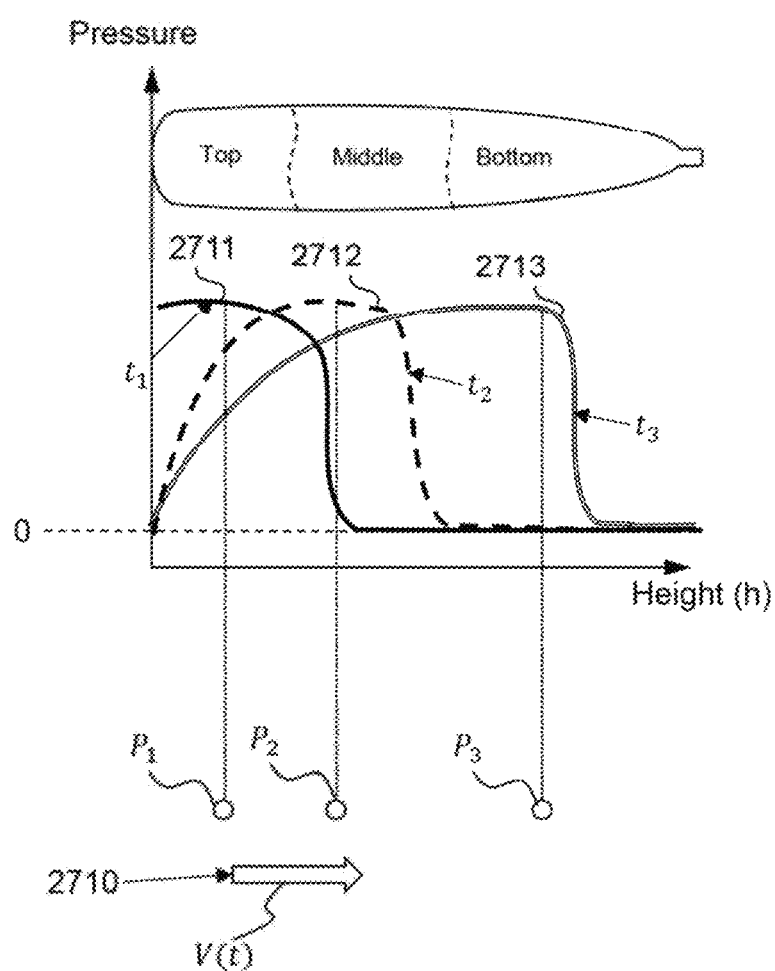
FIG. 27 shows an example distribution of pressure over a surface of pouch 111 as a function of pouch height (h).

FIG. 27 shows an example distribution of pressure over a surface of pouch 111 as a function of pouch height (h). At a first time $t_1$, pressure distribution may be characterized by a plot 2711, which may have a peak pressure $P_1$ in a Top region of pouch 111, at a second time $t_2$, pressure distribution may be characterized by a plot 2712, which may have a peak pressure $P_2$ in a Middle region of pouch 111, and at a third time $t_3$, pressure distribution may be characterized by a plot 2713, which may have a peak pressure $P_3$ in a Bottom region of pouch 111. In an example embodiment, arrow 2710 shows a direction of movement of peak pressure as a function of time. In an example embodiment, peak pressure may move along height h of pouch 111 at a velocity $V(t, h)$ which may be a function of $\omega(t)$ (herein, $\omega(t)$ is an angular revolution of cam 2611, as described above and shown in FIG. 26B). In an example embodiment, $\omega(t)$ is selected based on a target flow rate $Q(t)$ of paste from pouch 111. In an example embodiment, target flow rate $Q(t)$ may be related to $V(t, h_{max})$ as $Q(t) \propto A(h_{max}) V(t, h_{max})$. Herein, $A(h_{max})$ is a cross-sectional area of a pouch at height $h_{max}$, $h_{max}$ is a height at which pressure has a maximum, and $V(t, h_{max})$ is a velocity at a height $h_{max}$ and time t. In an example embodiment, $V(t)$ may be related to a lateral velocity $v_p(t)$ of a top point of plate 2613 towards pouch 111, as further described below.

Figure 28:
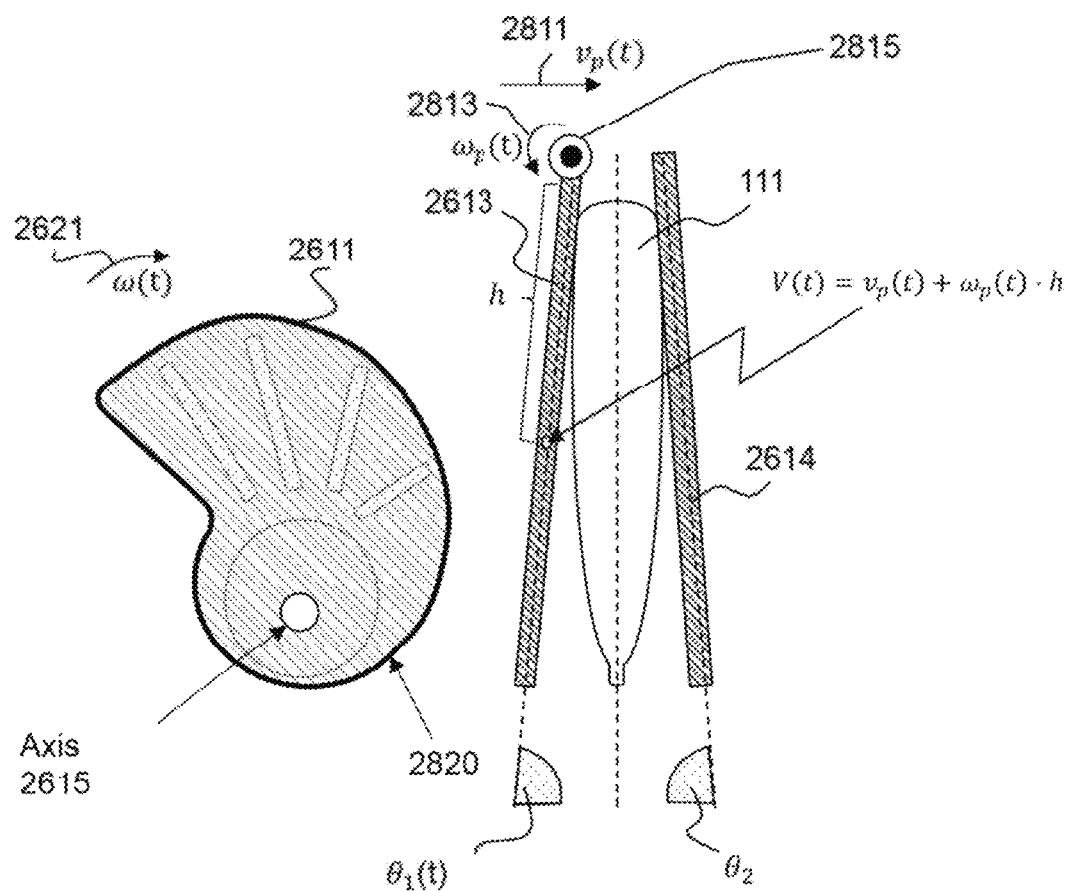
FIG. 28 shows an example configuration of a cam mechanism and plates for extracting base from a pouch, consistent with disclosed embodiments.

FIG. 28 shows an example plate 2613 that is suspended from an axis 2815. In an example embodiment, axis 2815 can undergo lateral motions as indicated by arrow 2811. The lateral motion of axis 2815 may be at a velocity $v_p(t)$. Additionally, plate 2613 may be configured to rotate around axis 2815 with an angular velocity $\omega_p(t)$ as shown by arrow 2813, thus, resulting in angle $\theta_1 = \theta_1(t)$ being a function of time. As previously described, velocity $v_p(t)$ may depend on $\omega(t)$. Specific dependence is related to a particular shape of cam 2611. More particularly, the shape of curve 2820 determines the dependence between rotational angular velocity $\omega(t)$ and a lateral velocity $v_p(t)$. In an example embodiment, $V(t)$ may be proportional to $v_p(t)$. For a case when $\omega_p(t)=0$ (i.e., axis 2815 does not allow any rotation for plate 2613) $v_p(t) = V(t)$. Alternatively, when $\omega_p(t) \neq 0$, $V(t) = v_p(t) + \omega_p(t) \cdot h$.

Figure 29:
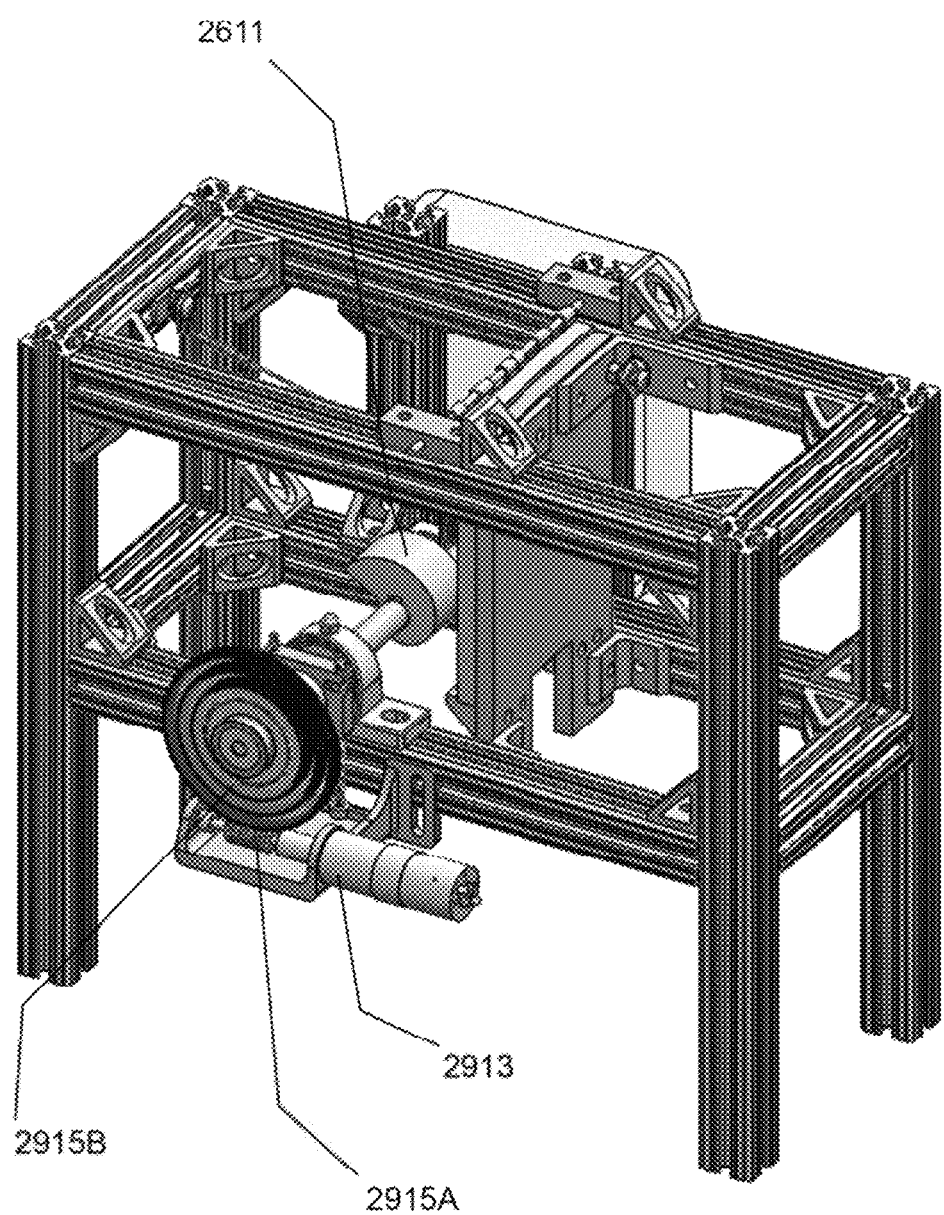
FIG. 29 shows another view of a cam mechanism, consistent with disclosed embodiments.

FIG. 29 shows another view of a cam 2611, consistent with disclosed embodiments. Cam 2611 may be rotated using device 2913 (e.g., an electric motor, lever, and the like). Device 2913 may be configured to translate rotational motion via a set of gears 2915A and 2915B.

Figure 30A:
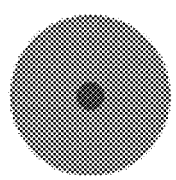
FIG. 30A-30C shows possible cam mechanism shapes, consistent with disclosed embodiments.
Figure 30A:
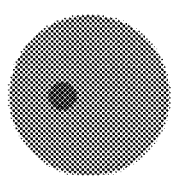
Figure 30A:
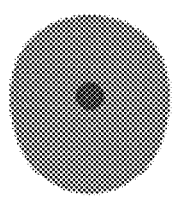
Figure 30A:
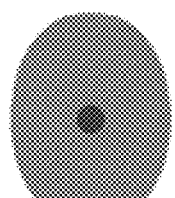
Figure 30A:
Figure 30A:
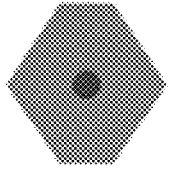
Figure 30A:
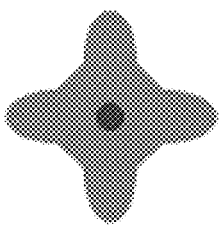
Figure 30A:
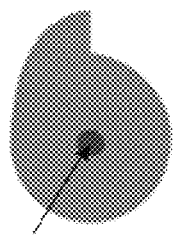

FIG. 30A shows various examples of cam 2611 shapes, such as (round, eccentric, oval, elliptical, heart, hexagonal, star, and snail) shapes that can be used. Other shapes can be used as well. In an example embodiment, cam 2611 is configured to have an increasing "thickness" along a line connecting axis 2615 of cam 2611 and plate 2613, as cam 2611 rotates, as further described below in relation to FIG. 30B. Such a configuration for cam 2611 can be used to continuously push plate 2613 towards pouch 111.

Figure 30B:
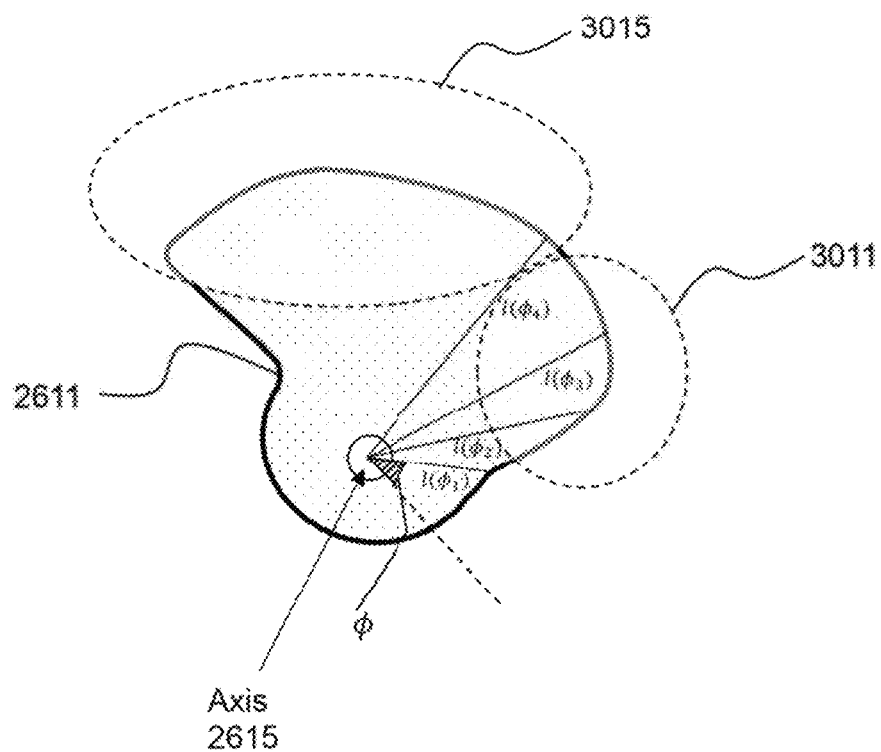
Figure 30C:
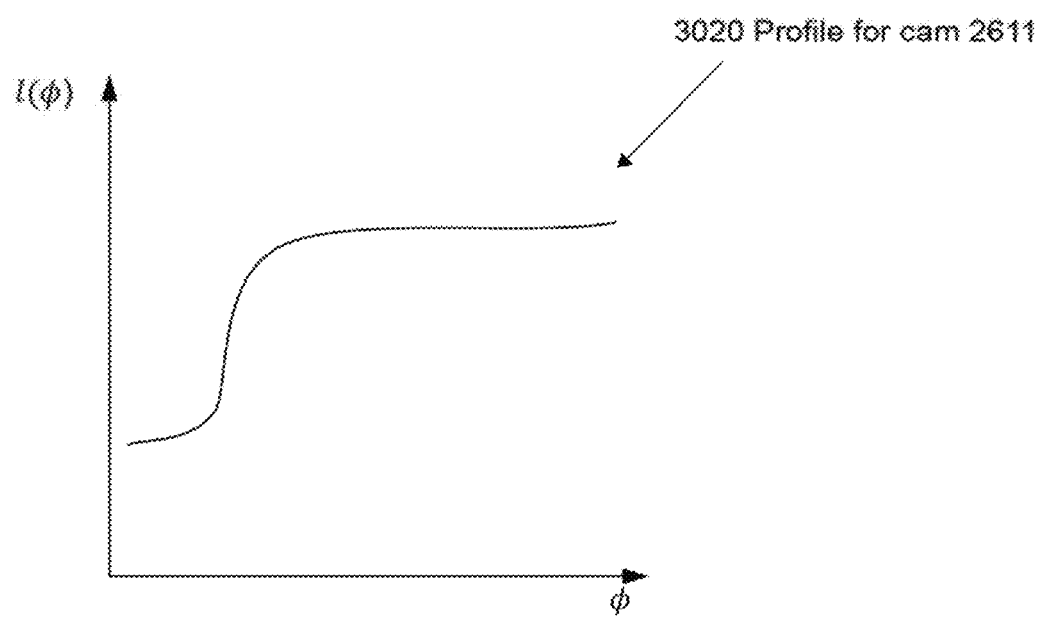

An example of cam 2611 is shown in FIG. 30B. Lines of length $l(\phi_1)$ through $l(\phi_4)$ are drawn from the center of axis 2615 to the rim of cam 2611 and correspond to a thickness of cam 2611. An angle $\phi$ may be measured, as shown in FIG. 30B, and correspond to the angle over which cam 2611 has turned during the rotation. The lengths $l(\phi_1)$ through $l(\phi_4)$, corresponds to separation distances of axis 2615 and plate 2613. In an example embodiment, length of lines, $l(\phi)$, are measured from the center of axis 2615 to rim of cam 2611, and $l(\phi)$ may be a monotonically increasing function as a function of angle $\phi$. An example of such a function is shown in FIG. 30C. In an example embodiment, $l(\phi)$ may first increase rapidly, as shown by plot 3020, indicating the profile of cam 2611. Such a rapid increase in $l(\phi)$ may provide a large pressure on plate 2613, and may be used to induce sufficient pressure onto pouch 111 to result in an intentional rupture of pouch 111. Subsequently, $l(\phi)$ may increase more slowly, as shown by plot 3020, indicating a slower squeezing action for pouch 111 than initial squeezing action (i.e., indicating that an overall speed of plate 2613 towards pouch 111 (e.g., $V(t)$, as discussed above) is decreasing with time, and as a function of revolution of cam 2611).

The cam design described herein (including the designs shown through cam 2611) solves various problems associated with evacuating ingredients/pastes from the pouch (including pouch 111). For example, it is preferable to control the pressure distribution applied to the pouch that causes the evacuation of the ingredients/paste inside the pouch. If there is no such control, the pouch could burst at an undesired location. The cam-driven press design described herein solves this problem by evacuating the pouch ingredients/paste from the top down (i.e., the cam-driven press applies the initial pressure to the pouch at the end opposite the nozzle and progressively applies pressure down towards the nozzle). Put differently, the top of the pouch (i.e., the part of the pouch opposite the nozzle) is pressed first, and then the cam drives the press such that pressure is progressively applied down the pouch and toward the nozzle. Thus, the cam-drive press design described herein solves problems associated with pouches bursting at undesired locations.

Another problem associated with evacuating ingredients/paste from pouches occurs when the ingredient/paste is dispensed too fast. When this happens, there can be ingredient/paste residue or buildup at the bottom of the mixing bottle (i.e., on or near the components associated with the motor that performs the emulsification). This can compromise the quality of the emulsification process and lead to undesirable taste or texture of the milk product. Such un-emulsified ingredient/paste is wasteful and also difficult to clean, which means subsequent mixing cycles can be compromised as well if the problems described herein are not addressed. The cam-driven press design described herein solves these problems by providing a way to control the evacuation rate. For example, the rotational speed of the cam can be controlled, which, in turn, controls the amount of pressure applied to the pouch, which, in turn, controls the rate at which the ingredient/paste dispenses from the nozzle or frangible seal. This is how the dispense rate of the ingredient/paste in the pouch is controlled. When the ingredient/paste is properly dispensed at the correct rate, more paste gets emulsified into the final liquid and there is minimal un-emulsified paste, if any, which means the mixing bottle is easier to clean and ingredient/paste is not wasted.

Another problem associated with evacuating ingredients from pouches involves the fact that different pouches may contain different ingredients with different viscosities, so not all ingredients will not evacuate the same way or at the same rate from the pouch. Ingredients/pastes with lower viscosities evacuate faster and more fully than ingredients/pastes with higher viscosities, such as chocolate oat paste. For high-viscosity ingredients/pastes, the pouch may need to be pressed multiple times to have full evacuation of the ingredients/paste. The cam described in the present invention solves these problems because it can rotate in the forward and backward direction and drive the press over the same pouch multiple times. Moreover, the cam can rotate at different speeds, and the system can be programmed such that the ideal rotation rate can be used given viscosity associated with the ingredient/paste in the pouch.

Another problem associated with evacuating ingredients from pouches occurs when the pouch is not positioned properly in the machine that performs the evacuation. When the pouch is not positioned properly, optimal evacuation may not occur. The pouch chamber in the present invention is designed to hold and maintain the pouch in the proper position before, during, and after the evacuation process. This enables consistent loading and unloading of the pouch in the machines described herein, and unwanted movement of the pouch while in those machines.

Figure 31A:
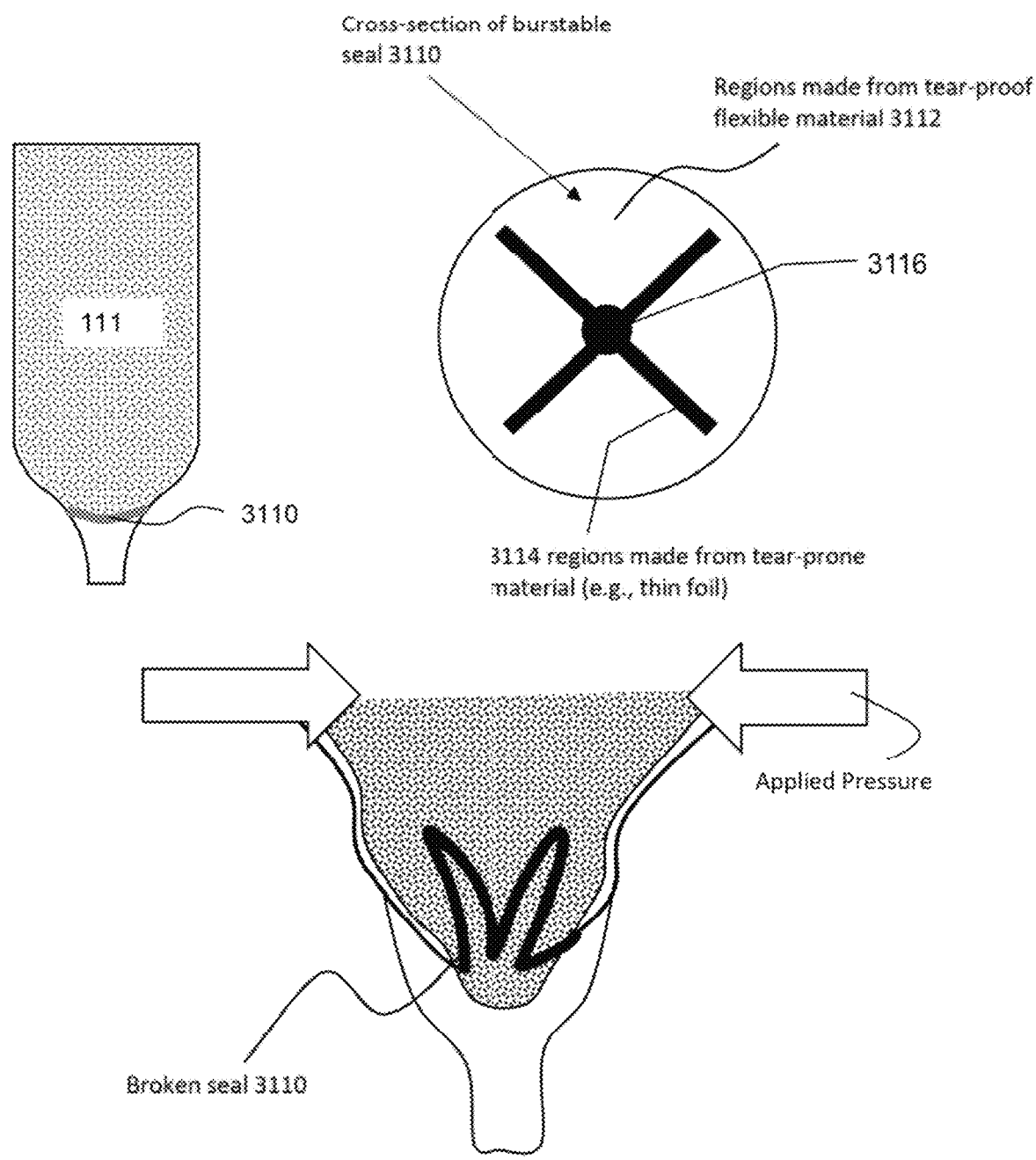
FIG. 31A-31B show examples of pouches with burstable seals, consistent with disclosed embodiments.

FIG. 31A shows an example embodiment of pouch 111 containing a burstable seal 3110. As seen from a cross-section of burstable seal 3110, seal 3110 may include regions formed from a tear-proof flexible material 3112, and regions 3114 made from tear-prone material (e.g., thin foil, paper, and the like). In an example embodiment, regions 3114 may form a cross pattern, with a circular region 3116 at the center of the cross pattern). Under the application of pressure to pouch 111, the base within pouch 111 may be configured to press on seal 3110, resulting in the breaking of seal 3110 at regions 3114, as shown in FIG. 31. While a cross pattern is shown in FIG. 31, it should be appreciated that any other suitable pattern may be used to allow for seal 3110 to be broken when being under pressure.

Figure 31B:
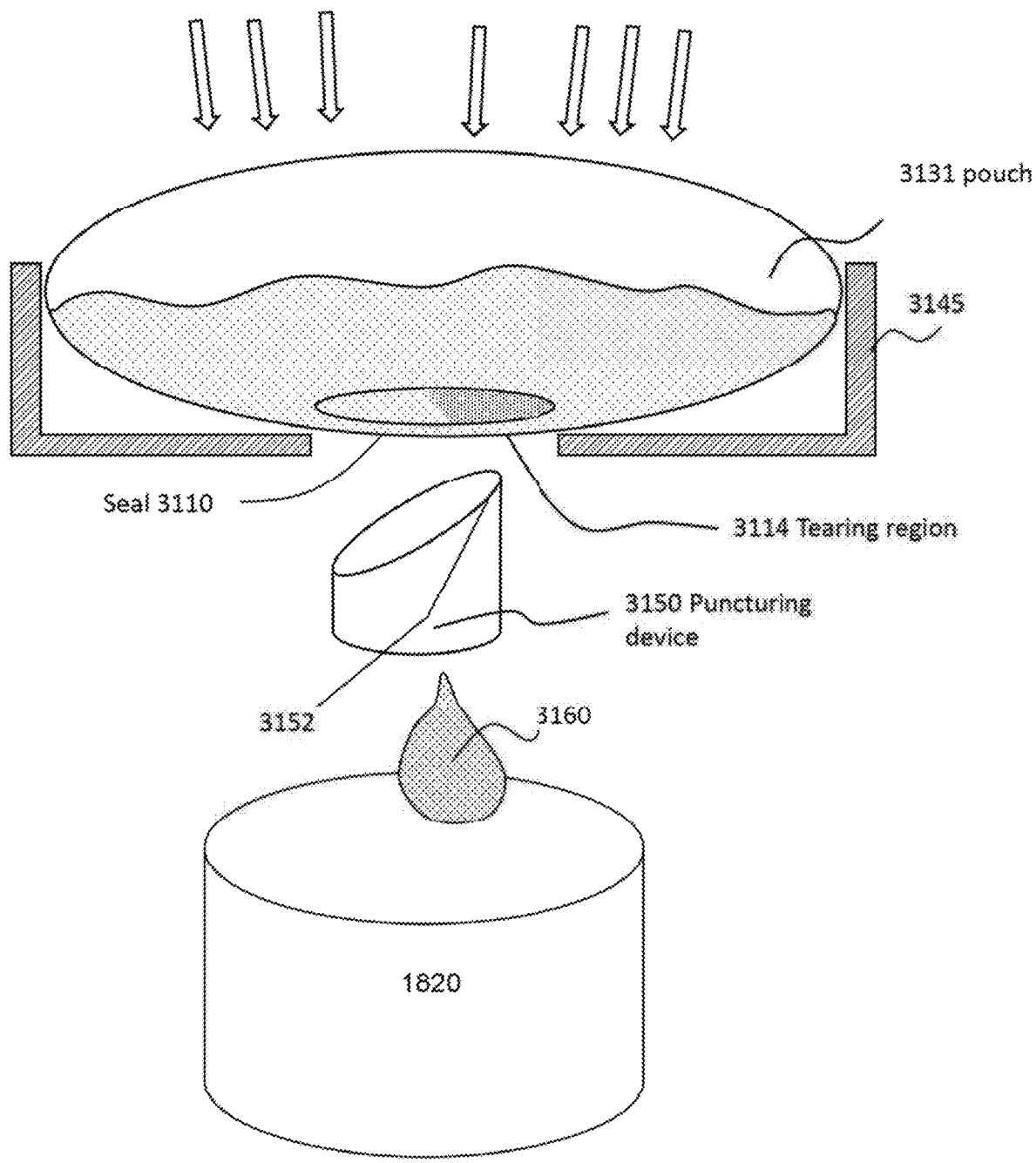

An alternative embodiment for breaking seal 3110 is shown in FIG. 31B. In an example embodiment, pouch 3131 (as shown in FIG. 31B) may have a different shape than pouch 111 in FIG. 31A. For example, pouch 3131 may have a flatter shape and may be configured to be placed over a support 3145 (e.g., support 3145 may be part of chamber 110) such that seal 3110 is aligned to face puncturing device 3150. In an example embodiment, puncturing device 315 may have a sharp edge 3152 for puncturing seal 3145 at a tearing region 3114. Puncturing device 3150 may be a tube through which base 3160 from pouch 3131 may be flown to bottle 1820.

In various embodiments, system 101 may include a pouch identification system (PIDS). The PIDS may be used for identifying the appropriate type of pouch 111 to be used with system 101. For instance, different pouches may contain a different type of plant-based paste and may include different pouch identifiers such as labels, colors, shapes, sizes, weights, radio frequency identifiers, and the like. In an example embodiment, the PIS may determine a particular type of pouch 111 based on one of (or several) pouch identifiers and may be configured to transmit information about the type of pouch to a suitable controller for system 101 (e.g., control module 572, as shown in FIG. 5E). In some cases, after receiving information from the PIS, control module 572 may be configured to adjust various operational parameters for system 101, such as a pressure needed for extracting base from pouch 111, a time needed for extracting the base from pouch 111, a pressure distribution over pouch 111, a time dependency of pressure distribution over pouch 111, a particular operation of a mechanical device (e.g., rollers, CAM elements, and the like) for extracting the base from pouch 111, a time for mixing the base and water in a mixing bottle, an amplitude of agitation for the mixing of the base and the water, or any other suitable parameters for optimizing the extraction of the base from pouch 111 and for optimizing mixing of the base and the water.

The PIDS may utilize Near Field Communication such as High Frequency (HF) or UltraHigh Frequency (UHF) scanners, barcode scanners, cameras, and the like. Having the PIDS recognize different types of pouches may be essential to ensure the proper functioning of system 101.

Additionally, system 101 may utilize a bottle identification system (BIDS) for determining what type of bottle is used for system 101. In an example embodiment, BIDS may determine the height of a bottle, the width of the bottle, the volume of the bottle, the weight of the bottle, and the like. In an example embodiment, BIDS may utilize visible sensors (e.g., a camera, a laser, a photodiode, and the like) as well as weight sensors. In some cases, base on a type of bottle identified by BIDS, various operational parameters for system 101 may be adjusted. Additionally, the operational parameters may be adjusted based on user inputs (e.g., the user may input additional parameters, such as an amount of creaminess for the plant-based beverage, via an interface for system 101).

Consistent with disclosed embodiments, a flexible pouch having more than one seal is provided. The flexible pouch may have a first seal (herein referred to as a lock seal or a security seal) and a second seal (herein referred to as a frangible seal). In an example embodiment, the lock seal may be configured to withstand high pressures (herein, high pressures are referred to as pressures above a few pounds per square inch or a few tens of pounds per square inch, such as, for example, 1-50 psi). For example, the lock seal may be configured to withstand a force of a few tens to a few hundred pounds (e.g., 100 pounds, 200 pounds, 220 pounds, 250 pounds, and the like) when such a force is exerted on the side of the flexible pouch. The lock seal may be configured to be removable by tearing off the lock seal along a tear line, as further described below. In various embodiments, the lock seal is not configured to be burstable under normal handling of a flexible pouch (e.g., during shipment of flexible pouches, loading flexible pouches into chambers for holding pouches, and the like). Alternatively, the frangible seal of the flexible pouch is configured to be burstable when a sufficiently high target pressure is applied to the flexible pouch. For example, when a pressure of a few tens of psi is applied to the flexible pouch, the frangible seal is configured to be burstable. For instance, the frangible seal may be burstable for pressures of 5 psi, 10 psi, 15 psi, 20 psi, 25 psi, or similar pressures. In some cases, a frangible seal is configured to be burstable for pressures in a range of 1-20 psi. In an example embodiment, a frangible seal may be fabricated to be burst at a target pressure Pf having an allowable pressure variation of SP. In an example embodiment, Pf may be a few psi, and SP may range from a fraction of one psi to as much as a few tens of percent of Pf. For example, the frangible seal may be configured to withstand a force of a few to a few tens of pounds (e.g., 1 pound, 5 pounds 10 pounds, 20 pounds, 50 pounds, 55 pounds, 60 pounds, 70 pounds, and the like), when such a force is exerted on the side of the flexible pouch. The frangible seal is configured to be burst such that the material used for forming the frangible seal is not impeding a flow of base from the flexible pouch, as further described below. In an example embodiment, when applying the target pressure Pf, the frangible seal is configured to burst within a fraction of a second or within a few seconds (e.g., within 0.1-10 seconds).

An example of a flexible pouch 3200 is shown in FIG. 32A. In various embodiments, a frangible seal FS is configured to be burst when a given target pressure (e.g., pressure Pf) is applied to flexible pouch 3200. After frangible seal FS is burst, a plant-based paste located within flexible pouch 3200 (herein, as above, also referred to as a base) is configured to flow out of nozzle N of flexible pouch 3200. Frangible seal FS may not be strong enough to withstand typical pressures or forces used for handling of flexible pouch 3200 (e.g., handling by the customers).

However, a flexible pouch 3200 may use a strong lock seal to ensure that flexible pouch 3200 withstands hundreds of pounds of force, thus, compensating for any incidental event during shipping and handling of flexible pouch 3200 by carriers and users. On the other hand, frangible seal FS is utilized such that it is easy to evacuate pouch 3200 by applying relatively light pressure (e.g., a few psi) due to hands of a user or via pressure generated by various press mechanisms of chamber 110, as described above.

As described above in relation to FIG. 9, the pressure for rupturing flexible pouch 3200 and for evacuating a plant-based paste from flexible pouch 3200 may not be constant in time. For example, a first pressure (e.g., a few psi to a few tens of psi) may be applied to rupture a frangible seal FS of flexible pouch 3200, while a higher (or in some cases, a lower) pressure may be applied to flexible pouch 3200 to subsequently evacuate the plant-based paste from flexible pouch 3200. In an example embodiment, a pressure slightly larger than a rupturing pressure (e.g., the pressure that is about 20-60% larger than the rupturing pressure) may be used to evacuate the plant-based paste from flexible pouch 3200.

Figure 32D:
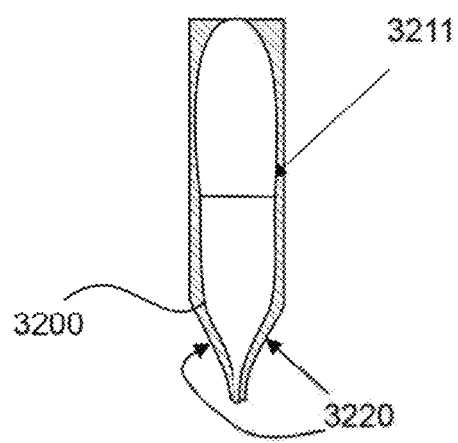

Consistent with disclosed embodiments, FIG. 32A shows an example of a flexible pouch 3200. Flexible pouch 3200 is configured to have width WP1, which may be on the order of a few inches (e.g., 3-8 inches). In various embodiments, the width WP1, height HP1, height HP2, and width WP2 (as shown in FIG. 32A) are selected to make flexible pouch 3200 to be easily insertable into a chamber (e.g., chamber 110, as shown, for example, in FIG. 4A). For example, FIG. 32B shows flexible pouch 3200 being inserted into a receiving portion 3211 of chamber 110. In various embodiments, receiving portion 3211 and flexible pouch 3200 are configured such that when pouch 3200 is placed (e.g., by dropping flexible pouch 3200) into receiving portion 3211 of chamber 110, pouch 3200 is configured to slide into a correct position, as shown by FIG. 32C. In an example embodiment, the lower portion of pouch 3200 has a truncated triangular shape (e.g., shape 3205 as shown by a dotted line in FIG. 32A), facilitating pouch 3200 to slide into receiving portion 3211 of chamber 110. Receiving portion 3211 may have an element 3220 (herein referred to as a restrictor 3220) configured to restrict nozzle N of pouch 3200 from bending in a direction as indicated by arrow 3217), thus, resulting in the plant-based paste extracted from flexible pouch 3200 in a substantially vertical direction. In some cases, restrictor 3220 may be one of the surfaces of receiving portion 3211. For example, FIG. 32D shows a side view of receiving portion 3211 with pouch 3200 located within receiving portion 3211. As shown in FIG. 32D, receiving portion 3211 includes elements 3220 (e.g., being surfaces of receiving portion 3211) restricting a movement of nozzle N of flexible pouch 3200. In some cases, element 3220 may include one or more wires or thin metal strips restricting the movement of nozzle N in a direction indicated by arrow 3217.

Figure 32E:
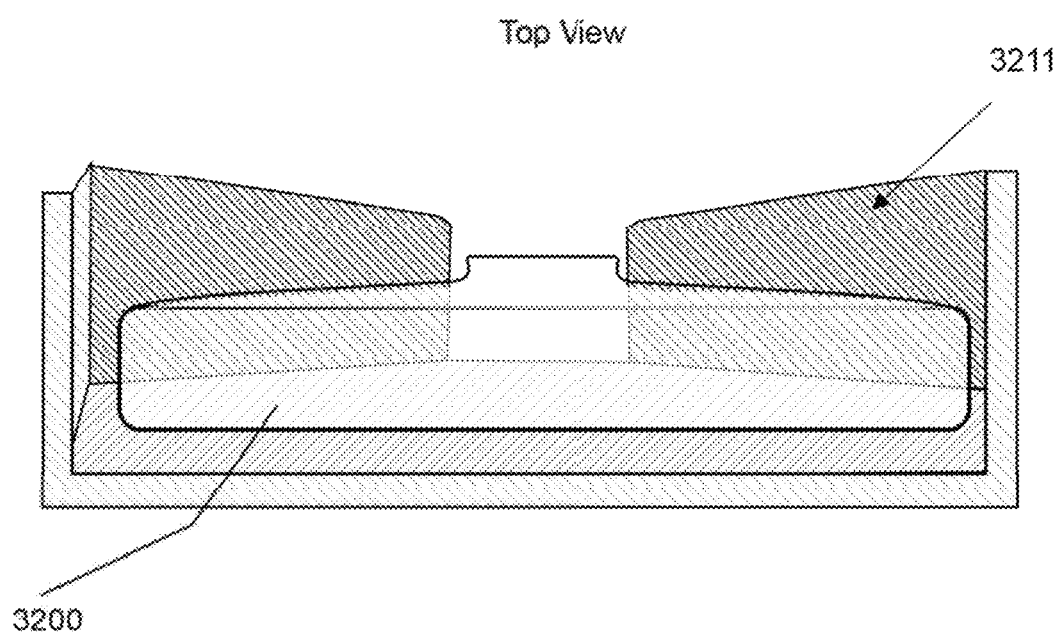

In some cases, receiving portion may be configured to have a curved shape (e.g., curved shape is indicated by lines 3215A-3215C and 3216A-3216C, as shown in FIG. 32B) to further facilitate guiding pouch 3200 into receiving portion 3211. FIG. 32E shows a top view (the top view is indicated by an arrow in FIG. 32C) of flexible pouch 3200 as it is inserted in receiving portion 3211.

In various embodiments, when using flexible pouch 3200 with chamber 110 (e.g., when inserting pouch 3200 into chamber 110, pouch 3200 is configured to be oriented such that nozzle N points straight downward within 10 degrees and is not blocked by any surrounding physical parts. In various embodiments, flexible pouch 3200 is configured such that frangible seal FS opens within a few seconds (e.g., within 1-5 seconds) when a target pressure (e.g., the pressure of about 1-15 psi) is applied to flexible pouch 3200. In various embodiments, frangible seal FS should not open (i.e., burst) when pressure is below the target pressure. In various embodiments, opening resulted from bursting frangible seal FS should make the ingredients of flexible pouch 3200 (i.e., plant-based paste) flow downward within a few degrees (or a few tens of degrees) from the vertical direction.

Returning to FIG. 32A, flexible pouch 3200 may have dimension HP1 in a range of a few inches (e.g., 1-5 inches and dimension HP2 may be similar to dimension HP1 (e.g., HP2 may range between 1-5 inches). In an example embodiment, HP2 may be smaller than HP1. Alternatively, HP2 may be larger than HP1. In an example embodiment, the combined dimension HP1+HP2 may be on the order of 4-8 inches.

Flexible pouch 3200 includes a lock seal LS configured to withstand relatively high pressures (in tens of psi, as described above). In an example embodiment, lock seal LS may be separated from flexible pouch 3200 via tearing along a tear line TL, as shown in FIG. 32A. In an example embodiment, pouch 3200 may include notches TA and TB for facilitating tearing lock seal LS along tear line TL. In various embodiments, tear line TL may be prepared (e.g., using laser treatment such as laser scoring or perforation) for ease of tearing along tear line TL. After removing lock seal LS, a nozzle N (the nozzle may contain gas, such as air) may be exposed to ambient, and the content of flexible pouch 3200 (e.g., the base contained in pouch 3200) may be further evacuated via nozzle N after a frangible seal is broken.

As shown in FIG. 32A, a frangible seal FS prevents the base in pouch 3200 from leaking from pouch 3200 until sufficient pressure is applied to pouch 3200 to burst frangible seal FS. In an example embodiment, frangible seal FS may be formed using any suitable approach known in the art for forming frangible seals. For example, frangible seal FS may be formed by heat-sealing together the inner surfaces of pouch 3200. In an example embodiment, pouch 3200 may include material in the vicinity of frangible seal FS (e.g., multilayer film), which undergoes interfacial sealing when heat is applied to such a material. For example, such materials may be resins and may include blends of one or more polyolefins such as polyethylene including metallocene polyethylene with polybutylene or polypropylene including homopolymer or copolymers thereof (collectively: PE/PB blends; PE/PP blends); polypropylene with polybutylene (PP/PB blends); polypropylene with ethylene methacrylic acid copolymer (PP/EMAA blends); or polypropylene with styrene-ethylene/butylene-styrene block terpolymer (PP/SEBS blends). The frangible seal can also be produced by zone coating the innermost layer in the region of the seal with a sealant or by heat sealing two dissimilar sealing surfaces such as an ionomer and ethylene copolymer. Blends of an ionomer based on partial neutralization of an ethylene acrylic acid copolymer or ethylene methacrylic acid copolymer with a polypropylene α-olefin copolymer (ethylene/acrylic acid copolymer or EMAA ionomer blended with a PP/PB copolymer) can be used as the innermost sealant layer because the blends are reliable in forming lockup or frangible seals, depending on sealing conditions.

Frangible seal FS may be of any suitable thickness, wherein the thickness is selected to result in desired properties of frangible seal FS (e.g., the thickness of frangible seal FS is selected such that frangible seal burst at a few tens of psi). In an example embodiment, frangible seal FS may have a thickness df, as shown in FIG. 32A. The thickness and its profile along its length can be chosen for a desired burst strength. The thicker the frangible seal is, the harder it will be to burst the seal. And the thinner the frangible seal is, the easier it will be to burst the seal. In an example embodiment, df may be in the range of a few hundredths to a few tenths of inches. For instance, df may range from 0.03 to 0.5 inches. In some cases, thickness df may not have a constant value along the length of frangible seal FS (herein, such thickness df is referred to as a non-uniform thickness). For example, thickness df may be larger near the edges of frangible seal FS (e.g., around region EF, as shown in FIG. 32A) and may be thinner towards the middle of frangible seal FS. In an example embodiment, df near the edges of frangible seal FS may be 110-200 percent of a thickness of frangible seal FS in the middle portion of frangible seal FS. In some embodiments, thickness df is configured to change along the length of frangible seal FS in the substantially continuous matter (i.e., without having large jumps in the value along the length of frangible seal FS). Herein, substantially continuous matter refers to having thickness df to have gradients that are below a target threshold value. In an example embodiment, a target threshold value for the gradient may be, for example, 10-50 percent of thickness change per inch of the length of frangible seal FS and the like. As described above, the frangible seal can also be designed to have different strengths by using certain temperatures and/or pressures during the heat forming process of the frangible seal. The higher the temperature is during the heat forming process (within a limit), the stronger the strength of the seal. This is advantageous because the seal can be designed with different strengths without changing the geometry or material of the pouch.

For example, a thicker paste (e.g., a chocolate-oat paste) has an approximate viscosity of around 5,000-10,000 centipoise, while a paste made with almonds is more fluidic in nature and has a viscosity of around 1000 centipoise. The combination of design parameters that generates an optimal burst and dispensing conditions and for a lower viscosity paste may not generate the same outcome for a higher viscosity paste. It is, therefore, advantageous to understand and select parameters for the frangible seal that allow for optical pouch evacuation. For instance, a longer frangible seal length will be easier to burst because it has more area to experience the applied pressure along its length. The length of the frangible seal can be also increased by having a convex or concave shape as shown in FIG. 32A.

The strength of the frangible seal can be increased with a higher applied temperature during the sealing process. For example, a frangible seal made at a temperature of 260 F will likely burst when it is pressed with 90 lbs force, whereas the seal made at a temperature of 250 F will likely burst when it is pressed with 50 lbs force. Using the chocolate-oat paste as an example, the combination of the following frangible seal parameters shown below will burst a pouch with Choco-oat paste at 50 lbs applied force by the press mechanism in a few seconds while all permanent lock seal is intact: frangible seal thickness df of 6.35 mm, 7 mm LFS length, 250 F sealing temperature, its location HPF of 5 mm.

The permanent lock seal can be generated with an applied temperature of 300 F and above, for example. This temperature disparity between the lock seal setting and frangible seal setting allows for varying seal strengths between these two seals. Various combinations of seal parameters, including those described above, can be used to optimize the seals for a particular viscosity, dispense speed, and shipping conditions.

In various embodiments, frangible seal FS may be placed at an entrance to nozzle N, where LFS is equal to dn in FIG. 32A or at some distance HPF before nozzle N. FIG. 32A shows that a length LFS of frangible seal FS is larger than width dn of a nozzle. In an example embodiment, HPF may be a fraction of an inch, such as a few hundredths of an inch or a few tenths of an inch (e.g., 0.05 inches, 0.1 inches, 0.15 inches, 0.2 inches, and the like). In various embodiments, distance HPF is sufficiently large such that the material forming frangible seal FS does not obstruct a flow of the base from pouch 3200 when frangible seal FS is broken. Further, nozzle N length HPN is selected to be sufficiently small to ensure that possible bending of nozzle N does not obstruct the flow of the base from pouch 3200. In an example embodiment, length HPN may be on the order of a fraction of an inch (e.g., 0.1-1 inches).

Other dimensions of pouch 3200 are selected to improve the flow of base from pouch 3200 and to allow pouch 3200 to be easily inserted into receiving portion 3211, as shown in FIG. 32B. For example, the size of a diameter dn of nozzle N is selected such that the base is evacuated from pouch 3200 under a target pressure (e.g., the target pressure may be a few tens of psi) for a desired duration. In an example embodiment, diameter dn may be a few tenths of an inch to about an inch. For example, diameter dn may be in the range of 0.1-1 inches.

The width WP2 for flexible pouch 3200 is selected to provide a suitable shape of flexible pouch 3200. For example, width WP2 may be a few tenths of an inch to about one or two inches. In an example embodiment, a choice of WP2 and HP2 is selected to result in an angle $\Theta_s$ being above hundred ninety degrees. In some cases, angle $\Theta_s$ may be 200 degrees, 210 degrees, 212 degrees, 215 degrees, and the like. For example, angle $\Theta_s$ may range between 190-240 degrees.

Figure 33:
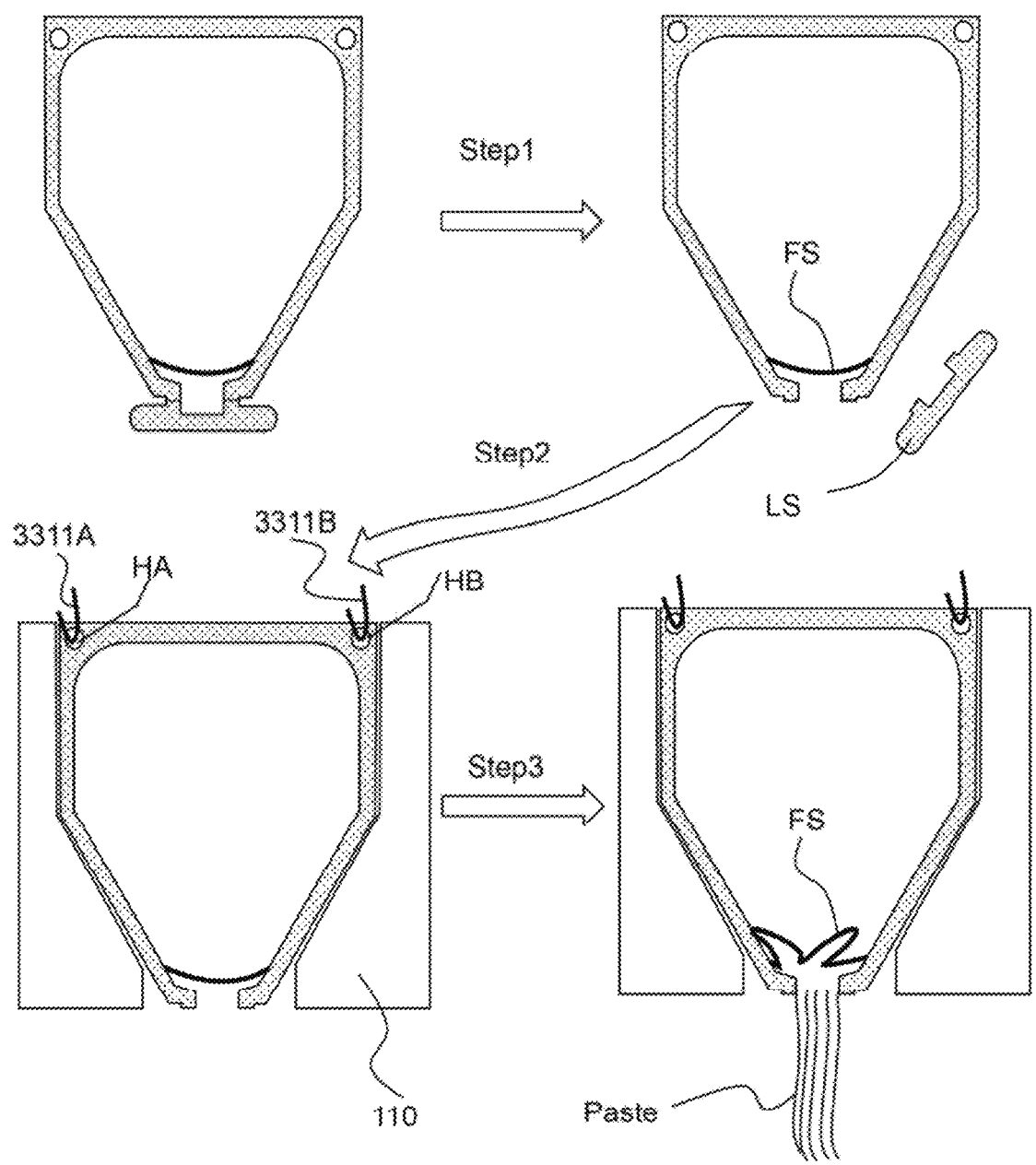
FIG. 33 shows example steps for unsealing a flexible pouch and extracting plant-based paste, consistent with disclosed embodiments.

Further, in various embodiments, flexible pouch 3200 may include holes HA and HB. The holes may be used to secure pouch 3200 within chamber 110 (e.g., chamber 110 may include protrusions such as protrusions 3311A and 3311B in the form of hooks, are shown in FIG. 33) that may penetrate holes HA and HB to secure pouch 3200 within chamber 110.

In various embodiments, pouch 3200 may have sealed walls with a thickness dw, as shown in FIG. 32A. In an example embodiment, thickness dw, and a strength of a seal for the walls of pouch 3200 may be selected to allow flexible pouch 3200 to withstand high pressures of at least several tens of psi (e.g., 20 psi, 30 psi, 50 psi, and the like). In an example embodiment, the seal for the walls of pouch 3200 is selected to withstand a force of a few tens to a few hundred pounds (e.g., 100 pounds, 200 pounds, 220 pounds, 250 pounds, and the like) when such a force is exerted on the side of flexible pouch 3200. In an example embodiment, thickness dw may be in a range of a few tenths of an inch to about an inch. For example, thickness dw may be in the range of 0.1-1 inch. In some cases, thickness dw may be about the same as thickness df of frangible seal FS, and in other cases, thickness dw may be 200-500 percent larger than thickness df.

While flexible pouch 3200 may have an internal enclosure (i.e., an internal cavity containing a plant-based paste) of any suitable shape, in some cases, flexible pouch 3200 may be configured not to include sharp corners for the internal enclosure to ensure smooth distribution of tension forces on the walls of the internal enclosure). To ensure that internal enclosure does not contain sharp corners, corners CA and CB of internal enclosure (as shown in FIG. 32A) may be characterized by a radius RP which may be about a fraction of an inch.

Figure 32F:
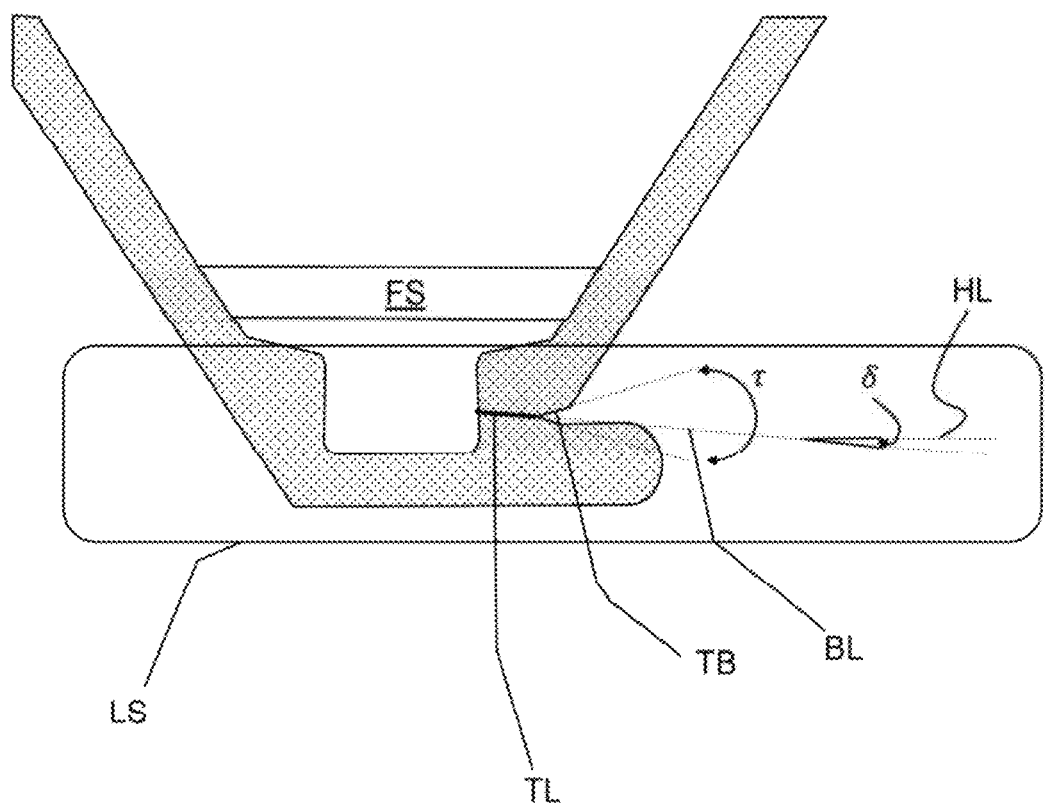
FIG. 32F-32G shows example embodiments of a flexible pouch, consistent with disclosed embodiments.

FIG. 32F shows an example embodiment of a portion of flexible pouch 3200 in the vicinity of lock seal LS. While FIG. 32A shows flexible pouch 3200 with two notches TA and TB, an example embodiment of flexible pouch 3200, as shown in FIG. 32F has only one notch TB. The simplest form of the notch is just a slit made from a cutting blade or other cutting mechanism. In an example embodiment, notch TB may also have a shape configured to improve tearing of lock seal LS along tear line TL. For example, notch TB may include a sharp angle t. In an example embodiment, notch TB may be oriented such that a bisector BL of angle t forms an angle δ with a horizontal line HL, as shown in FIG. 32F. In some cases, angle δ is about zero degrees. Alternatively, angle δ may have positive or negative values (herein, the negative value of angle & indicates that BL points above horizontal line HL. For example, when angle & is negative, tear line TL points downwards away from frangible seal FS, resulting in tearing of LS in a downward direction (i.e., away from frangible seal FS). Such direction of tear line TL may be preferred to avoid tearing towards frangible seal FS. In various embodiments, tear line TL is configured to be oriented such that, when tearing lock seal LS, frangible seal FS (or area in close proximity of frangible seal FS) is not affected by the tear (i.e., boundary resulting from tearing lock seal LS is not in close proximity to frangible seal FS). In an example embodiment, the boundary resulting from tearing lock seal LS is at least a tenth of an inch away from frangible seal FS at the closest location with frangible seal FS.

Figure 32G:
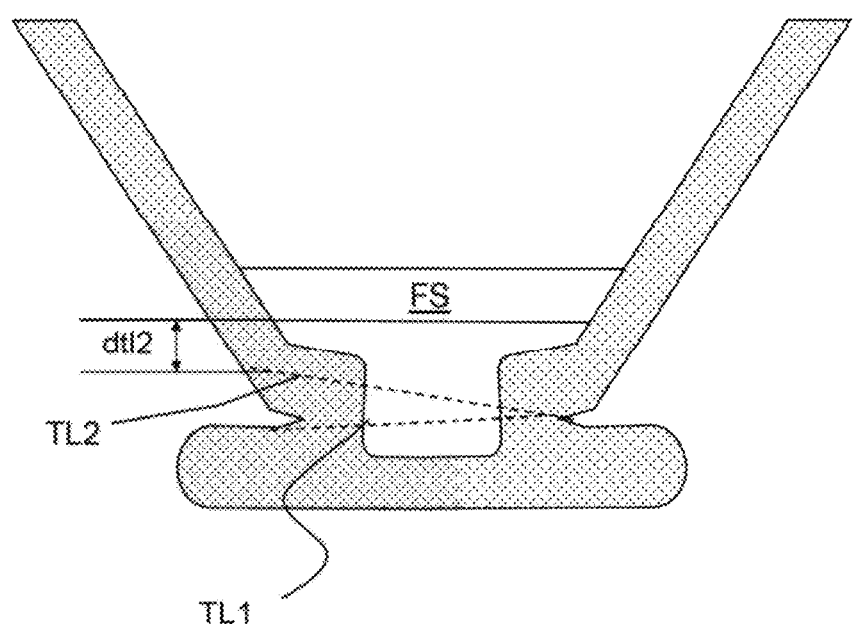

FIG. 32G shows example boundaries TL1 and TL2 resulting from tearing lock seal LS. In an example embodiment, TL1 is pointing down away from frangible seal FS, while TL2 is in closer proximity to frangible seal FS. Nevertheless, in an example embodiment, even TL2 is at least a few tenths of inches away from the frangible seal at the closest location (e.g., TL2 is a distance dtl2 away from frangible seal FS at the closest location).

FIG. 33 illustrates a process of using flexible pouch 3200 for extracting the plant-based paste using chamber 110. In an example embodiment, at step 1, a lock seal LS is removed by a user (e.g., user tears off the lock seal), and at step 2, flexible pouch 3200 is slid into chamber 110. Optionally, pouch 3200 is secured within chamber 110 via protrusions (e.g., posts or hooks) 3311A and 3311B using holes HA and HB. At step 3, flexible pouch 3200 is being pressed within chamber 110 using any suitable approaches (as described above), resulting in a rupture of frangible seal FS and extraction of paste from flexible pouch 3200.

In various embodiments, width dn, as shown in FIG. 32A, is defined by a geometry of nozzle N and by various details of frangible seal FS. In an example embodiment, frangible seal FS is configured to be wider than width dn (i.e., the length LFS is larger than dn), located further within flexible pouch 3200, and is configured not to be a bottleneck when extracting a plant-based paste from flexible pouch 3200. In an example embodiment, length LFS is larger than dn by at least five percent. Also, the geometry of frangible seal FS can be straight as shown, or concave or convex in shape with different curvatures as shown in FIG. 32A. Such shapes can make the frangible seal stronger or weaker. It is advantageous to have frangible seals of varying strengths because the pouches can have different pastes and thus different burst strengths, even when the press mechanism is the same.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations, and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure. As used herein, unless otherwise noted, the term "set" means one or more (i.e., at least one), and the phrase "any solution" means any now known or later developed solution.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A flexible pouch comprising an enclosure containing a flowable product, the enclosure comprising:
   a nozzle region for flowing the flowable product out of the flexible pouch, the nozzle region having a lock seal;
   a frangible seal located above the nozzle region; and
   wherein:
   the lock seal is configured to lock the flowable product within the flexible pouch when pressure less than a first threshold value is applied to the flexible pouch;
   the frangible seal is configured to lock the flowable product within the flexible pouch when pressure less than a second threshold value is applied to the flexible pouch;
   the first threshold value is larger than the second threshold value; and
   the lock seal is configured to be removed by tearing the lock seal along a tear line.

2. The flexible pouch of claim 1, wherein the first threshold value is at least twice the second threshold value.

3. The flexible pouch of claim 1, wherein the first threshold value is at least five times the second threshold value.

4. The flexible pouch of claim 1, wherein the tear line is configured to tear the lock seal along a direction pointing away from the frangible seal.

5. The flexible pouch of claim 1, wherein the frangible seal is formed via heat-sealing a region of inner surfaces of the flexible pouch.

6. The flexible pouch of claim 1, wherein the first threshold value is larger than at least 10 psi.

7. The flexible pouch of claim 1, wherein the second threshold value is smaller than at least 10 psi.

8. The flexible pouch of claim 1, further comprising at least one tear notch for removing the lock seal from the flexible pouch.

9. The flexible pouch of claim 8, wherein the tear notch comprises a geometrical shape having at least one angle.

10. The flexible pouch of claim 1, wherein the frangible seal is longer than the width of a nozzle by at least five percent.

\* \* \* \* \*